(12) United States Patent
Ahlfeld et al.

(10) Patent No.: US 8,320,513 B2
(45) Date of Patent: Nov. 27, 2012

(54) NUCLEAR FISSION REACTOR, FLOW CONTROL ASSEMBLY, METHODS THEREFOR AND A FLOW CONTROL ASSEMBLY SYSTEM

(75) Inventors: Charles E. Ahlfeld, La Jolla, CA (US); Roderick A. Hyde, Redmond, WA (US); Muriel Y. Ishikawa, Livermore, CA (US); David G. McAlees, Bellevue, WA (US); Jon D. McWhirter, Newcastle, WA (US); Nathan P. Myhrvold, Medina, WA (US); Ashok Odedra, Bellevue, WA (US); Clarence T. Tegreene, Bellevue, WA (US); Thomas A. Weaver, San Mateo, CA (US); Charles Whitmer, North Bend, WA (US); Victoria Y. H. Wood, Livermore, CA (US); Lowell L. Wood, Jr., Bellevue, WA (US); George B. Zimmerman, Lafayette, CA (US)

(73) Assignee: The Invention Science Fund I, LLC

( * ) Notice: Subject to any disclaimer, the term of this patent is extended or adjusted under 35 U.S.C. 154(b) by 269 days.

(21) Appl. No.: 12/386,495

(22) Filed: Apr. 16, 2009

(65) Prior Publication Data
US 2010/0266085 A1    Oct. 21, 2010

(51) Int. Cl.
*G21C 7/32* (2006.01)
(52) U.S. Cl. .................. 376/210; 376/385; 376/352
(58) Field of Classification Search .......... 376/210, 376/385, 352, 453, 438, 439, 444
See application file for complete search history.

(56) References Cited

U.S. PATENT DOCUMENTS

| | | | |
|---|---|---|---|
| 3,053,746 A * | 9/1962 | Challender et al. | 376/260 |
| 3,208,913 A | 9/1965 | Hennig | |
| 3,275,521 A | 9/1966 | Schluderberg et al. | |
| 3,361,637 A * | 1/1968 | Hawke et al. | 376/385 |
| 3,486,973 A * | 12/1969 | Engel et al. | 376/175 |
| 3,660,230 A | 5/1972 | Bailey, Jr. et al. | |
| 3,660,231 A | 5/1972 | Fox et al. | |
| 3,804,711 A | 4/1974 | Pettinger et al. | |
| 3,867,253 A | 2/1975 | Gratton et al. | |
| 3,976,542 A * | 8/1976 | Fortescue | 376/352 |
| 4,032,398 A | 6/1977 | Cross et al. | |
| 4,118,275 A * | 10/1978 | Carleton et al. | 376/230 |
| 4,279,875 A | 7/1981 | Bray et al. | |
| 4,285,891 A | 8/1981 | Bray et al. | |

(Continued)

OTHER PUBLICATIONS

PCT International Search Report; International App. No. PCT/US10/01124; Oct. 8, 2010; pp. 1-2.

(Continued)

*Primary Examiner* — Ricardo Palabrica

(57) ABSTRACT

A nuclear fission reactor, flow control assembly, methods therefor and a flow control assembly system. The flow control assembly is coupled to a nuclear fission module capable of producing a traveling burn wave at a location relative to the nuclear fission module. The flow control assembly controls flow of a fluid in response to the location relative to the nuclear fission module. The flow control assembly comprises a flow regulator subassembly configured to be operated according to an operating parameter associated with the nuclear fission module. In addition, the flow regulator subassembly is reconfigurable according to a predetermined input to the flow regulator subassembly. Moreover, the flow control assembly comprises a carriage subassembly coupled to the flow regulator subassembly for adjusting the flow regulator subassembly to vary fluid flow into the nuclear fission module.

15 Claims, 55 Drawing Sheets

U.S. PATENT DOCUMENTS

| | | | |
|---|---|---|---|
| 4,324,614 A | | 4/1982 | Moody |
| 4,369,048 A | | 1/1983 | Pence |
| 4,412,968 A | | 11/1983 | Sridhar |
| 4,431,028 A | | 2/1984 | Hendrick |
| 4,493,812 A | * | 1/1985 | Christiansen et al. ........ 376/352 |
| 4,505,877 A | | 3/1985 | Rion |
| 4,588,549 A | | 5/1986 | Hutter |
| 5,066,453 A | | 11/1991 | Heppenstall et al. |
| 5,198,185 A | | 3/1993 | Church |
| 5,268,947 A | | 12/1993 | Bastide et al. |
| 5,531,270 A | | 7/1996 | Fletcher et al. |
| 5,812,621 A | | 9/1998 | Takeda et al. |
| 5,943,385 A | | 8/1999 | Drecker et al. |
| 5,984,262 A | | 11/1999 | Parsons et al. |
| 6,041,857 A | | 3/2000 | Carmody et al. |
| 6,844,561 B1 | | 1/2005 | Rusnak et al. |
| 7,521,007 B1 | | 4/2009 | Jarvinen et al. |
| 2004/0141578 A1 | | 7/2004 | Enfinger |
| 2006/0243858 A1 | | 11/2006 | Anghileri |
| 2007/0002996 A1 | | 1/2007 | Neifeld |
| 2008/0069289 A1 | | 3/2008 | Peterson |
| 2008/0123795 A1 | | 5/2008 | Hyde et al. |
| 2008/0123796 A1 | | 5/2008 | Hyde et al. |
| 2008/0123797 A1 | | 5/2008 | Hyde et al. |
| 2008/0152069 A1 | | 6/2008 | Aktas et al. |
| 2008/0174115 A1 | | 7/2008 | Lambirth |
| 2008/0232535 A1 | | 9/2008 | Ahlfeld et al. |
| 2008/0240333 A1 | | 10/2008 | Ahlfeld et al. |
| 2009/0080587 A1 | | 3/2009 | Ahlfeld et al. |
| 2009/0080588 A1 | | 3/2009 | Ahlfeld et al. |

OTHER PUBLICATIONS

U.S. Appl. No. 12/460,160, filed Jul. 13, 2009, Charles E. Ahlfeld et al.

U.S. Appl. No. 12/460,159, filed Jul. 13, 2009, Charles E. Ahlfeld et al.

U.S. Appl. No. 12/460,157, filed Jul. 13, 2009, Charles E. Ahlfeld et al.

Brown, L.C.; "Direct Energy Conversion Fission Reactor for the period Dec. 1, 1999 through Feb. 29, 2000"; Report Prepared by General Atomics under Nuclear Energy Research Initiative (NERI) Program DE-FG03-99SF21893 for the U.S. Department of Energy; bearing a date of Mar. 2000; 8 pages total (incl. cover sheet, disclaimer, title page and pp. 1-5); General Atomics; Mar. 2000.

Teller, Edward; Ishikawa, Muriel; Wood, Jr., Lowell; Hyde, Roderick; Nuckolls, John. "Completely Automated Nuclear Reactors for Long-Term Operation II: Toward a Concept-Level Point-Design of a High-Temperature, Gas-Cooled Central Power Station System"; University of California Lawrence Livermore National Laboratory Publication UCRL-JC-122708 Pt 2; submitted to the 1996 International Conference on Emerging Nuclear Energy Systems (ICENES '96), Obninsk, Russian Federation on Jun. 24-28, 1996.

Teller, Edward; Ishikawa, Muriel; Wood, Jr., Lowell; Hyde, Roderick; Nuckolls, John. "Completely Automated Nuclear Power Reactors for Long-Term Operation: III. Enabling Technology for Large-Scale, Low-Risk, Affordable Nuclear Electricity"; University of California Lawrence Livermore National Laboratory Publication UCRL-JRNL-122708; presented at the Jul. 2003 Workshop of the Aspen Global Change Institute.

PCT International Search Report; International App. No. PCT/US10/01130; Oct. 25, 2010; pp. 1-2.

PCT International Search Report; International App. No. PCT/US10/01155; Oct. 25, 2010; pp. 1-2.

PCT International Search Report; International App. No. PCT/US10/01129; Nov. 8, 2010; pp. 1-2.

Hyde et al.; "Nuclear Fission Power for $21^{st}$ Century Needs: Enabling Technologies for Large-Scale, Low-Risk, Affordable Nuclear Electricity"; Progress in Nuclear Energy; 2008; pp. 82-91; vol. 50; Elsevier Ltd.

* cited by examiner

NUCLEAR FISSION REACTOR, FLOW CONTROL ASSEMBLY, METHODS THEREFOR AND A FLOW CONTROL ASSEMBLY SYSTEM

BACKGROUND

This application generally relates to processes involving induced nuclear reactions and structures which implement such processes including orifices or fluid control means at inlet, outlet or coolant channels and more particularly relates to a nuclear fission reactor, flow control assembly, methods therefor and a flow control assembly system.

It is known that, in an operating nuclear fission reactor, neutrons of a known energy are absorbed by nuclides having a high atomic mass. The resulting compound nucleus separates into fission products that include two lower atomic mass fission fragments and also decay products. Nuclides known to undergo such fission by neutrons of all energies include uranium-233, uranium-235 and plutonium-239, which are fissile nuclides. For example, thermal neutrons having a kinetic energy of 0.0253 eV (electron volts) can be used to fission U-235 nuclei. Fission of thorium-232 and uranium-238, which are fertile nuclides, will not undergo induced fission, except with fast neutrons that have a kinetic energy of at least 1 MeV (million electron volts). The total kinetic energy released from each fission event is about 200 MeV. This kinetic energy is eventually transformed into heat.

In nuclear reactors, the afore-mentioned fissile and/or fertile material is typically housed in a plurality of closely packed together fuel assemblies, which define a nuclear reactor core. It has been observed that heat build-up may cause such closely packed together fuel assemblies and other reactor components to undergo differential thermal expansion leading to misalignment of the reactor core components. Heat build-up may also contribute to fuel rod creep that can increase risk of fuel rod swelling and fuel rod cladding rupture during reactor operation. This may increase the risk that fuel pellets might crack and/or fuel rods might bow. Fuel pellet cracking may precede pellet-cladding failure mechanisms, such as pellet-clad mechanical interaction, and lead to fission gas release. Fission gas release can produce higher than normal radiation levels in the reactor core. Fuel rod bow may lead to obstruction of coolant flow channels.

Attempts have been made to provide adequate coolant flow to nuclear reactor fuel assemblies. U.S. Pat. No. 4,505,877, issued Mar. 19, 1985 in the name of Jacky Rion and titled "Device for Regulating the Flow of a Fluid", discloses a device comprising a series of gratings perpendicular to the fluid flow and that change direction of the fluid flow. According to the Rion patent, this device is intended for use in the regulation of the direction of a cooling fluid circulating in the base of a liquid metal-cooled nuclear reactor assembly. The device is directed toward bringing about a given pressure drop for a given nominal flow rate and a given down-stream pressure, without producing cavitation.

Another attempt to provide adequate coolant flow to nuclear reactor fuel assemblies is disclosed in U.S. Pat. No. 5,066,453, issued Nov. 19, 1991 in the names of Neil G. Heppenstall et al. and titled "Nuclear Fuel Assembly Coolant Control." This patent discloses an apparatus for controlling the flow of coolant through a nuclear fuel assembly, the apparatus comprising a variable flow restrictor locatable in the fuel assembly, means responsive to neutron radiation at a location in the fuel assembly in a manner to cause neutron induced growth of the responsive means, and a connecting means for connecting the neutron radiation responsive means to the variable flow restrictor for controlling the flow of coolant through the fuel assembly. The variable flow restrictor comprises a plurality of longitudinally aligned ducts, and a plugging means having an array of plugging members locatable in some of the ducts, the plugging members being of different lengths so that longitudinal displacement of the plugging means by the connecting means progressively opens or closes some of the ducts.

Yet another attempt to provide adequate coolant flow to nuclear reactor fuel assemblies is disclosed in U.S. Pat. No. 5,198,185 issued Mar. 30, 1993 in the name of John P. Church and titled "Nuclear Reactor Flow Control Method and Apparatus." This patent appears to disclose a coolant flow distribution that results in improved flow during accident conditions without degrading flow during nominal conditions. According to this patent, a universal sleeve housing surrounds a fuel element. The universal sleeve housing has a plurality of holes to allow passage of coolant. A variation is imposed in the number and size of holes in the sleeve housings from one sleeve to another to increase amount of coolant flowing to the fuel in the center of the core and decrease, relatively, flow to the peripheral fuel. Also, according to this patent, varying the number of holes and size of holes can meet a particular power shape across the core.

SUMMARY

According to an aspect of this disclosure, there is provided a nuclear fission reactor, comprising a nuclear fission module configured to have at least a portion of a traveling burn wave at a location relative to the nuclear fission module; and a flow control assembly configured to be coupled to the nuclear fission module and configured to modulate flow of a fluid in response to the traveling burn wave at the location relative to the nuclear fission module.

According to an another aspect of the disclosure there is provided a nuclear fission reactor, comprising a heat-generating nuclear fission fuel assembly configured to have at least a portion of a traveling burn wave at a location relative to the nuclear fission fuel assembly; and a flow control assembly configured to be coupled to the nuclear fission fuel assembly and capable of modulating flow of a fluid stream in response to the traveling burn wave at the location relative to the nuclear fission fuel assembly.

According to yet another aspect of the disclosure there is provided, for use in a traveling wave nuclear fission reactor, a flow control assembly, comprising a flow regulator subassembly.

According to another aspect of the disclosure there is provided, for use in a nuclear fission reactor, a flow control assembly, comprising a flow regulator subassembly, the flow regulator subassembly including a first sleeve having a first hole; a second sleeve configured to be inserted into the first sleeve, the second sleeve having a second hole alignable with the first hole, the first sleeve being configured to rotate for bringing the first hole into alignment with the second hole; and a carriage subassembly configured to be coupled to the flow regulator subassembly.

According to still another aspect of the disclosure there is provided, for use in a traveling wave nuclear fission reactor, a flow control assembly configured to be connected to a fuel assembly, comprising an adjustable flow regulator subassembly configured to be disposed in a fluid stream.

According to a further aspect of the disclosure there is provided, for use in a nuclear fission reactor, a flow control assembly configured to be connected to a fuel assembly, comprising an adjustable flow regulator subassembly configured to be disposed in a fluid stream, the adjustable flow regulator subassembly including a first sleeve having a first hole; and a second sleeve configured to be inserted into the first sleeve, the second sleeve having a second hole, the first hole being progressively alignable with the second hole, whereby a variable amount of the fluid stream flows through the first hole and the second hole as the first hole progressively aligns with the second hole, the first sleeve being configured to axially translate relative to the second sleeve for aligning the second hole with the first hole.

According to an additional aspect of the disclosure there is provided, for use in a nuclear fission reactor, a flow control assembly configured to be connected to a fuel assembly, comprising an adjustable flow regulator subassembly; and a carriage subassembly coupled to the adjustable flow regulator subassembly for adjusting the adjustable flow regulator subassembly.

According to another aspect of the disclosure there is provided, for use in a nuclear fission reactor, a flow control assembly couplable to a selected one of a plurality of nuclear fission fuel assemblies arranged for disposal in the nuclear fission reactor, comprising an adjustable flow regulator subassembly for modifying flow of a fluid stream flowing through the selected one of the plurality of nuclear fission fuel assemblies, the adjustable flow regulator subassembly including an outer sleeve having a plurality of first holes; an inner sleeve inserted into the outer sleeve, the inner sleeve having a plurality of second holes, the first holes being progressively alignable with the second holes for defining a variable flow area, whereby a variable amount of the fluid stream flows through the first holes and the second holes as the first holes and the second holes progressively align to define the variable flow area; and a carriage subassembly coupled to the adjustable flow regulator subassembly for adjusting the adjustable flow regulator subassembly.

According to a further aspect of the disclosure there is provided a method of operating a nuclear fission reactor, comprising producing at least a portion of a traveling burn wave at a location relative to a nuclear fission module; and operating a flow control assembly coupled to the nuclear fission module to modulate flow of a fluid in response to the location relative to the nuclear fission module.

According to another aspect of the disclosure there is provided a method of assembling a flow control assembly for use in a traveling wave nuclear fission reactor, comprising receiving a flow regulator subassembly.

According to another aspect of the disclosure there is provided a method of assembling a flow control assembly for use in a traveling wave nuclear fission reactor, comprising receiving a carriage subassembly.

According to another aspect of the disclosure there is provided a method of assembling a flow control assembly for use in a nuclear fission reactor, comprising receiving a first sleeve having a first hole; inserting a second sleeve into the first sleeve, the second sleeve having a second hole alignable with the first hole, the first sleeve being configured to rotate for axially translating the first hole into alignment with the second hole; and coupling a carriage assembly to the flow regulator subassembly.

According to an additional aspect of the disclosure there is provided, for use in a traveling wave nuclear fission reactor, a flow control assembly system, comprising a flow regulator subassembly.

According to another aspect of the disclosure there is provided, for use in a nuclear fission reactor, a flow control assembly system, comprising a flow regulator subassembly, the flow regulator subassembly including a first sleeve having a first hole; a second sleeve configured to be inserted into the first sleeve, the second sleeve having a second hole alignable with the first hole, the first sleeve being configured to rotate for axially translating the first hole into alignment with the second hole; and a carriage subassembly configured to be coupled to the flow regulator subassembly.

According to yet another aspect of the disclosure there is provided, for use in a nuclear fission reactor, a flow control assembly system configured to be connected to a nuclear fission fuel assembly, comprising an adjustable flow regulator subassembly configured to be disposed in a fluid stream.

According to another aspect of the disclosure there is provided, for use in a nuclear fission reactor, a flow control assembly system couplable to a selected one of a plurality of nuclear fission fuel assemblies disposed in the nuclear fission reactor, comprising an adjustable flow regulator subassembly for controlling flow of a fluid stream flowing through the selected one of the plurality of nuclear fission fuel assemblies, the adjustable flow regulator subassembly including an outer sleeve having a plurality of first holes; an inner sleeve inserted into the outer sleeve, the inner sleeve having a plurality of second holes, the first holes being progressively alignable with the second holes for defining a variable flow area, whereby a variable amount of the fluid stream flows through the first holes and the second holes as the first holes and the second holes progressively align to define the variable flow area; and a carriage subassembly coupled to the adjustable flow regulator subassembly for adjusting the adjustable flow regulator subassembly.

A feature of the present disclosure is the provision of a flow control assembly capable of controlling flow of a fluid in response to location of a burn wave.

Another feature of the present disclosure is the provision of a flow control assembly comprising a flow regulator subassembly including an outer sleeve and an inner sleeve, the outer sleeve having a first hole and the inner sleeve having a second hole alignable with the first hole, whereby an amount of a fluid stream flows through the first hole and the second hole as the second hole aligns with the first hole.

An additional feature of the present disclosure is the provision of a carriage subassembly configured to be coupled to the flow regulator subassembly for carrying and configuring the flow regulator subassembly.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

DETAILED DESCRIPTION

Figure 1:
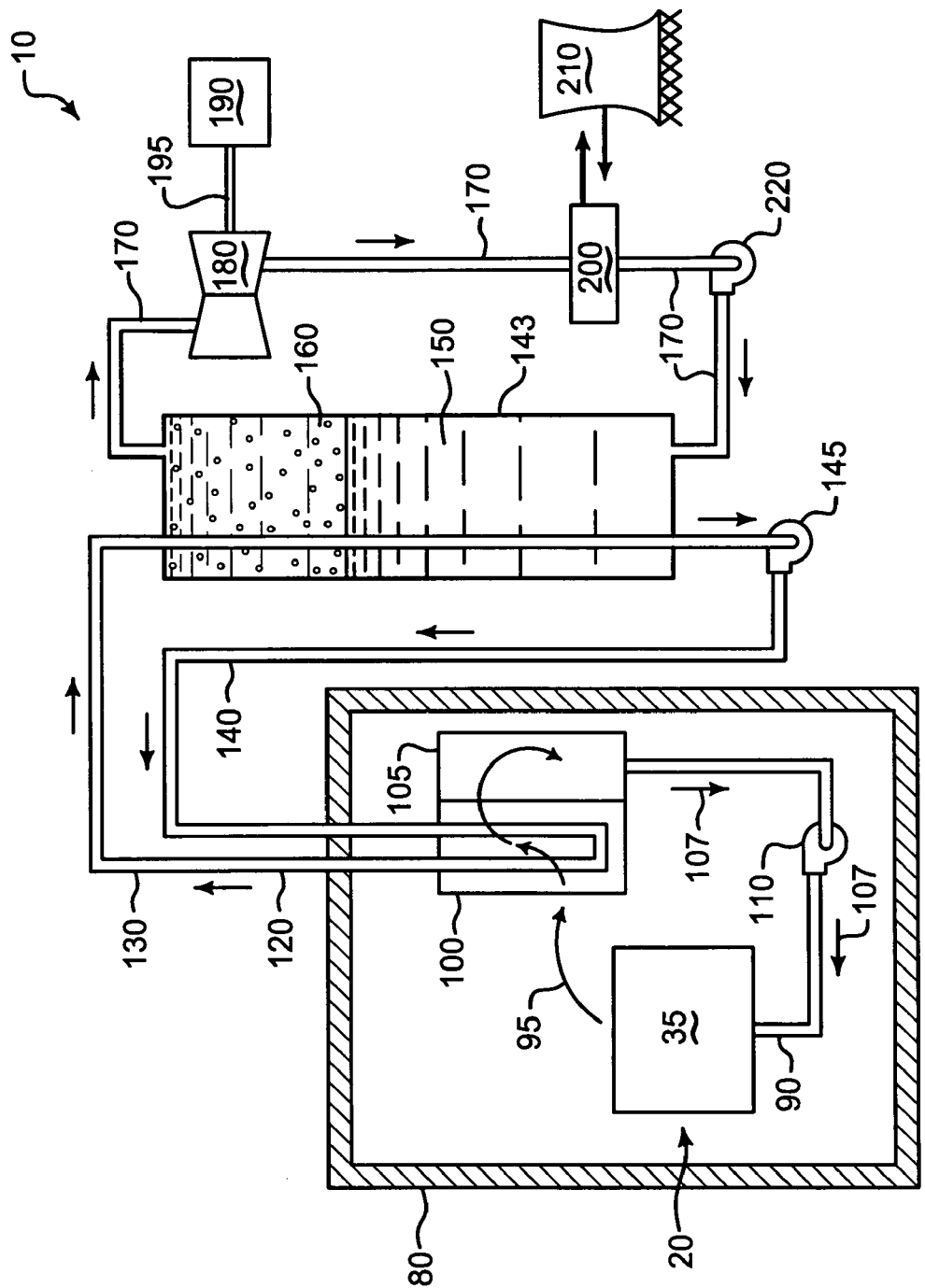
FIG. 1 is a schematic representation of a nuclear fission reactor.
Figure 1A:
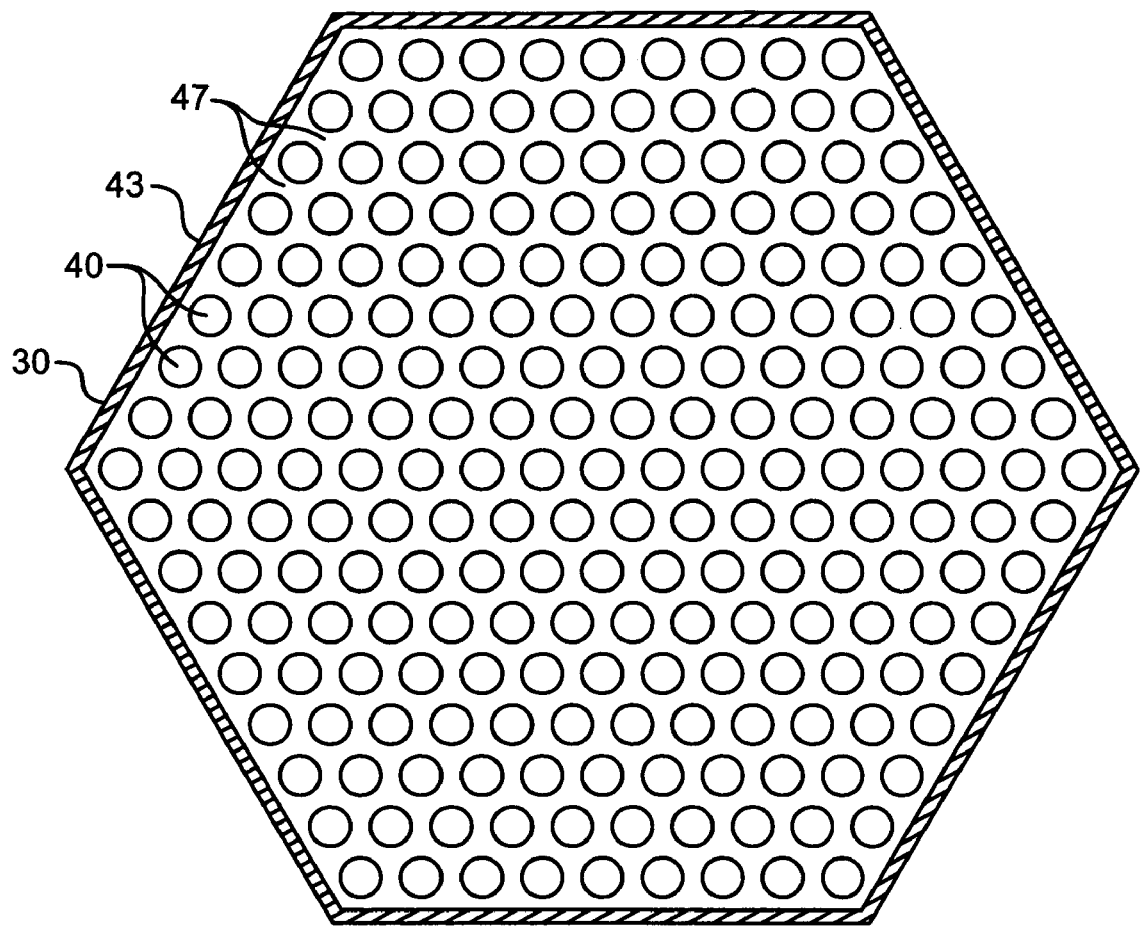
FIG. 1A is a view in transverse cross section of a nuclear fuel assembly or nuclear fission module belonging to the nuclear fission reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to," "configurable to," "operable/operative to," "adapted/adaptable," "able to," "conformable/conformed to," etc. can generally encompass active-state components and/or inactive-state components and/or standby-state components, unless context requires otherwise.

With respect to the present disclosure and as previously mentioned, in many cases, for every neutron that is absorbed in a fissile nuclide, more than one neutron is liberated until the fissile nuclei are depleted. This phenomenon is used in a commercial nuclear reactor to produce continuous heat that, in turn, is used to generate electricity.

However, heat damage to reactor structural materials may occur due to "peak" temperature (i.e., hot channel peaking factor) which occurs due to uneven neutron flux distribution in the reactor core. As well known in the art, neutron flux is defined as the number of neutrons passing through a unit area per unit time. This peak temperature is, in turn, due to heterogeneous control rod/fuel rod distribution. The heat damage may occur if the peak temperature exceeds material limits. In addition, reactors operating in the fast neutron spectrum may be designed to have a fertile fuel "breeding blanket" material present at the core periphery. Such reactors will tend to breed fuel into the breeding blanket material through neutron absorption. This results in an increasing power output in the reactor periphery as the reactor approaches the end of a fuel cycle. Flow of coolant through the peripheral assemblies at the beginning of a reactor fuel cycle can maintain a safe operating temperature and account for the increase in power which will occur as burn-up increases during the fuel cycle.

A "reactivity" (i.e., change in reactor power) is produced because of fuel "burnup". Burn-up is typically defined as the amount of energy generated per unit mass of fuel and is usually expressed in units of megawatt-days per metric tonne of heavy metal (MWd/MTHM) or gigawatt-days per metric tonne of heavy metal (GWd/MTHM). More specifically, reactivity change is related to the relative ability of the reactor to produce more or less neutrons than the exact amount to sustain a critical chain reaction. Responsiveness of a reactor is typically characterized as the time derivative of a reactivity change causing the reactor to increase or decrease in power exponentially.

In this regard, control rods made of neutron absorbing material are typically used to adjust and control the changing reactivity. Such control rods are reciprocated in and out of the reactor core to variably control neutron absorption and thus the neutron flux level and reactivity in the reactor core. The neutron flux level is depressed in the vicinity of the control rod and potentially higher in areas remote from the control rod. Thus, the neutron flux is not uniform across the reactor core. This results in higher fuel burnup in those areas of higher neutron flux. Also, it may be appreciated by a person of ordinary skill in the art of nuclear power production, that neutron flux and power density variations are due to many factors. Proximity to a control rod may or may not be the primary factor. For example, the neutron flux typically drops significantly at core boundaries with no nearby control rod. These effects, in turn, may cause overheating or peak temperatures in those areas of higher neutron flux. Such peak temperatures may undesirably reduce the operational life of structures subjected to such peak temperatures by altering the mechanical properties of the structures. Also, reactor power density, which is proportional to the product of the neutron flux and the fissile fuel concentration, is limited by the ability of core structural materials to withstand such peak temperatures without damage.

Therefore, referring to FIG. 1, by way of example only and not by way of limitation, there is shown a nuclear fission reactor, generally referred to as 10, that addresses the concerns recited hereinabove. As described more fully hereinbelow, reactor 10 may be a traveling wave nuclear fission reactor. Nuclear fission reactor 10 generates electricity that is transmitted over a plurality of transmission lines (not shown) to users of the electricity. Reactor 10 alternatively may be used to conduct tests, such as tests to determine effects of temperature on reactor materials.

Referring to FIGS. 1, 1A, 1B and 2, reactor 10 comprises a nuclear fission reactor core, generally referred to as 20, that includes a plurality of nuclear fission fuel assemblies or, as also referred to herein, nuclear fission modules 30. Nuclear fission reactor core 20 is sealingly housed within a reactor core enclosure 35. By way of example only and not by way of limitation, each nuclear fission module 30 may form a hexagonally-shaped structure in transverse cross-section, as shown, so that more nuclear fission modules 30 may be closely packed together within reactor core 20, as compared to most other shapes for nuclear fission module 30, such as cylindrical or spherical shapes. Each nuclear fission module 30 comprises a plurality of fuel rods 40 for generating heat due to the aforementioned nuclear fission chain reaction process. Fuel rods 40 may be surrounded by a fuel rod canister 43, if desired, for adding structural rigidity to nuclear fission modules 30 and for segregating nuclear fission modules 30 one from another. Segregating nuclear fission modules 30 one from another avoids transverse coolant cross flow between adjacent nuclear fission modules 30. Avoiding transverse coolant cross flow prevents transverse vibration of nuclear fission modules 30. Such transverse vibration might otherwise increase risk of damage to fuel rods 40. In addition, segregating nuclear fission modules 30 one from another allows control of coolant flow on an individual module-by-module basis, as described more fully hereinbelow. Controlling coolant flow to individual, preselected nuclear fission modules 30 efficiently manages coolant flow within reactor core 20, such as directing coolant flow substantially according to the nonuniform temperature distribution in reactor core 20. Canister 43 may include an annular shoulder portion 46 (see FIG. 7) for resting bundled together fuel rods 40 thereon. The coolant may have an average nominal volumetric flow rate of approximately 5.5 m$^3$/sec (i.e., approximately 194 cubic ft$^3$/sec) and an average nominal velocity of approximately 2.3 m/sec (i.e., approximately 7.55 ft/sec) in the case of an exemplary sodium cooled reactor during normal operation. Fuel rods 40 are adjacent one to another and define a coolant flow channel 47 (see FIG. 7) therebetween for allowing flow of coolant along the exterior of fuel rods 40. Fuel rods 40 are bundled together so as to form the previously mentioned hexagonal nuclear fission modules 30. Although fuel rods 40 are adjacent to each other, fuel rods 40 are nonetheless maintained in a spaced-apart relationship by a wire wrapper 50 (see FIG. 7) that extends spirally along the length of each fuel rod 40, according to techniques known by persons of skill in the art of nuclear power reactor design.

Figure 1B:
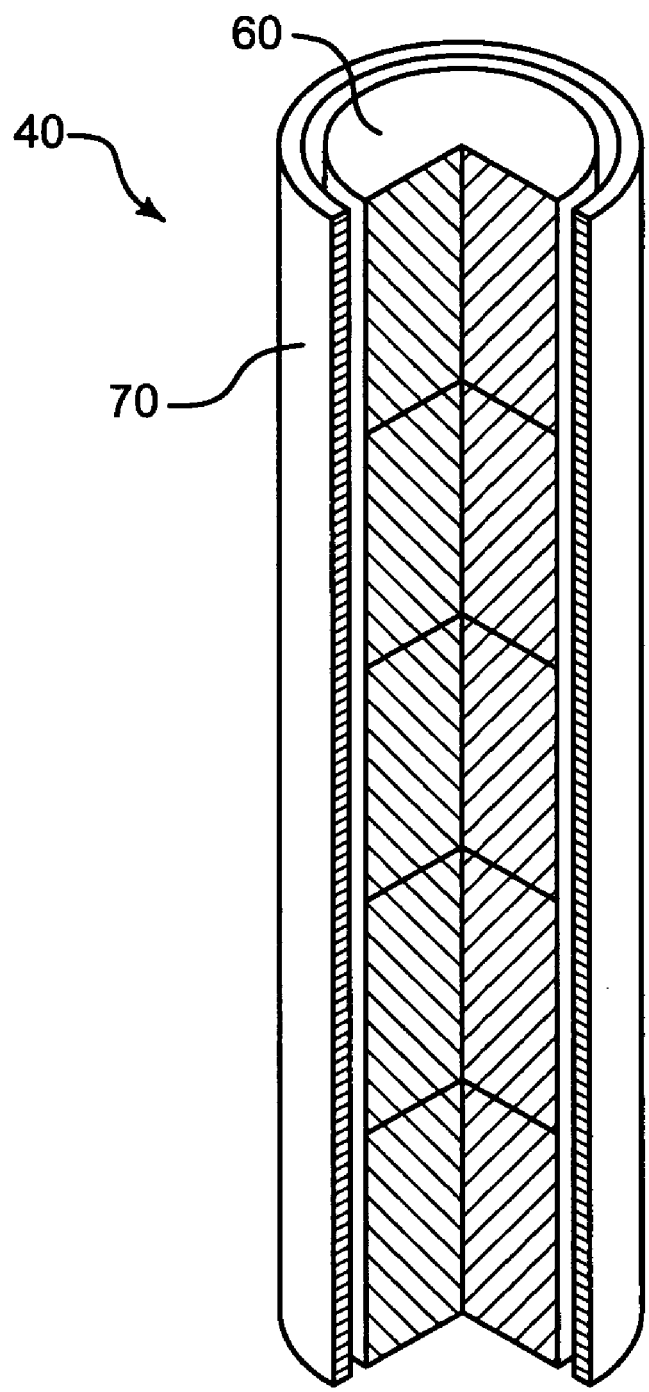
FIG. 1B is a representation in perspective and partial vertical section of a nuclear fuel rod belonging to the nuclear fission module.

With particular reference to FIG. 1B, each fuel rod 40 has a plurality of nuclear fuel pellets 60 stacked end-to-end therein, which nuclear fuel pellets 60 are sealingly surrounded by a fuel rod cladding material 70. Nuclear fuel pellets 60 comprise the afore-mentioned fissile nuclide, such as uranium-235, uranium-233 or plutonium-239. Alternatively, nuclear fuel pellets 60 may comprise a fertile nuclide, such as thorium-232 and/or uranium-238 which will be transmuted during the fission process into the fissile nuclides mentioned immediately hereinabove. A further alternative is that nuclear fuel pellets 60 may comprise a predetermined mixture of fissile and fertile nuclides. More specifically, by way of example only and not by way of limitation, nuclear fuel pellets 60 may be made from an oxide selected from the group consisting essentially of uranium monoxide (UO), uranium dioxide ($UO_2$), thorium dioxide ($ThO_2$) (also referred to as thorium oxide), uranium trioxide ($UO_3$), uranium oxide-plutonium oxide (UO—PuO), triuranium octoxide ($U_3O_8$) and mixtures thereof. Alternatively, nuclear fuel pellets 60 may substantially comprise uranium either alloyed or unalloyed with other metals, such as, but not limited to, zirconium or thorium metal. As yet another alternative, nuclear fuel pellets 60 may substantially comprise a carbide of uranium ($UC_x$) or a carbide of thorium ($ThC_x$). For example, nuclear fuel pellets 60 may be made from a carbide selected from the group consisting essentially of uranium monocarbide (UC), uranium dicarbide ($UC_2$), uranium sesquicarbide ($U_2C_3$), thorium dicarbide ($ThC_2$), thorium carbide (ThC) and mixtures thereof. As another non-limiting example, nuclear fuel pellets 60 may be made from a nitride selected from the group consisting essentially of uranium nitride ($U_3N_2$), uranium nitride-zirconium nitride ($U_3N_2Zr_3N_4$), uranium-plutonium nitride ((U—Pu)N), thorium nitride (ThN), uranium-zirconium alloy (UZr) and mixtures thereof. Fuel rod cladding material 70, which sealingly surrounds the stack of nuclear fuel pellets 60, may be a suitable zirconium alloy, such as ZIRCOLOY™ (trademark of the Westinghouse Electric Corporation), which has known resistance to corrosion and cracking. Cladding 70 may be made from other materials, as well, such as ferritic martensitic steels.

As best seen in FIG. 1, reactor core 20 is disposed within a reactor pressure vessel 80 for preventing leakage of radioactive particles, gasses or liquids from reactor core 20 to the surrounding biosphere. Pressure vessel 80 may be steel, concrete or other material of suitable size and thickness to reduce risk of such radiation leakage and to support required pressure loads. In addition, there may be a containment vessel (not shown) sealingly surrounding parts of reactor 10 for added assurance that leakage of radioactive particles, gasses or liquids from reactor core 20 to the surrounding biosphere is prevented.

Referring again to FIG. 1, a primary loop coolant pipe 90 is coupled to reactor core 20 for allowing a suitable coolant to flow through reactor core 20 in order to cool reactor core 20. Primary loop coolant pipe 90 may be made from any suitable material, such as stainless steel. It may be appreciated that, if desired, primary coolant loop pipe 90 may be made not only from ferrous alloys, but also from non-ferrous alloys, zirconium-based alloys or other structural materials or composites. The coolant carried by primary loop coolant pipe 90 may be a noble gas or mixture of noble gases. Alternatively, the coolant may be other fluids such as "light" water ($H_2O$) or gaseous or supercritical carbon dioxide ($CO_2$). As another example, the coolant may be a liquid metal. Such a liquid metal may be a lead (Pb) alloy, such as lead-bismuth (Pb—Bi). Further, the coolant may be an organic-based coolant, such as a polyphenyl or a fluorocarbon. In the exemplary embodiment disclosed herein, the coolant may suitably be a liquid sodium (Na) metal or sodium metal mixture, such as sodium-potassium (Na—K). As an example and depending on the particular reactor core design and operating history, normal operating temperature of a sodium-cooled reactor core may be relatively high. For instance, in the case of a 500 to 1,500 MWe sodium-cooled reactor with mixed uranium-plutonium oxide fuel, the reactor core outlet temperature during normal operation may range from approximately 510° Celsius (i.e., 950° Fahrenheit) to approximately 550° Celsius (i.e., 1,020° Fahrenheit). On the other hand, during a LOCA (Loss Of Coolant Accident) or LOFTA (Loss of Flow Transient Accident) peak fuel cladding temperatures may reach about 600° Celsius (i.e. 1,110° Fahrenheit) or more, depending on reactor core design and operating history. Moreover, decay heat build-up during post-LOCA or post-LOFTA scenarios and also during suspension of reactor operations may produce unacceptable heat accumulation. In some cases, therefore, it is appropriate to control coolant flow to reactor core 20 during both normal operation and post accident scenarios.

Moreover, the temperature profile in reactor core 20 varies as a function of location. In this regard, the temperature distribution in reactor core 20 may closely follow the power density spatial distribution in reactor core 20. It is known that the power density near the center of reactor core 20 is generally higher than near the periphery of reactor core 20, in the absence of a suitable neutron reflector or neutron breeding "blanket" surrounding the periphery of reactor core 20. Thus, it is to be expected that coolant flow parameters for nuclear fission modules 30 near the periphery of reactor core 20 would be less than coolant flow parameters for nuclear fission modules 30 near the center of reactor core 20, especially at the beginning of core life. Hence, in this case, it would be unnecessary to provide the same or uniform coolant mass flow rate to each nuclear fission module 30. As described in detail hereinbelow, a technique is provided to vary coolant flow to individual nuclear fission modules 30 depending on location of nuclear fission modules 30 in reactor core 20 and desired reactor operating results.

Still referring to FIG. 1, the heat-bearing coolant generated by reactor core 20 flows along a coolant flow path 95 to an intermediate heat exchanger 100, for reasons described presently. The coolant flowing along coolant flow path 95 flows through intermediate heat exchanger 100 and into a plenum volume 105 associated with intermediate heat exchanger 100. After flowing into plenum volume 105, the coolant continues through primary loop pipe 90, as shown by a plurality of arrows 107. It may be appreciated that the coolant leaving plenum volume 105 has been cooled due to the heat transfer occurring in intermediate heat exchanger 100. A first pump 110 is coupled to primary loop pipe 90, and is in fluid communication with the reactor coolant carried by primary loop pipe 90, for pumping the reactor coolant through primary loop pipe 90, through reactor core 20, along coolant flow path 95, into intermediate heat exchanger 100, and into plenum volume 105.

Referring again to FIG. 1, a secondary loop pipe 120 is provided for removing heat from intermediate heat exchanger 100. Secondary loop pipe 120 comprises a secondary "hot" leg pipe segment 130 and a secondary "cold" leg pipe segment 140. Secondary cold leg pipe segment 140 is integrally formed with secondary hot leg pipe segment 130 so as to form a closed loop that defines secondary loop pipe 120, as shown. Secondary loop pipe 120, which is defined by hot leg pipe segment 130 and cold leg pipe segment 140, contains a fluid, which suitably may be liquid sodium or a liquid sodium mixture. Secondary hot leg pipe segment 130 extends from intermediate heat exchanger 100 to a steam generator and superheater combination 143 (hereinafter referred to as "steam generator 143"), for reasons described momentarily. After passing through steam generator 143, the coolant flowing through secondary loop pipe 120 and exiting steam generator 143 is at a lower temperature than before entering steam generator 143 due to the heat transfer occurring within steam generator 143. After passing through steam generator 143, the coolant is pumped, such as by means of a second pump 145, along "cold" leg pipe segment 140, which terminates in intermediate heat exchanger 100. The manner in which steam generator 143 generates steam is generally described immediately hereinbelow.

Referring yet again to FIG. 1, disposed in steam generator 143 is a body of water 150 maintained at a predetermined temperature and pressure. The fluid flowing through secondary hot leg pipe segment 130 will surrender its heat to body of water 150, which is at a lower temperature than the fluid flowing through secondary hot leg pipe segment 130. As the fluid flowing through secondary hot leg pipe segment 130 surrenders its heat to body of water 150, a portion of body of water 150 will vaporize to steam 160 according to the temperature and pressure within steam generator 143. Steam 160 will then travel through a steam line 170 which has one end thereof in vapor communication with steam 160 and another end thereof in liquid communication with body of water 150. A rotatable turbine 180 is coupled to steam line 170, such that turbine 180 rotates as steam 160 passes therethrough. An electrical generator 190, which is connected to turbine 180, such as by a rotatable turbine shaft 195, generates electricity as turbine 180 rotates. In addition, a condenser 200 is coupled to steam line 170 and receives the steam passing through turbine 180. Condenser 200 condenses the steam to liquid water and passes any waste heat to a heat sink, such as a cooling tower 210, which is associated with reactor 10. The liquid water condensed by condenser 200 is pumped along steam line 170 from condenser 200 to steam generator 143 by means of a third pump 220 interposed between condenser 200 and steam generator 143.

Figure 2:
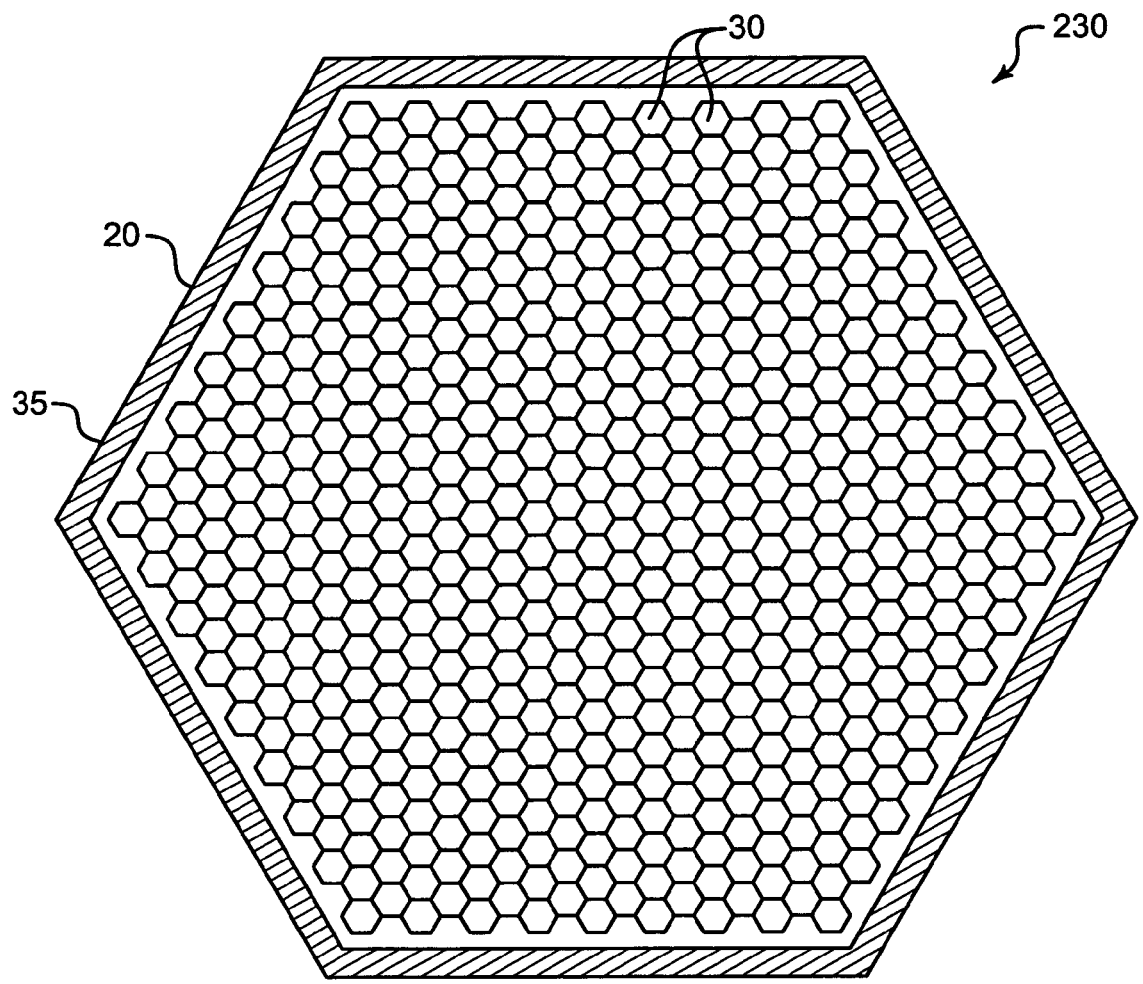
FIG. 2 is a view in transverse cross section of a hexagonally shaped nuclear fission reactor core having a plurality of hexagonally shaped nuclear fission modules disposed therein.
Figure 3:
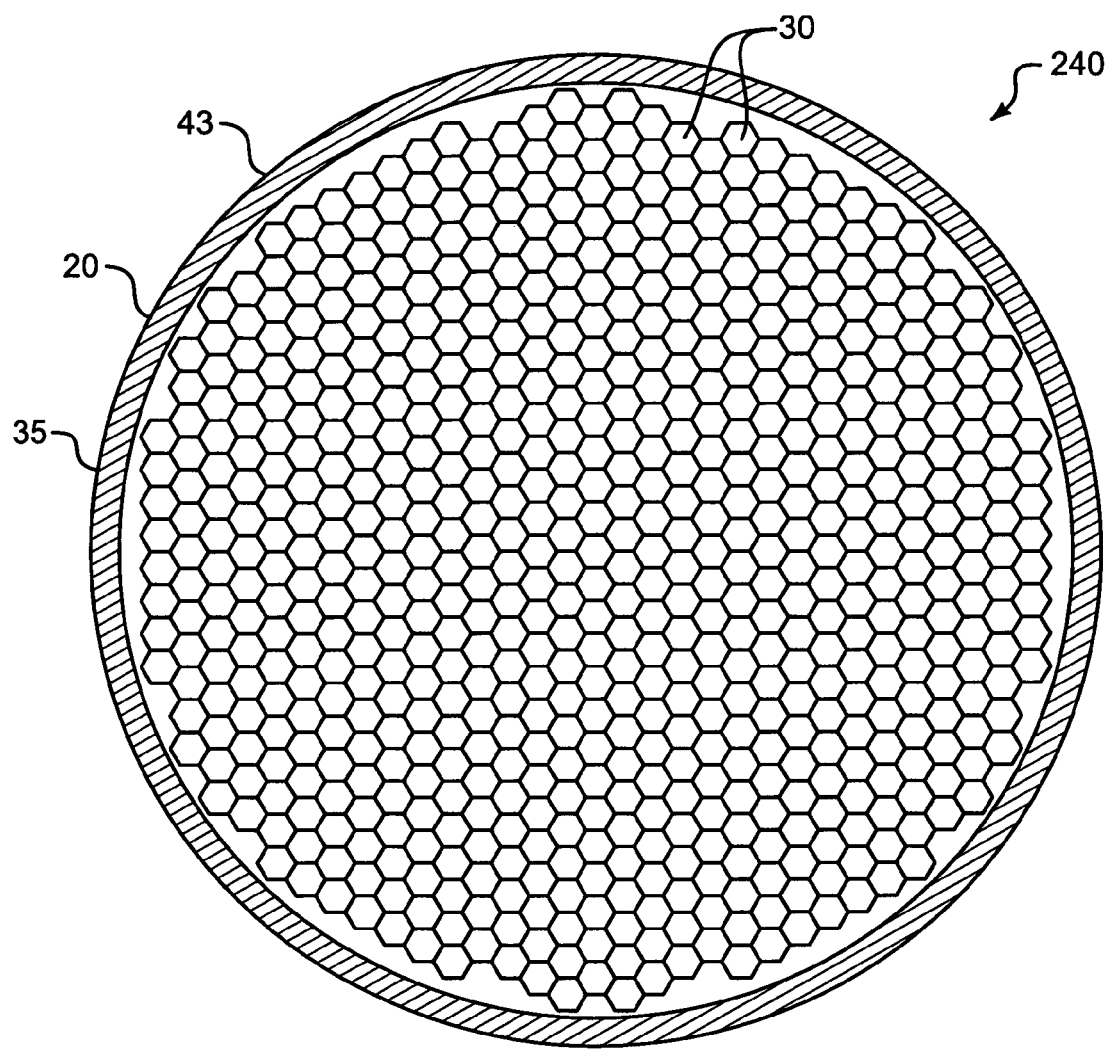
FIG. 3 is a view in transverse cross section of a cylindrically shaped reactor core having the plurality of hexagonally shaped nuclear fission modules disposed therein.
Figure 4:
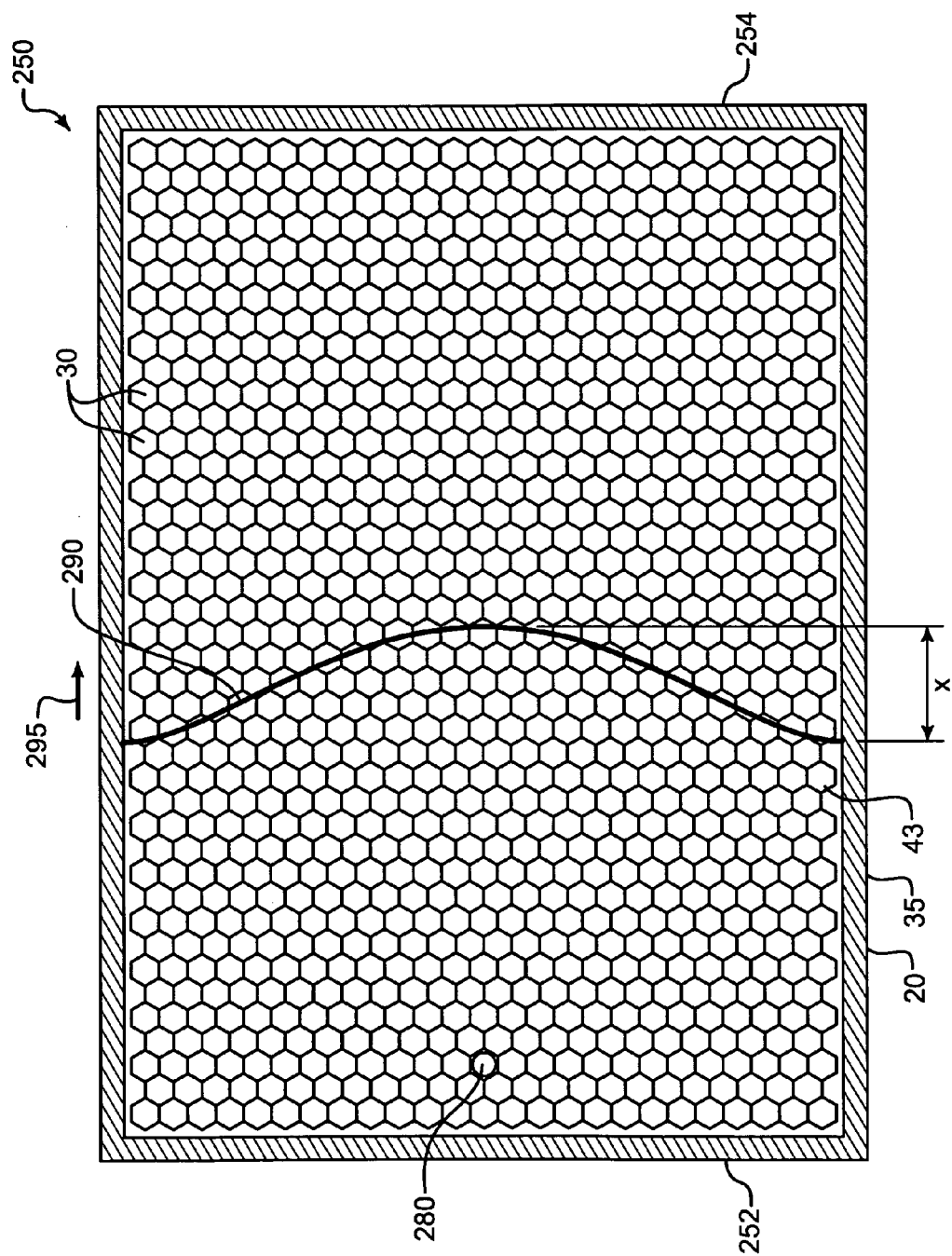
FIG. 4 is a view in transverse cross section of a parallelpiped-shaped reactor core, the reactor core having the plurality of the hexagonally shaped nuclear fission modules disposed therein and including at least a portion of a traveling burn wave having a width "x" at a location relative to the nuclear fission modules.

Turning now to FIGS. 2, 3 and 4, there are shown in transverse cross section, exemplary configurations for reactor core 20. In this regard, nuclear fission modules 30 may be arranged to define a hexagonally-shaped configuration, generally referred to as 230, for reactor core 20. Alternatively, nuclear fission modules 30 may be arranged to define a cylindrically-shaped configuration, generally referred to as 240, for reactor core 20. As another alternative, nuclear fission modules 30 may be arranged to define a parallelpiped-shaped configuration, generally referred to as 250, for reactor core 20. In this regard, reactor core 250 has a first end 252 and a second end 254 for reasons provided hereinbelow.

Figure 5:
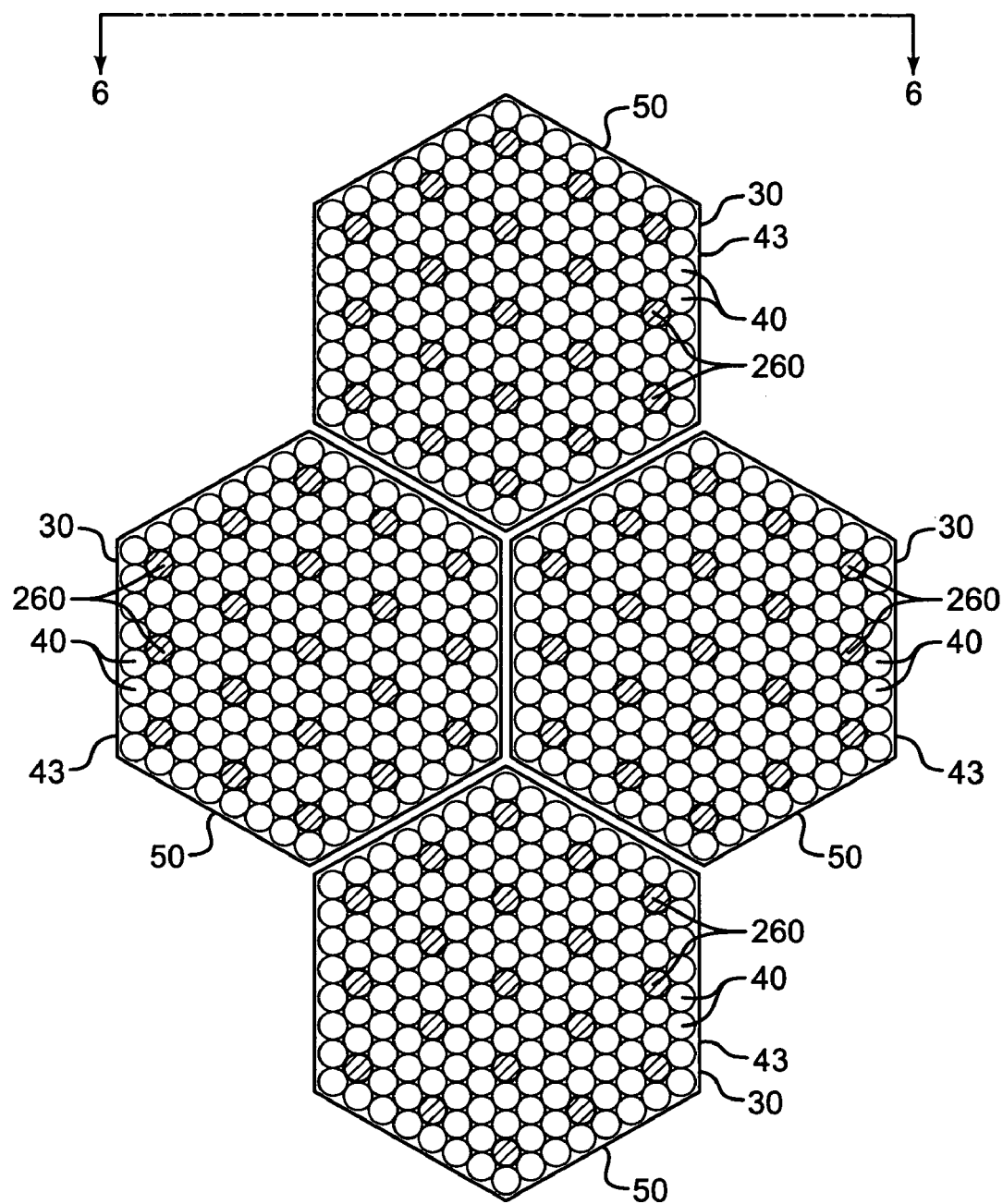
FIG. 5 is a view in transverse cross section of a plurality of adjacent hexagonally shaped nuclear fission modules, the nuclear fission modules having a plurality of longitudinally movable control rods disposed therein in addition to the fuel rods.

Referring to FIG. 5, regardless of the configuration chosen for reactor core 20, a plurality of spaced-apart, longitudinally extending and longitudinally movable control rods 260 are symmetrically disposed within a control rod guide tube or cladding (not shown), extending the length of a predetermined number of nuclear fission modules 30. Control rods 260, which are shown disposed in a predetermined number of the hexagonally-shaped nuclear fission modules 30, control the neutron fission reaction occurring in nuclear fission modules 30. Control rods 260 comprise a suitable neutron absorber material having an acceptably high neutron absorption cross-section. In this regard, the absorber material may be a metal or metalloid selected from the group consisting essentially of lithium, silver, indium, cadmium, boron, cobalt, hafnium, dysprosium, gadolinium, samarium, erbium, europium and mixtures thereof. Alternatively, the absorber material may be a compound or alloy selected from the group consisting essentially of silver-indium-cadmium, boron carbide, zirconium diboride, titanium diboride, hafnium diboride, gadolinium titanate, dysprosium titanate and mixtures thereof. Control rods 260 will controllably supply negative reactivity to reactor core 20. Thus, control rods 260 provide a reactivity management capability to reactor core 20. In other words, control rods 260 are capable of controlling or are configured to control the neutron flux profile across reactor core 20 and thus influence the temperature profile across reactor core 20.

Figure 5A:
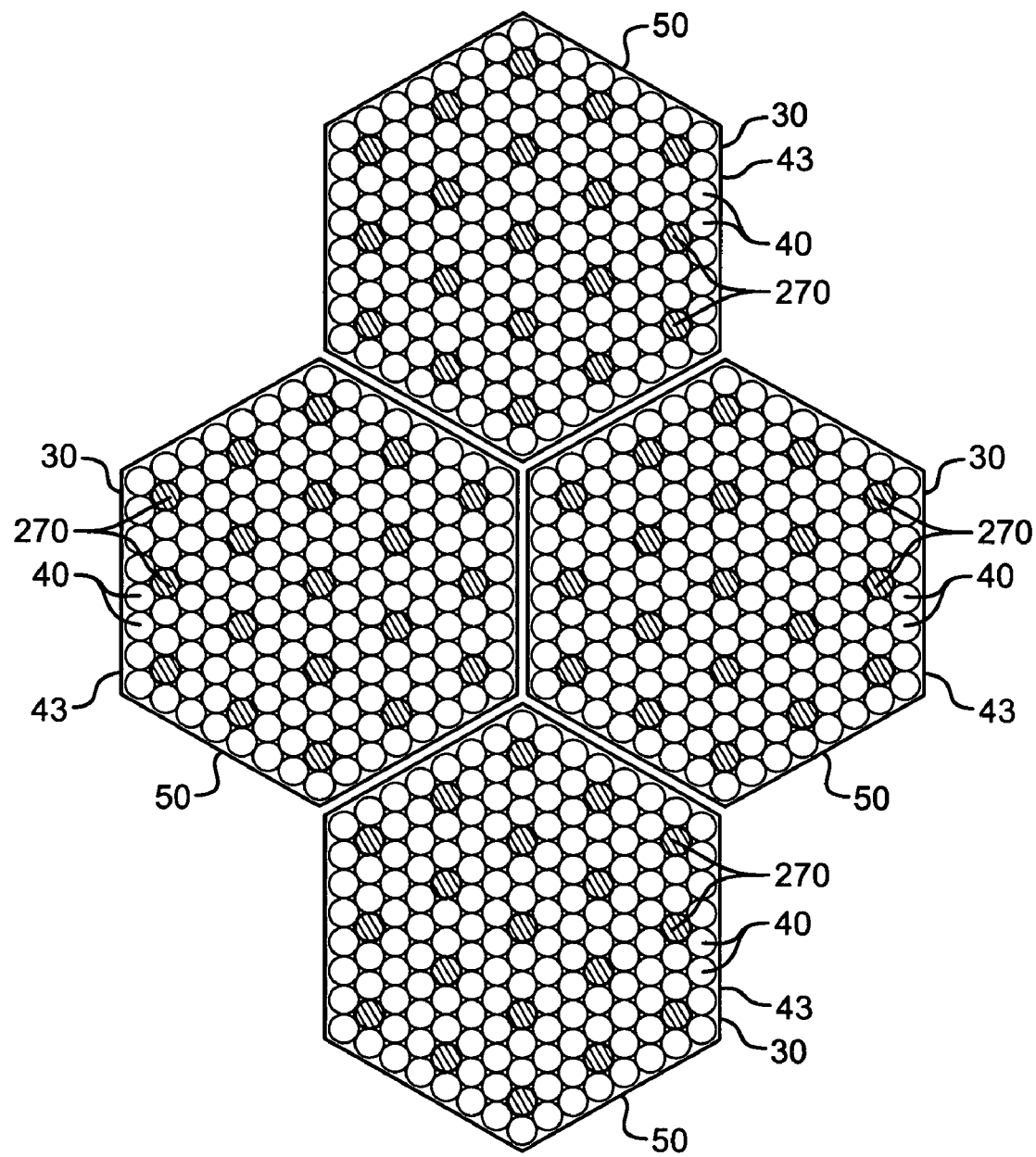
FIG. 5A is a view in transverse cross section of the plurality of adjacent hexagonally shaped nuclear fission modules, the nuclear fission modules having a plurality of fertile breeding rods disposed therein in addition to the fuel rods.
Figure 5B:
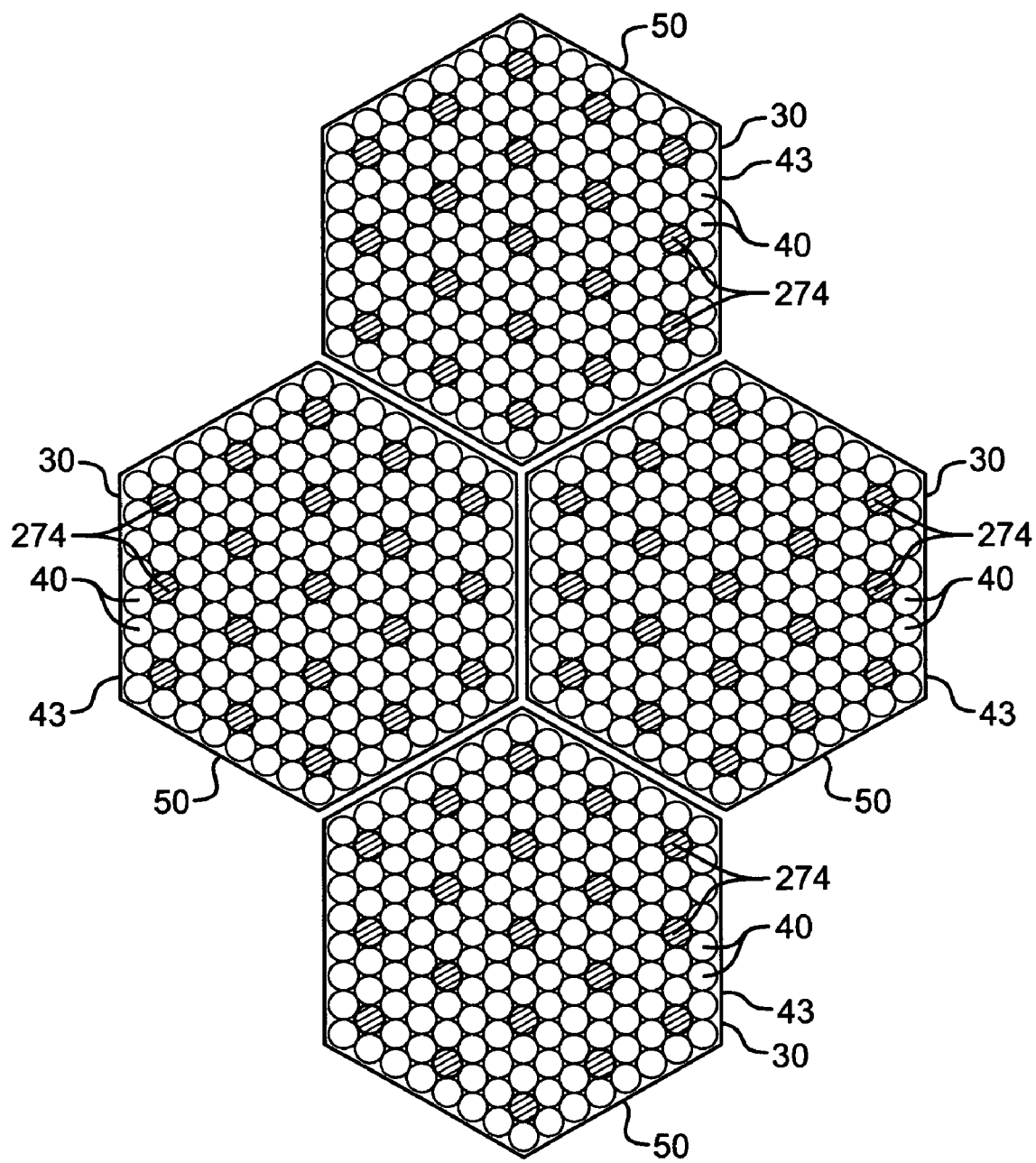
FIG. 5B is a view in transverse cross section of the plurality of adjacent hexagonally shaped nuclear fission modules, the nuclear fission modules having a plurality of neutron reflector rods disposed therein in addition to the fuel rods.

Referring to FIGS. 5A and 5B, alternative embodiments of nuclear fission module 30 are shown. It may be appreciated that nuclear fission module 30 need not be neutronically active. In other words, nuclear fission module 30 need not contain any fissile material. In this case, nuclear fission module 30 may be a purely reflective assembly or a purely fertile assembly or a combination of both. In this regard, nuclear fission module 30 may be a breeder nuclear fission module comprising nuclear breeding material or a reflective nuclear fission module comprising reflective material. Alternatively, in one embodiment, nuclear fission module 30 may contain fuel rods 40 in combination with nuclear breeding rods or reflector rods. For example, in FIG. 5A, a plurality of fertile nuclear breeding rods 270 are disposed in nuclear fission module 30 in combination with fuel rods 40. Control rods 260 may also be present. The fertile nuclear breeding material in nuclear breeding rods 270 may be thorium-232 and/or uranium-238, as mentioned hereinabove. In this manner, nuclear fission module 30 defines a fertile nuclear breeding assembly. In FIG. 5B, a plurality of neutron reflector rods 274 are disposed in nuclear fission module 30 in combination with fuel rods 40. Control rods 260 may also be present. The reflector material may be a material selected from the group consisting essentially of beryllium (Be), tungsten (W), vanadium (V), depleted uranium (U), thorium (Th), lead alloys and mixtures thereof. Also, reflector rods 274 may be selected from a wide variety of steel alloys. In this manner, nuclear fission module 30 defines a neutron reflector assembly. Moreover, it may be appreciated by a person of ordinary skill in the art of nuclear in-core fuel management that nuclear fission module 30 may include any suitable combination of nuclear fuel rods 40, control rods 260, breeding rods 270 and reflector rods 274.

Figure 5C:
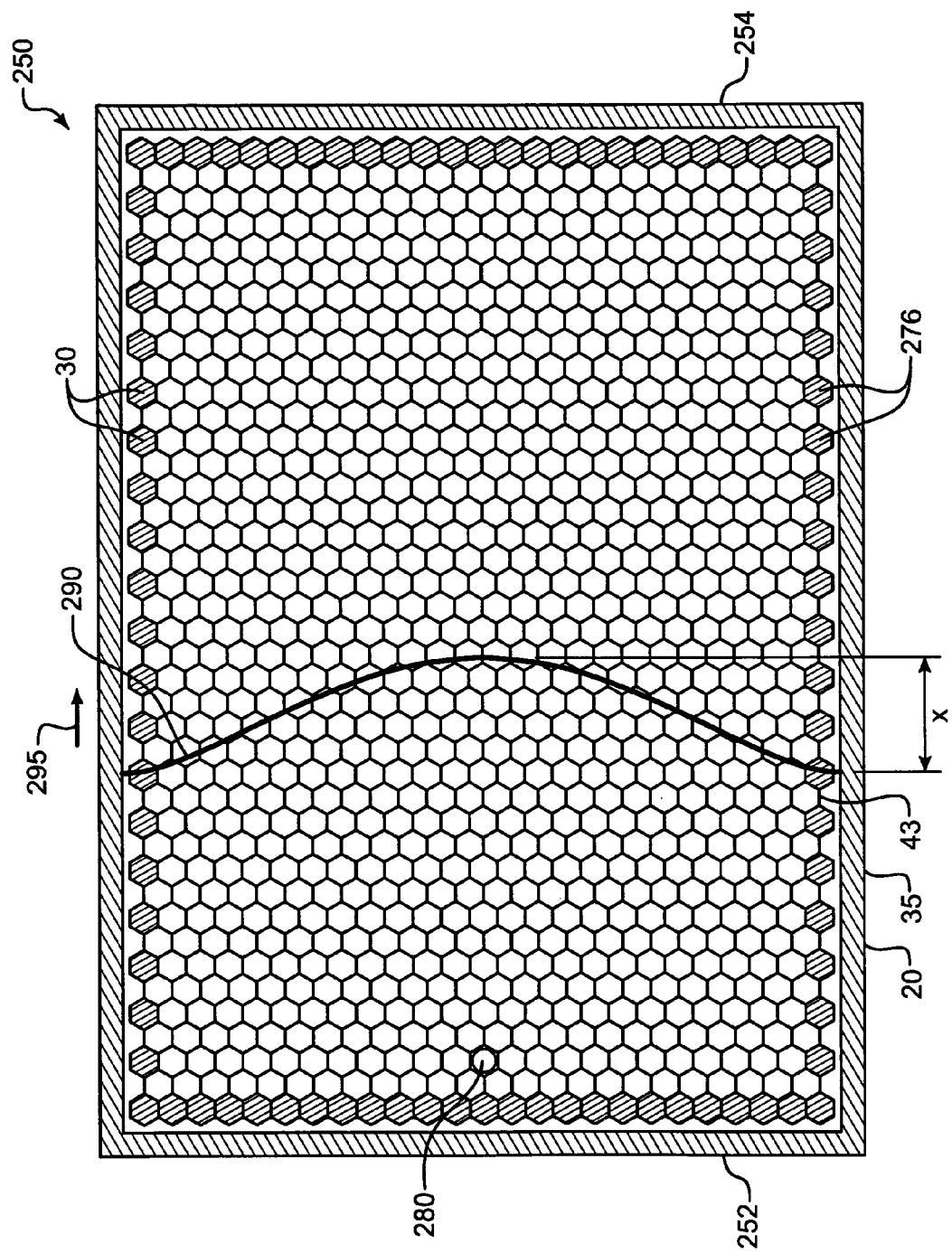
FIG. 5C is a view in transverse cross section of the parallelpiped-shaped reactor core, the reactor core having breeding blanket fuel assemblies disposed around an interior periphery thereof.

FIG. 5C shows another embodiment of the previously mentioned reactor core 250. In FIG. 5C, a breeding blanket comprising a plurality of breeding nuclear fission modules 276 containing fertile material are disposed around an interior periphery of parallelpiped reactor core 250. The breeding blanket breeds fissile material therein.

Returning to FIG. 4, regardless of the configuration selected for nuclear fission reactor core 20, the nuclear fission reactor core 20 may be configured as a traveling wave nuclear fission reactor core, such as exemplary reactor core 250. In this regard, a comparatively small and removable nuclear fission igniter 280, that includes a moderate isotopic enrichment of nuclear fissionable material, such as, without limitation, U-233, U-235 or Pu-239, is suitably located in reactor core 250. By way of example only and not by way of limitation, igniter 280 may be located near first end 252 that is opposite second end 254 of reactor core 250. Neutrons are released by igniter 280. The neutrons that are released by igniter 280 are captured by fissile and/or fertile material within nuclear fission modules 30 to initiate the fission chain reaction. Igniter 280 may be removed once the fission chain reaction becomes self-sustaining, if desired.

Referring again to FIG. 4, igniter 280 initiates a three-dimensional, traveling deflagration wave or "burn wave" 290 having a width "x". When igniter 280 releases its neutrons to cause "ignition", burn wave 290 travels outwardly from igniter 280 near first end 252 and toward second end 254 of reactor core 250, so as to form the propagating burn wave 290. In other words, each nuclear fission module 30 is capable of accepting at least a portion of traveling burn wave 290 as burn wave 290 propagates through reactor core 250. Speed of the traveling burn wave 290 may be constant or non-constant. Thus, the speed at which burn wave 290 propagates can be controlled. For example, longitudinal movement of the previously mentioned control rods 260 (see FIG. 5) in a predetermined or programmed manner can drive down or lower neutronic reactivity of fuel rods 40 that are disposed in nuclear fission modules 30. In this manner, neutronic reactivity of fuel rods 40 that are presently being burned at the location of burn wave 290 is driven down or lowered relative to neutronic reactivity of "unburned" fuel rods 40 ahead of burn wave 290. This result gives the burn wave propagation direction indicated by an arrow 295.

The basic principles of such a traveling wave nuclear fission reactor is disclosed in more detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference.

Figure 6:
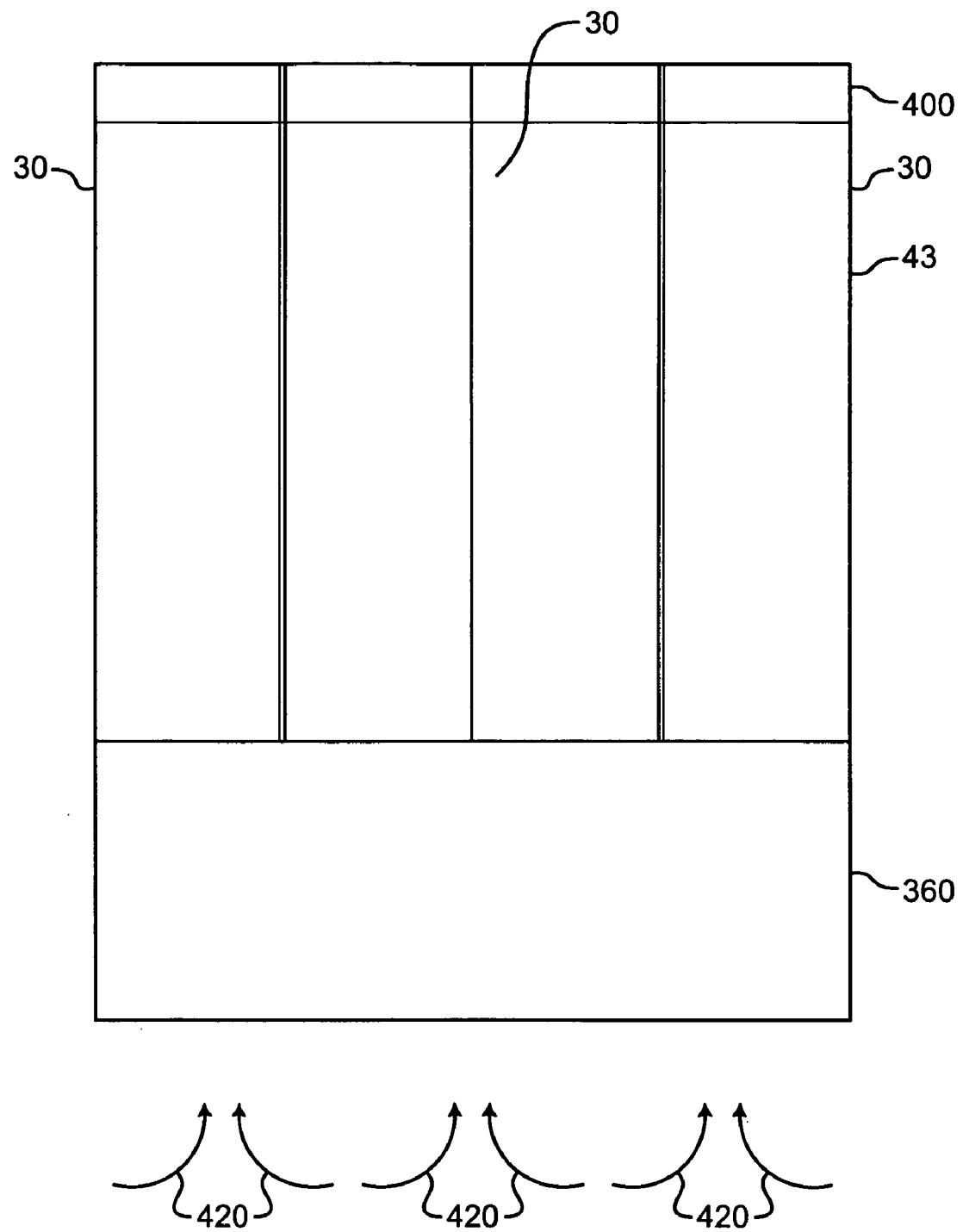
FIG. 6 is a view taken along section line 6-6 of FIG. 5.
Figure 7:
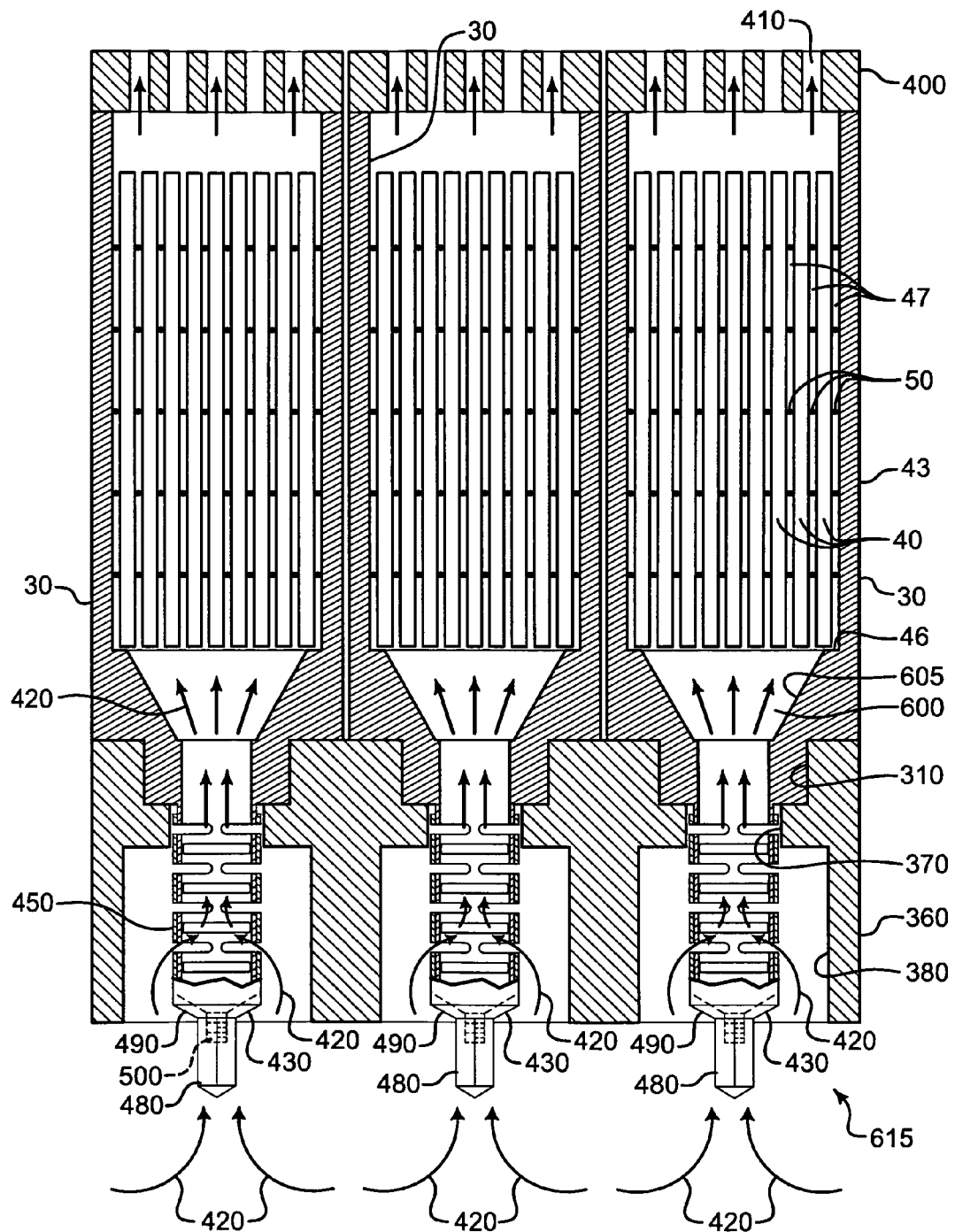
FIG. 7 is a view in partial vertical section of a plurality of the adjacent nuclear fission modules and a plurality of flow regulator subassemblies that belong to a flow control assembly and that are coupled to respective ones of the nuclear fission modules.

Referring to FIGS. 6 and 7, there are shown upright adjacent hexagonally-shaped nuclear fission modules 30. Only three adjacent nuclear fission modules 30 are shown, it being understood that a greater number of nuclear fission modules 30 are present in reactor core 20. In addition, each nuclear fission module 30 comprises the plurality of the previously mentioned fuel rods 40. Each nuclear fission module 30 is mounted on a horizontally extending reactor core lower support plate 360. Reactor core lower support plate 360 extends across all nuclear fission modules 30. Reactor core lower support plate 360 has a counter bore 370 therethrough for reasons provided hereinbelow. Counter bore 370 has an open end 380 for allowing flow of coolant thereinto. Horizontally extending across a top portion or exit portion of each nuclear fission module 30 and removably connected thereto is a reactor core upper support plate 400 that caps each nuclear fission module 30. Reactor core upper support plate 400 also defines a plurality of flow slots 410 for allowing flow of coolant therethrough.

As previously mentioned, it is important to control the temperature of reactor core 20 and the nuclear fission modules 30 therein, regardless of the configuration selected for reactor core 20. Proper temperature control is important for several reasons. For example, heat damage may occur to reactor core structural materials if the peak temperature exceeds material limits. Such peak temperatures may undesirably reduce the operational life of structures subjected to such peak temperatures by altering the mechanical properties of the structures, particularly those properties relating to thermal creep. Also, reactor power density is limited by the ability of core structural materials to withstand such high temperatures without damage. In addition, reactor 10 alternatively may be used to conduct tests, such as tests to determine affects of temperature on reactor materials. Controlling reactor core temperature is important for successfully conducting such tests. In addition, nuclear fission modules 30 residing at or near the center of reactor core 20 may generate more heat than nuclear fission modules 30 residing at or near the periphery of reactor core 20 in the absence of a neutron reflector or neutron breeding blanket surrounding the periphery of reactor core 20. Therefore, it would be inefficient to supply a uniform coolant mass flow rate across reactor core 20 because hotter nuclear fission modules 30 near the center of reactor core 20 would involve a higher coolant mass flow rate than nuclear fission modules 30 near the periphery of reactor core 20. The disclosure herein provides a technique to address these concerns.

With reference to FIGS. 1, 6 and 7, first pump 110 and primary loop pipe 90 deliver reactor coolant to nuclear fission modules 30 along a coolant flow path or fluid stream indicated by flow arrows 420. The primary coolant then continues along coolant flow path 420 and through open end 380 that is formed in lower support plate 360. As described in more detail hereinbelow, the reactor coolant can be used to remove heat from or cool selected ones of nuclear fission modules 30 at the location of traveling burn wave 290. The nuclear fission module 30 may be selected, at least in part, on the basis of whether or not burn wave 290 is located, detected, or otherwise resides within or in the vicinity of the nuclear fission module 30, as described in more detail hereinbelow.

Referring again to FIGS. 1, 6 and 7, in order to achieve the desired result of cooling the selected one of nuclear fission modules 30, an adjustable flow regulator subassembly 430 is coupled to nuclear fission module 30. Flow regulator subassembly 430 controls flow of the coolant in response to the location of burn wave 290 (see FIG. 4) relative to nuclear fission modules 30 and also in response to certain operating parameters associated with nuclear fission module 30. In other words, flow regulator subassembly 430 is capable of supplying or is configured to supply a relatively lesser amount of coolant to nuclear fission module 30 when a lesser amount of burn wave 290 (i.e., lesser intensity of burn wave 290) is present within nuclear fission module 30. On the other hand, flow regulator subassembly 430 is capable of supplying or is configured to supply a relatively greater amount of coolant to nuclear fission module 30 when a greater amount of burn wave 290 (i.e., greater intensity of burn wave 290) is present within nuclear fission module 30. Presence and intensity of burn wave 290 may be identified by heat generation rate, neutron flux level, power level or other suitable operating characteristic associated with nuclear fission module 30.

Referring to FIGS. 7, 8, 8A, 8B, 8C, and 8D, adjustable flow regulator subassembly 430 extends through counter bore 370 for regulating flow of fluid stream 420 into nuclear fission module 30. It will be understood by a person of ordinary skill in the art that, in order to regulate flow of fluid stream 420, flow regulator subassembly 430 provides a controllable flow resistance. Flow regulator subassembly 430 comprises a generally cylindrical first or outer sleeve 450 having a plurality of first ligaments 460, which define respective ones of a plurality of axially spaced-apart first holes or first controllable flow apertures 470 radially distributed around outer sleeve 450. Outer sleeve 450 further comprises a first nipple 480 which may have an hexagonally-shaped transverse cross section for reasons provided hereinbelow. First nipple 480 defines a threaded internal cavity 500 for reasons provided hereinbelow.

Referring again to FIGS. 7, 8, 8A, 8B, 8C and 8D, flow regulator subassembly 430 further comprises a generally cylindrical second or inner sleeve 530 that is threadably received into outer sleeve 450, as disclosed in more detail hereinbelow. In one embodiment, inner sleeve 530 may be integrally formed with nuclear fission module 30 during fabrication of fission module 30, such that inner sleeve 530 is a permanent portion of nuclear fission module 30. In another embodiment, inner sleeve 530 may be removably connected to nuclear fission module 30, such that inner sleeve 530 is readily separable from nuclear fission module 30 and hence not a permanent portion of nuclear fission module 30. In either embodiment, inner sleeve 530 comprises a plurality of second ligaments 540, which define respective ones of a plurality of axially spaced-apart second holes or second controllable flow apertures 550 radially distributed around inner sleeve 530. Inner sleeve 530 further comprises an externally threaded second nipple 560 sized to be threadably received into threaded internal cavity 500 of bottom portion 490 that belongs to outer sleeve 450. A top portion 570 of inner sleeve 530 includes a cap 580, which may or may not be permanently formed with nuclear fission module 30, as previously mentioned. An internal bore 590 extends through top portion 570, including through cap 580, for passage of the coolant therethrough. Coupled to cap 580 and fuel rods 40 may be a frusto-connical funnel portion 600 having an inner surface 605 in communication with internal bore 590 and the interior of canister 43 for allowing passage of the coolant from internal bore 590 and into canister 43 where fuel rods 40 reside. As previously mentioned, nuclear fission modules 30 are capable of having or are configured to have a temperature dependent reactivity change. Thus, flow control regulator subassembly 430 is at least partially configured to control temperature within nuclear fission module 30 by controlling coolant flow into nuclear fission module 30 in order to effect such a temperature dependent reactivity change.

Figure 8:
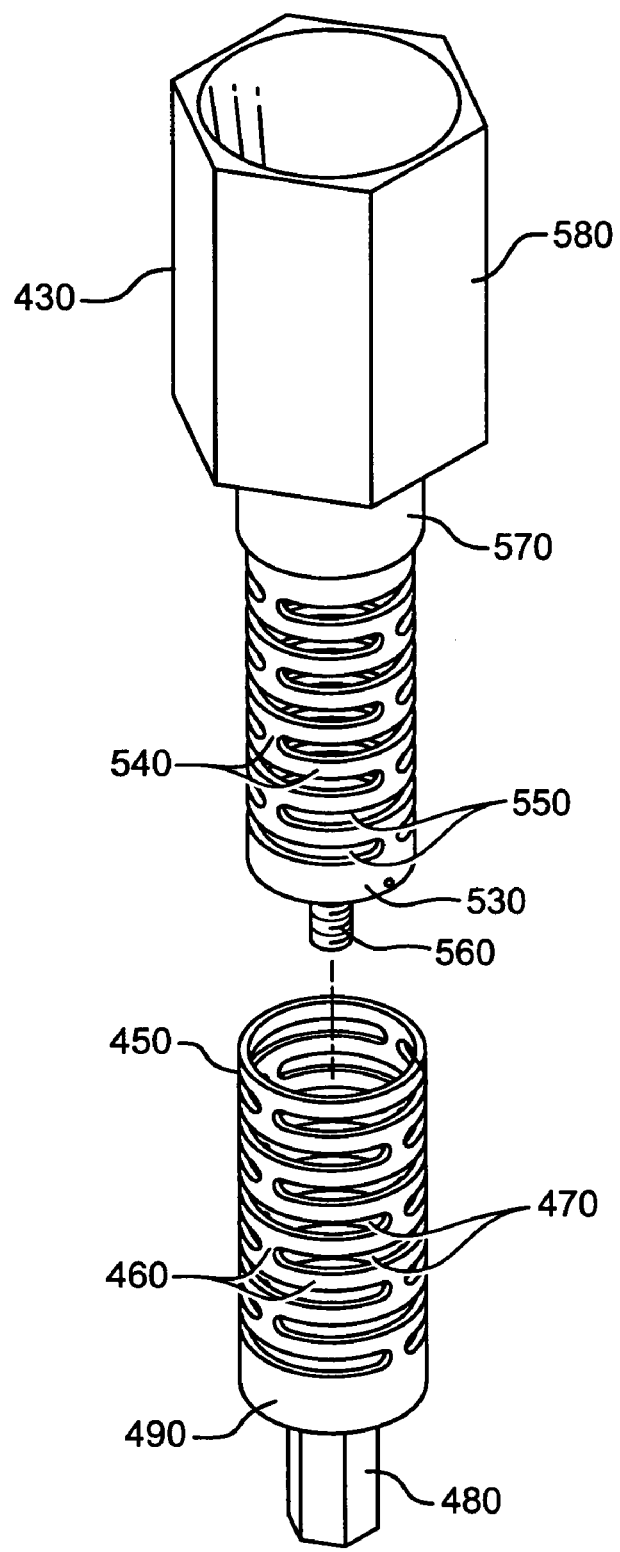
FIG. 8 is an exploded view in perspective of the flow regulator subassembly.
Figure 8A:
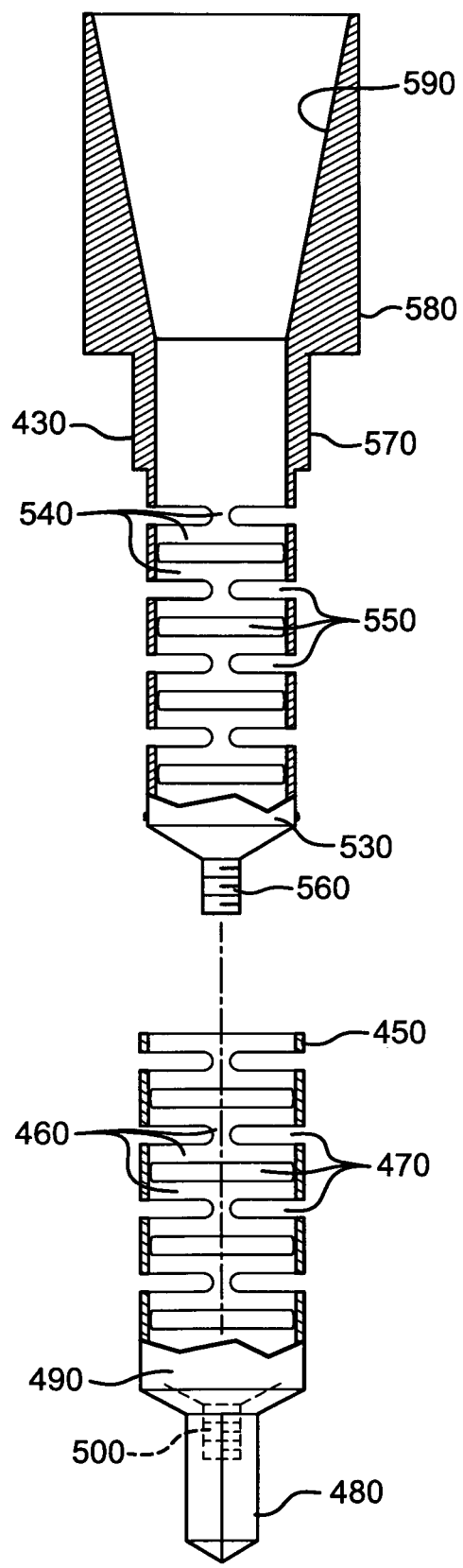
FIG. 8A is an exploded view in partial vertical section of the flow regulator subassembly.
Figure 8B:
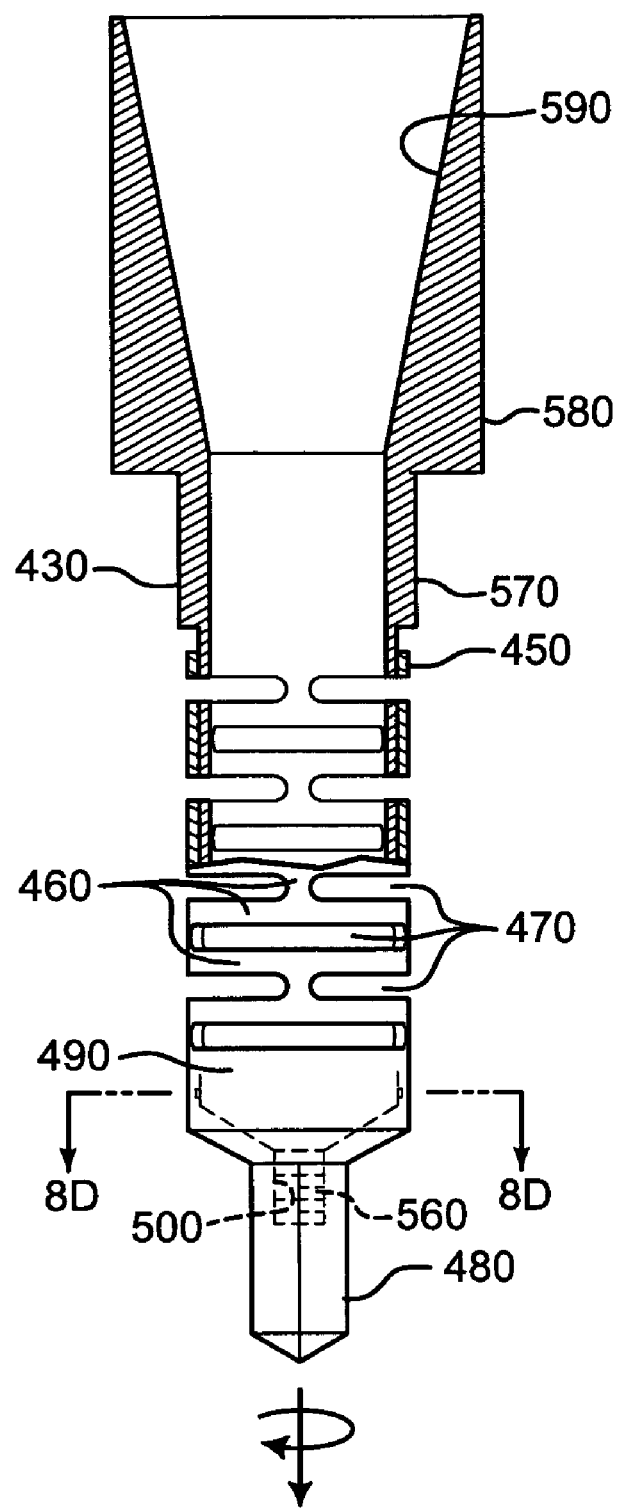
FIG. 8B is a view in partial section of the flow regulator subassembly in an open configuration for fully allowing fluid flow.
Figure 8C:
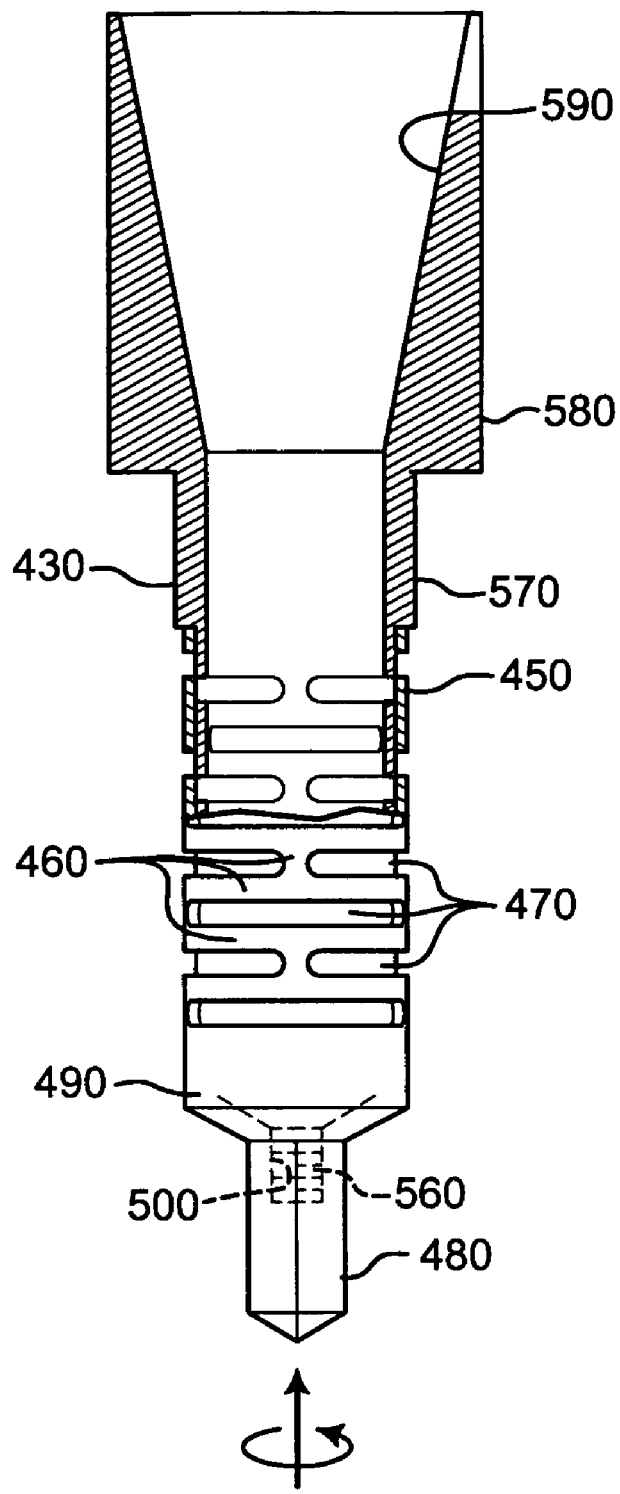
FIG. 8C is a view in partial section of the flow regulator subassembly in a closed configuration for fully blocking fluid flow.
Figure 8D:
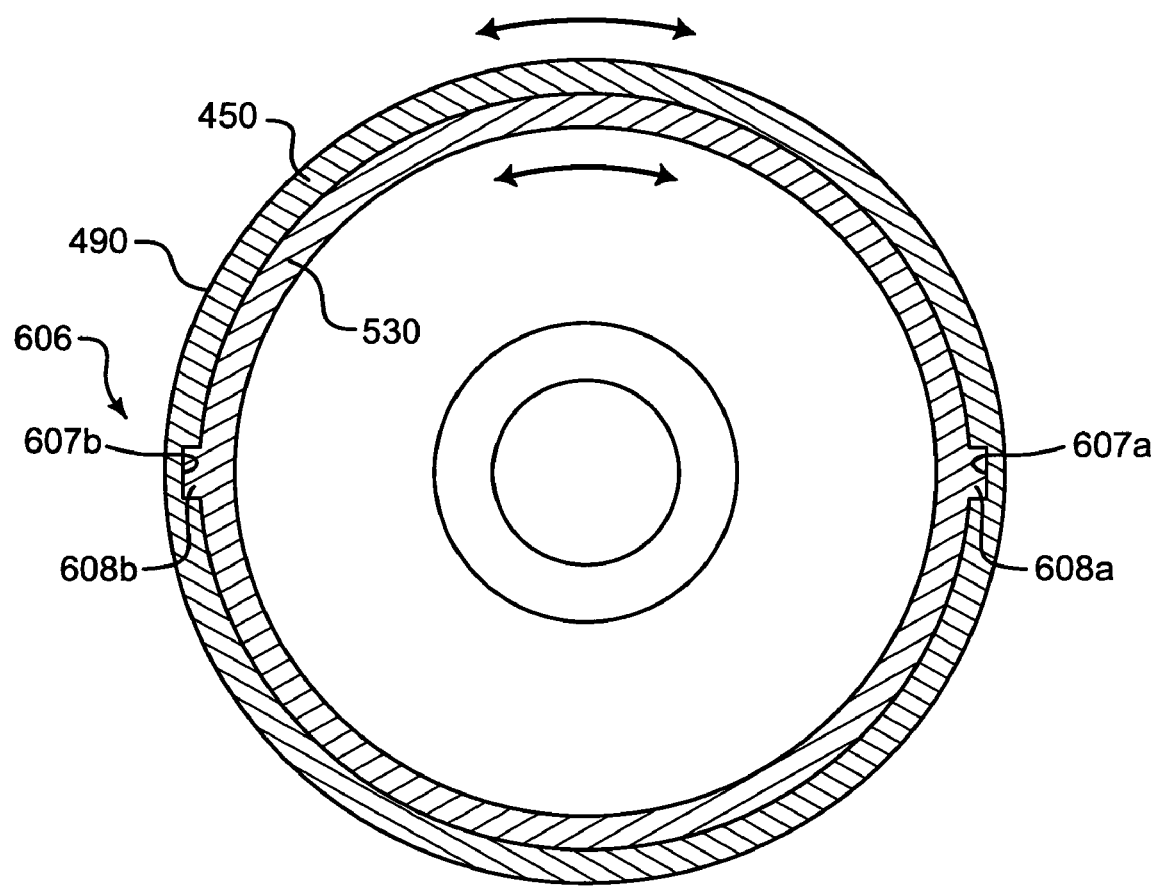
FIG. 8D is a view taken along section line 8D-8D of FIG. 8B and shows, in horizontal section, an anti-rotation configuration belonging to a lower portion of the flow regulator subassembly.

Referring now to FIGS. 8A and 8D, bottom portion 490 of outer sleeve 450 includes an anti-rotation configuration, generally referred to as 606, to prevent relative rotation of outer sleeve 450 with respect to inner sleeve 530. In this regard, outer sleeve 450 defines a plurality of grooves, such as grooves 607a and 607b, for matingly receiving respective ones of a plurality of tabs 608a and 608b integrally formed with inner sleeve 530. Thus, as outer sleeve 450 is rotated, inner sleeve 530 is prevented from rotating with respect to outer sleeve 450 due to the engagement of tabs 608a and 608b in grooves 607a and 607b, respectively.

Figure 8E:
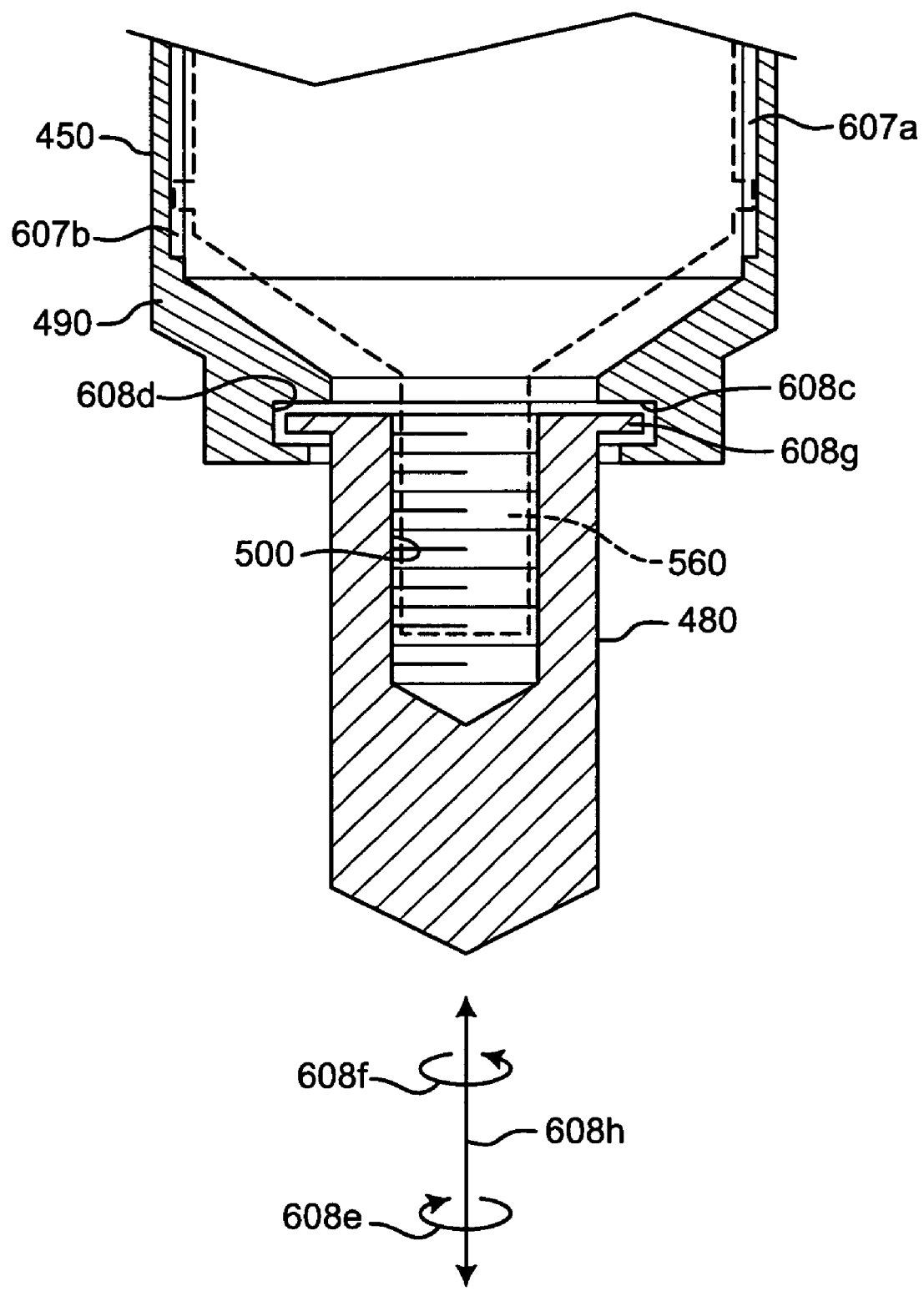
FIG. 8E is a view in vertical section, with parts removed for clarity, of the lower portion of the flow regulator subassembly and shows a freely rotatable nipple.
Figure 9:
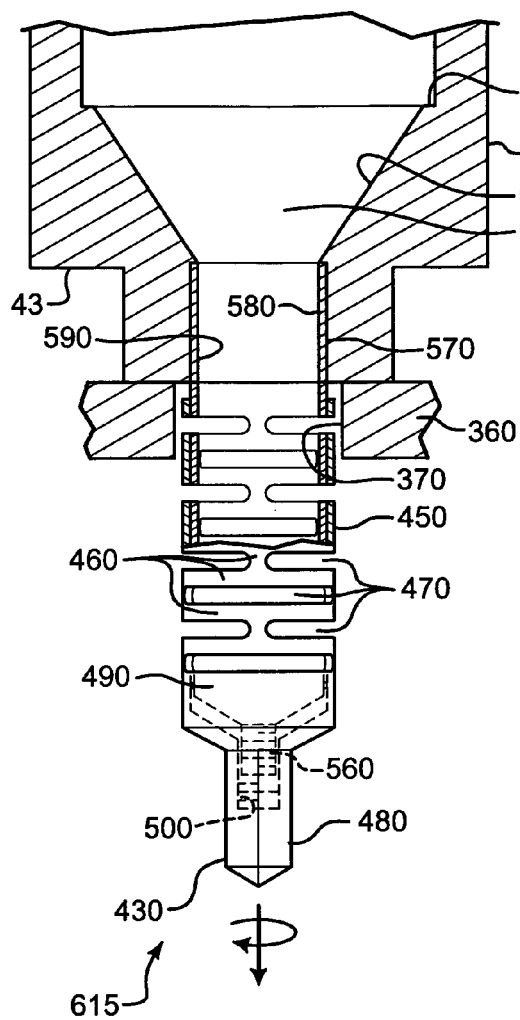
FIG. 9 is a view in partial elevation of the flow regulator subassembly coupled to the nuclear fission module and in a fully open position for allowing fluid flow into the nuclear fission module.

As best seen in FIG. 8E, first nipple 480 is rotatable relative to outer sleeve 450. In this regard, first nipple 480 includes an annular flange 608c that is slidably received in an annular slot 608d formed in outer sleeve 450. In this manner, first nipple 480 is freely slidably rotatable with respect to outer sleeve 450. First nipple 480 is freely slidably rotatable in either of the directions indicated by curved arrows 608e or 608f. Moreover, as first nipple 480 freely slidably rotates in one direction, such as in the direction of arrow 608e, threaded internal cavity 500 will threadably engage the external threads of second nipple 560. It may be appreciated that as the threads of internal cavity 500 threadably engage the external threads of second nipple 560, first nipple 480 will abut first sleeve 450, such as at surface 608g. As first nipple 480 abuts first sleeve 450, first sleeve 450 will upwardly translate or ascend along a longitudinal axis thereof in a direction indicated by a vertical arrow 608h. First sleeve 450 will upwardly translate or ascend only in the direction of arrow 608h due to presence of anti-rotation configuration 606. As first sleeve 450 upwardly translates or ascends a predetermined amount, first holes 470 will be progressively closed, covered, shut-off and otherwise blocked by second ligaments 540 of inner sleeve 530. Moreover, it may be appreciated that, as first sleeve 450 upwardly translates or ascends the predetermined amount, second holes 550 will be progressively closed, covered, shut off and otherwise blocked by first ligaments 460 of outer sleeve 450. Progressively closing, covering, shutting off and otherwise blocking first holes 470 and second holes 550 in this manner variably reduces flow of the coolant through first holes 470 and second holes 550. It may be appreciated that rotation of first nipple 480 in an opposite direction, such as in the direction of curved arrow 608f, causes first holes 470 and second holes 550 to be progressively opened, uncovered, revealed and otherwise unblocked for variably increasing flow of coolant through first holes 470 and second holes 550.

Therefore, referring to FIGS. 7, 8, 8A, 8B, 8C, 8D, 8E, 9 and 10, flow control in nuclear fission module 30 is achieved, at least in part, by use of two distinct components, which are outer sleeve 450 and inner sleeve 530, as described presently. As previously mentioned, inner sleeve 530 may be integrally formed with nuclear fission module 30 when nuclear fission module 30 is first fabricated. However, if desired, inner sleeve may be formed separately from nuclear fission module 30, but connectable thereto, rather than being integrally formed with nuclear fission module 30 when nuclear fission module 30 is first fabricated. Inner sleeve 530 defines the plurality of second holes 550 to allow passage of the coolant into nuclear fission module 30. Outer sleeve 450 slides on top of inner sleeve 530 and has the corresponding plurality of first holes 470. Outer sleeve 450 and inner sleeve 530 are concentric and holes 470/550 are always aligned to match along the radial or rotational axis. Coolant flow is controlled by the relative positions of inner sleeve 530 and outer sleeve 450 in the axial or vertical direction. In this regard, FIG. 8B shows flow regulator subassembly 430 in a fully open configuration to fully allow fluid flow into nuclear fission module 30 and FIG. 8C shows flow regulator subassembly 430 in a fully closed configuration to fully block fluid flow into nuclear fission module 30. The engagement of tabs 608a and 608b into respective ones of grooves 607a and 607b restricts rotation of outer sleeve 450 relative to inner sleeve 530, as previously mentioned. This feature allows axial sliding of outer sleeve 450 on inner sleeve 530, but no relative rotation between outer sleeve 450 and inner sleeve 530. Fine adjustment of coolant flow is achieved by the progressive axial sliding of outer sleeve 450 relative to inner sleeve 530. Thus, rotation of first nipple 480 in direction 608e progressively opens flow regulator subassembly 430 and rotation of first nipple 480 in direction 608f progressively closes flow regulator subassembly 430 for achieving fine adjustment of holes 470/550 and thus fine adjustment of coolant flow.

Figure 11:
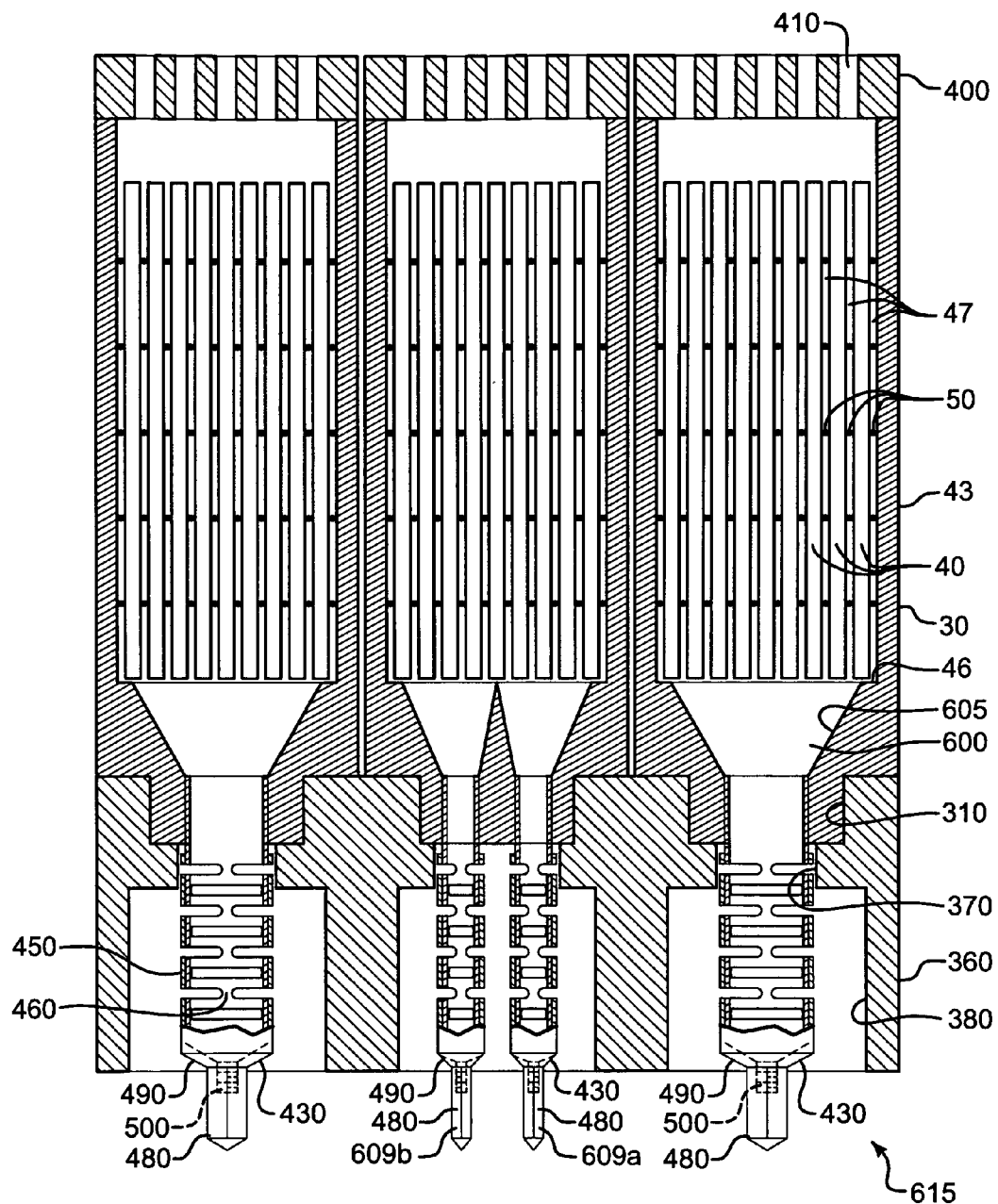
FIG. 11 is a view in vertical section of the plurality of adjacent nuclear fission modules and a plurality of flow regulator subassemblies coupled to one of the nuclear fission modules.
Figure 12:
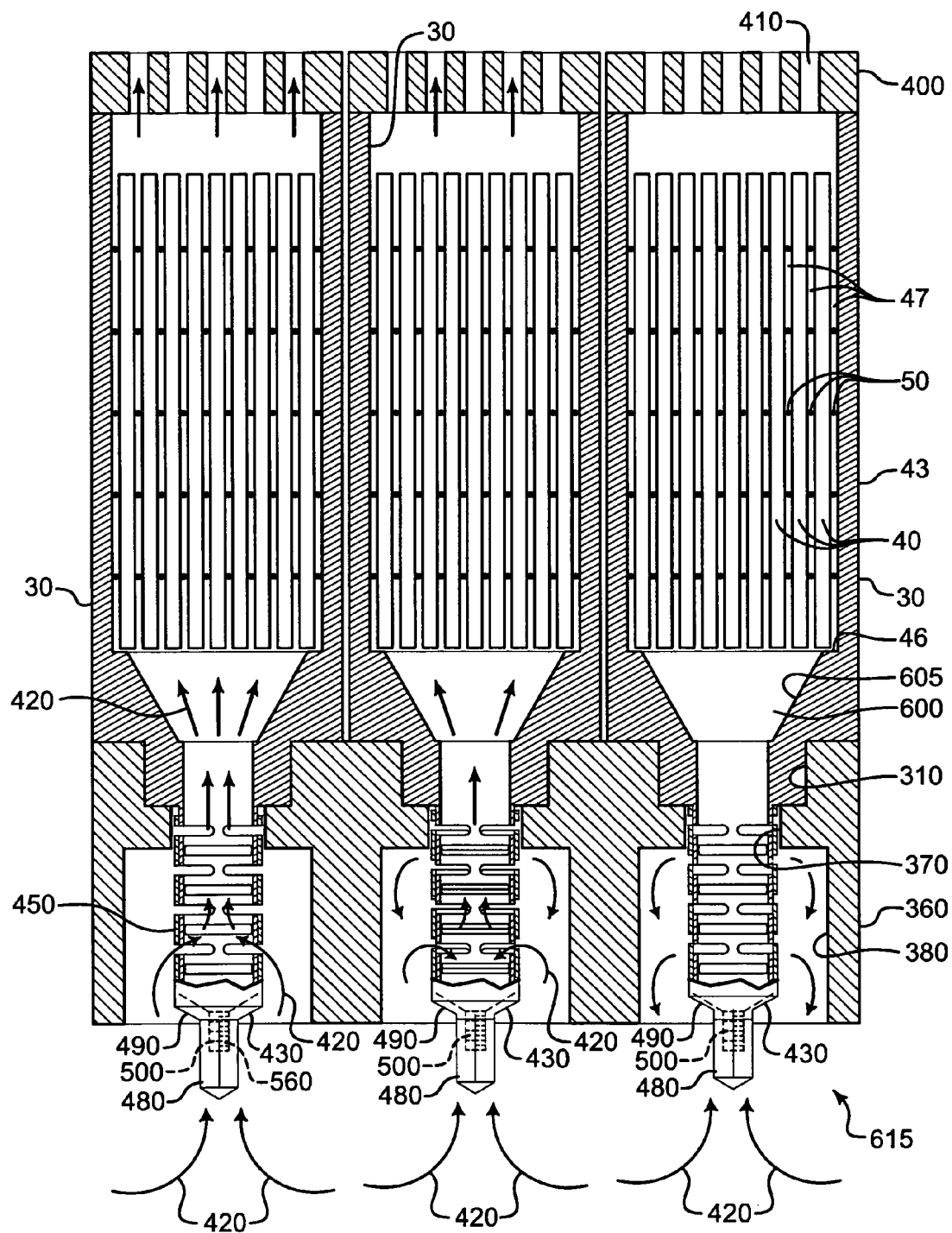
FIG. 12 is a view in vertical section of the plurality of adjacent nuclear fission modules and a plurality of flow regulator subassemblies coupled to respective ones of the nuclear fission modules, the flow regulator subassemblies being shown in fully open, partially closed or open, and fully closed positions for allowing variable fluid flow therethrough.
Figure 13:
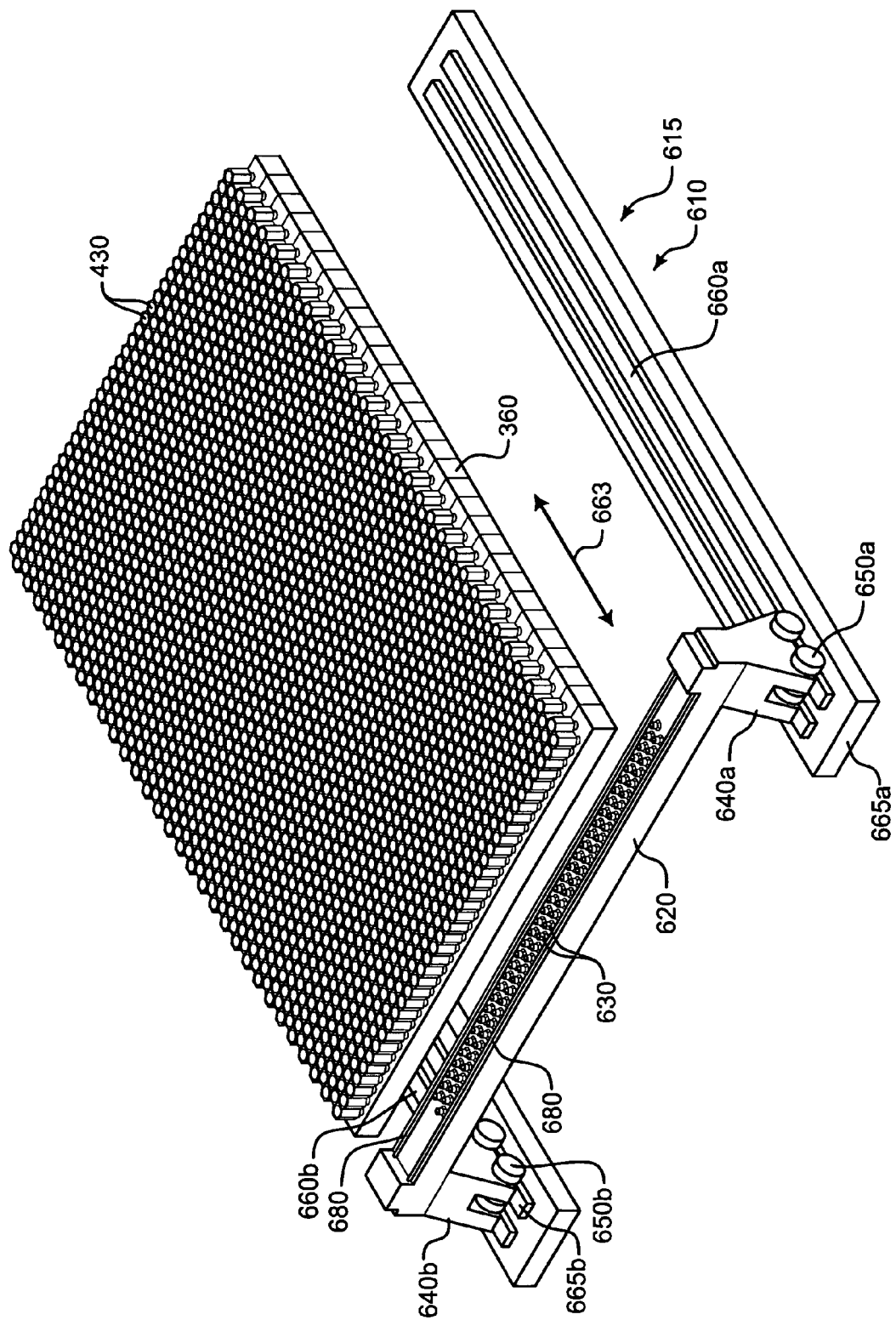
FIG. 13 is a view in perspective, with parts removed for clarity, of a carriage subassembly belonging to the flow control assembly.

As best seen in FIG. 11, there may be a plurality of smaller flow regulator subassemblies, such as flow regulator subassemblies 609a and 609b, assigned to a single nuclear fission module 30. Assignment of the plurality of smaller flow regulator subassemblies 609a and 609b to a single nuclear fission module 30 provides an alternative configuration for providing coolant flow to nuclear fission module 30. In addition, assignment of the plurality of smaller flow regulator subassemblies 609a and 609b to an individual or single nuclear fission module 30 provides a possibility of substantially controlling temperature distribution within distinct portions of an individual or single nuclear fission fuel module 30. This is possible because fluid flow through each of the smaller flow regulator subassemblies 609a and 609b can be individually controlled.

Referring to FIGS. 12, 13, 14, 15, and 16, there is shown flow regulator subassembly 430 in operative condition to adjust or regulate coolant fluid flow into nuclear fission module 30. Together, flow regulator subassembly 430 and a carriage subassembly 610 define a flow control assembly, generally referred to as 615, as disclosed more fully hereinbelow. In other words, flow control assembly 615 comprises flow regulator subassembly 430 and carriage subassembly 610. In this regard, carriage subassembly 610 is disposed underneath reactor core 20, such as underneath core lower support plate 360, and is capable of being coupled to or is configured to be coupled to flow regulator subassembly 430 for adjusting flow regulator subassembly 430. Adjustment of flow regulator subassembly 430 variably controls coolant flow into nuclear fission module 30, as mentioned hereinabove. Moreover, carriage subassembly 610 is capable of carrying outer sleeve 450 to nuclear fission module 30, if desired.

Referring to FIGS. 13, 14, 15, and 16, the configuration of carriage subassembly 610 will now be described. Carriage subassembly 610 comprises an elongate bridge 620 spanning reactor core 20 for supporting a plurality of vertically movable socket wrenches 630 thereon. Each of socket wrenches 630 has a shaft 700 and is movably disposed in a socket well 635 for reasons disclosed hereinbelow. Connected to opposing ends of bridge 620 are a first bridge mover 640a and a second bridge mover 640b, respectively. Bridge movers 640a and 640b may be operable by means of a gear arrangement (not shown) driven by a motor (also not shown). Such a motor may be located externally to reactor core 20 to avoid the corrosive effects and heat of the coolant, such as liquid sodium, circulating through reactor core 20. Each of bridge movers 640a and 640b includes at least one wheel 650a and 650b, respectively, for allowing bridge movers 640a and 640b to simultaneously move along respective ones of transversely spaced-apart and parallel tracks 660a and 660b. Bridge movers 640a and 640b are capable of moving or are configured to move bridge 620 along tracks 660a and 660b in either of the directions indicated by arrow 663. Connected to each of tracks 660a and 660b may be a track support 665a and 665b, respectively, for supporting tracks 660a and 660b thereon.

Referring to FIGS. 13, 14, 15, 16, 17, 18, and 19, socket wrenches 630 are configured to be vertically reciprocated in socket well 635 into engagement and out of engagement with first nipple 480 of outer sleeve 450. In one embodiment of carriage assembly 610, rows of socket wrenches 630 are configured to be driven by a lead screw arrangement, generally referred to as 670. Lead screw arrangement 670 has a lead screw 680 configured to threadably engage external threads 690 surrounding shaft 700 belonging to each socket wrench 630. Lead screw 680 may be driven by a mechanical drive system 705 comprising a mechanical linkage 707 coupled to lead screw 680. When mechanical linkage 707 drives lead screw 680, the lead screw 680 will turn or rotate shaft 700 due to the threaded engagement of lead screw 680 and the external threads 690 surrounding shaft 700. Turning or rotating shaft 700 will turn or rotate first nipple 480 a like amount when an hexagonally shaped recess 700a in an upper portion of shaft 700 engages hexagonally shaped first nipple 480, as shown.

Figure 15:
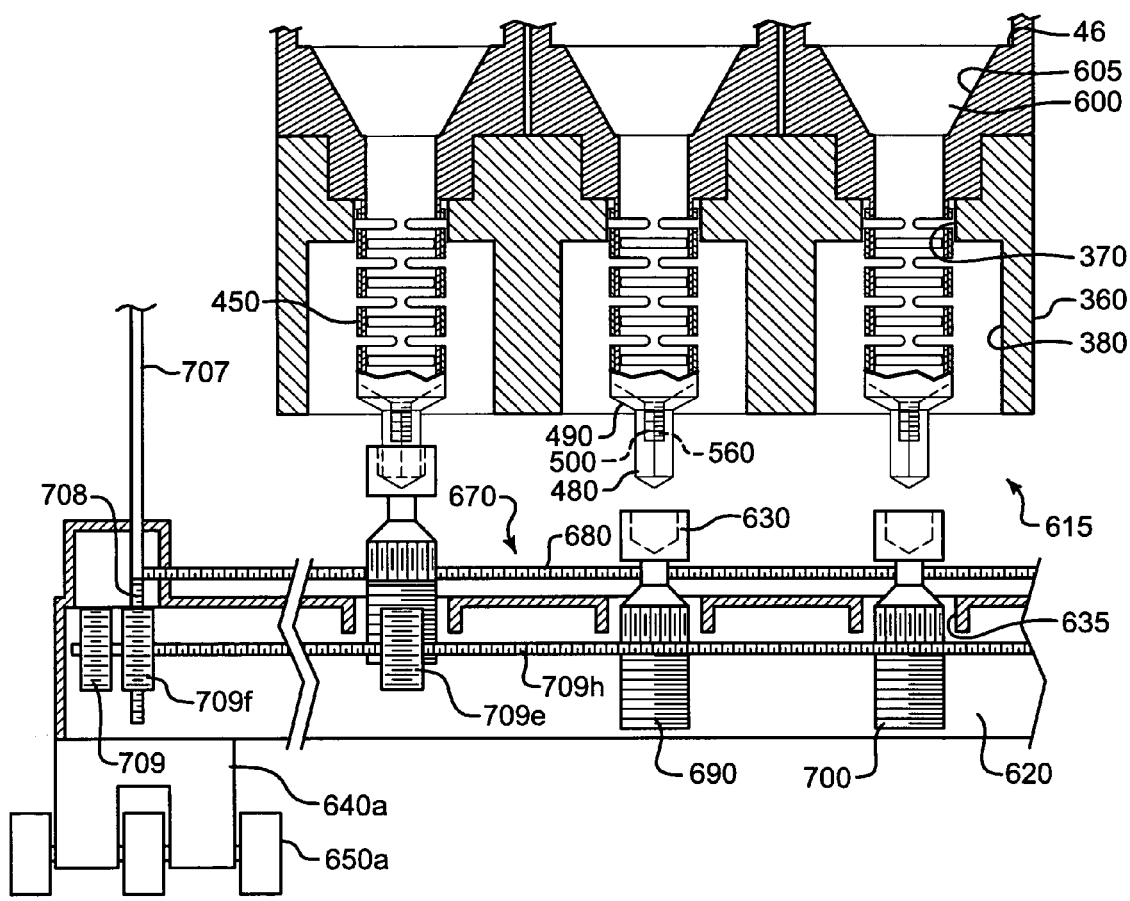
FIG. 15 is view in partial elevation, with parts removed for clarity, of the plurality of flow regulator subassemblies, a selected one of the plurality of flow regulator subassemblies being engaged by one of a plurality of socket wrenches rotatably driven by a lead screw arrangement and axially driven by a gear arrangement.
Figure 16:
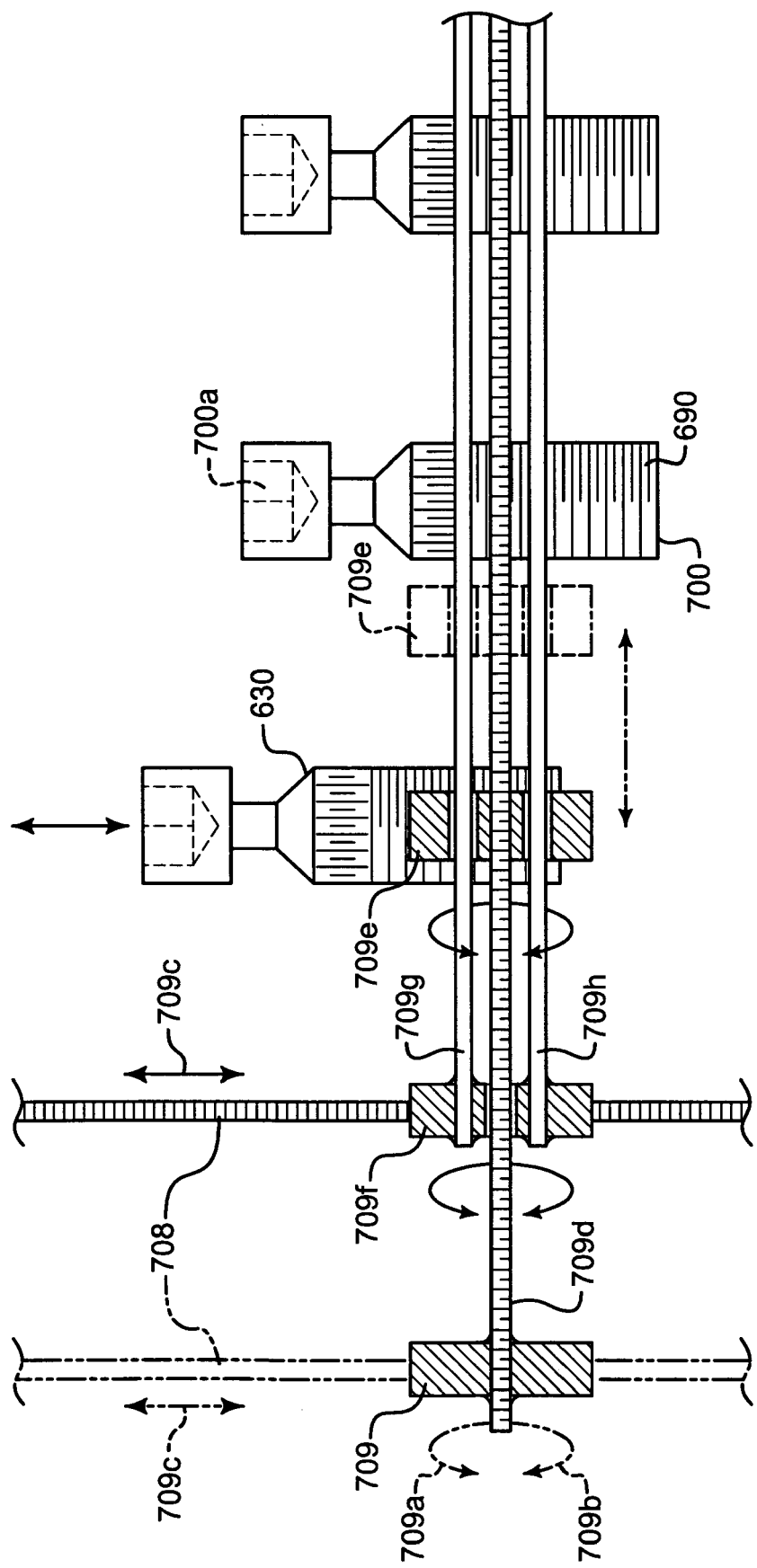
FIG. 16 is a view in perspective of the gear arrangement for driving selective ones of the plurality of socket wrenches.

Referring to FIGS. 15 and 16, the manner in which each shaft 700 is selectively raised and lowered will now be described. In this regard, an externally threaded, elongate mechanical linkage extension 708 engages a first gear wheel 709 for rotating first gear wheel 709 in either of the directions indicated by curved arrows 709a and 709b. For example, as mechanical linkage extension 708 translates in one of the directions indicated by a double-headed arrow 709c, first gear wheel 709 will rotate in a first direction, such as in the direction of arrow 709a. On the other hand, as mechanical linkage extension 708 translates in an opposite direction indicated by double-headed arrow 709c, first gear wheel 709 will rotate in a second direction, such as in the direction of arrow 709b. As first gear wheel 709 rotates, such as in the direction of arrow 709a, an externally threaded centermost first rod 709d will also rotate a like amount because the external threads of first rod 709d threadably engage internal threads (not shown) formed through the center of first gear wheel 709. A second gear wheel 709e has internal threads (not shown) formed through the center thereof for threadably engaging the external threads of first rod 709d. Thus, as first rod 709d is rotated by first gear wheel 709, second gear wheel 709e will translate along first rod 709d due to the threaded engagement of first rod 709d with second gear wheel 709e. Second gear wheel 709e will translate along first rod 709d until the location of a predetermined one of shafts 700 is reached. It may be appreciated that the pitch of the external threads or gear teeth of second gear wheel 709e is such as not to create an interference with the pitch of the external threads surrounding shafts 700 so that translation of second gear wheel 709e along first rod 709e may proceed unimpeded. A third gear wheel 709f is also provided for reasons described presently. In this regard, third gear wheel 709f is coupled to an elongate second rod 709g and to an elongate third rod 709h disposed on either side of and adjacent to centermost first rod 709d. Third gear wheel 709f is driven by the previously mentioned mechanical linkage extension 708, which is movable from a first position of engagement with first gear wheel 709 to a second position of engagement with third gear wheel 709f. As third gear wheel 709f rotates, second rod 709g and third rod 709h will rotate about the longitudinal axis of first rod 709d for rotating second gear wheel 709e about the longitudinal axis of first rod 709d. As second gear wheel 709e rotates, the external threads of second gear wheel 709e will threadably engage the external threads of shaft 700 for vertically translating shaft 700. In this manner, socket wrench 630 is translated either upwardly or downwardly. It should be appreciated that mechanical linkage extension 708 may be replaced by a fourth gear wheel (not shown) or by a pulley belt assembly (also not shown).

Figure 17:
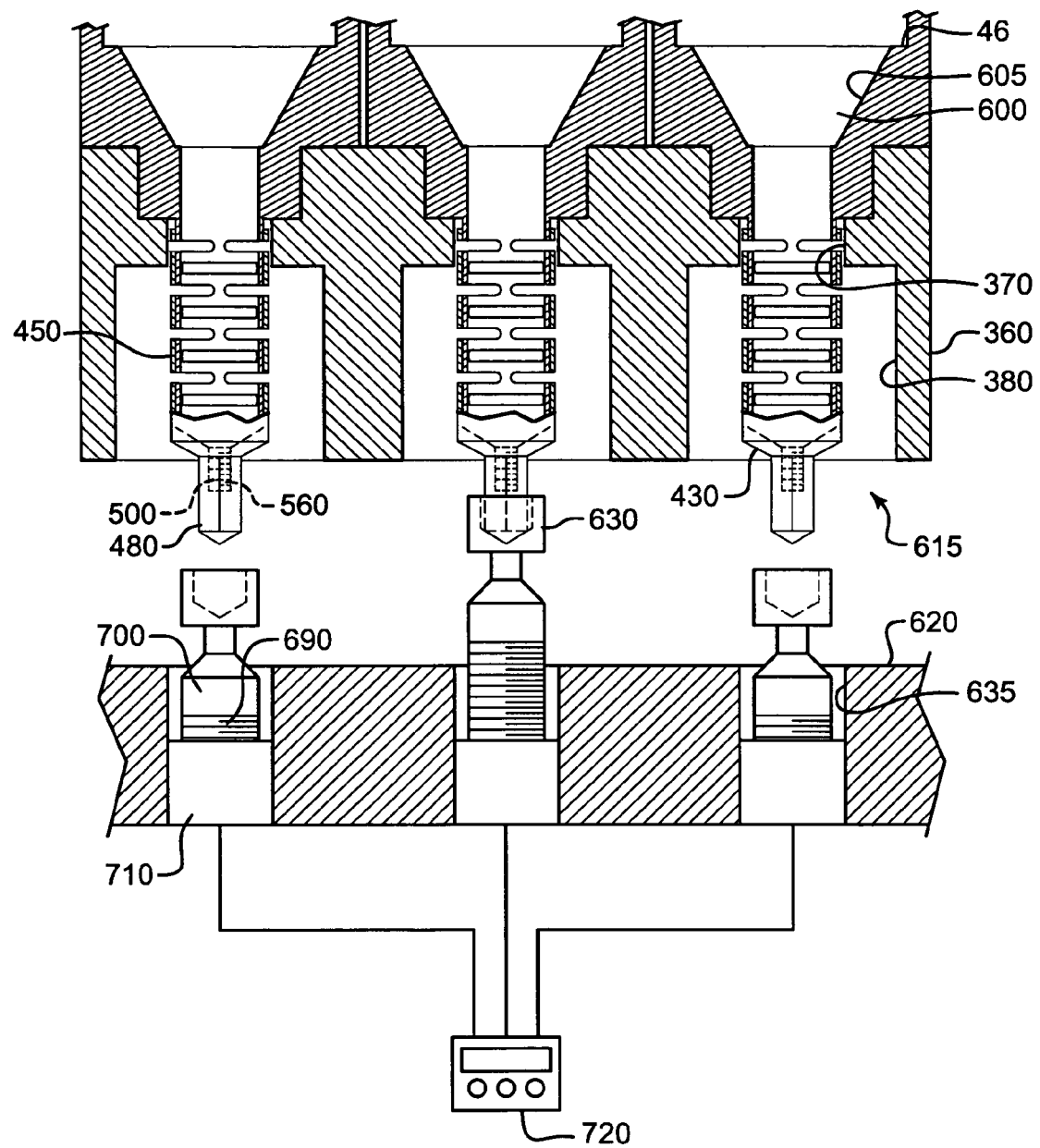
FIG. 17 is a view in partial elevation, with parts removed for clarity, of the plurality of flow regulator subassemblies being engaged by a selected one of the plurality of socket wrenches, the socket wrench being at least partially controlled by an hermetically sealed electric motor arrangement electrically coupled to a controller or a control unit.
Figure 18:
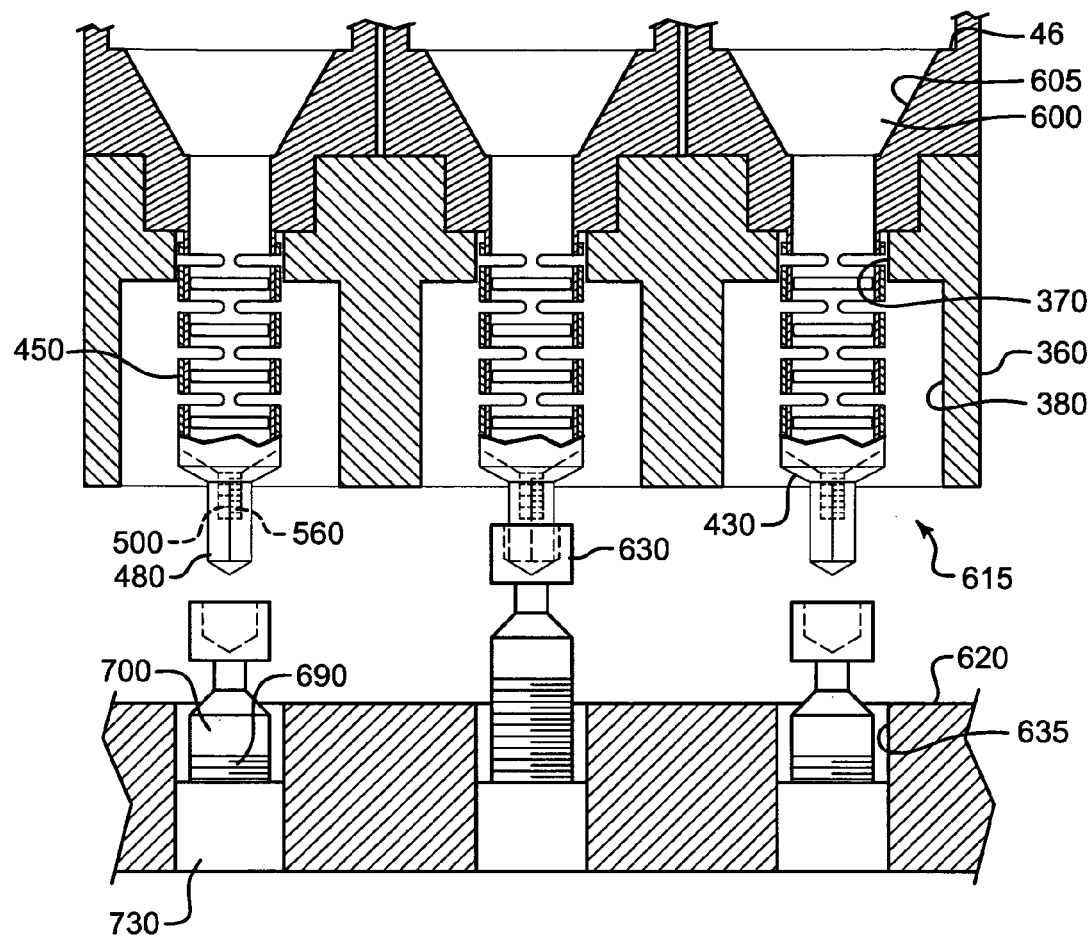
FIG. 18 is a view in partial elevation, with parts removed for clarity, of the plurality of flow regulator subassemblies being engaged by a selected one of the plurality of socket wrenches, the socket wrench being at least partially controlled by an hermetically sealed electric motor arrangement responsive to a radio transmitter-receiver arrangement belonging to a controller or control unit capable of transmitting a radio frequency signal.
Figure 19:
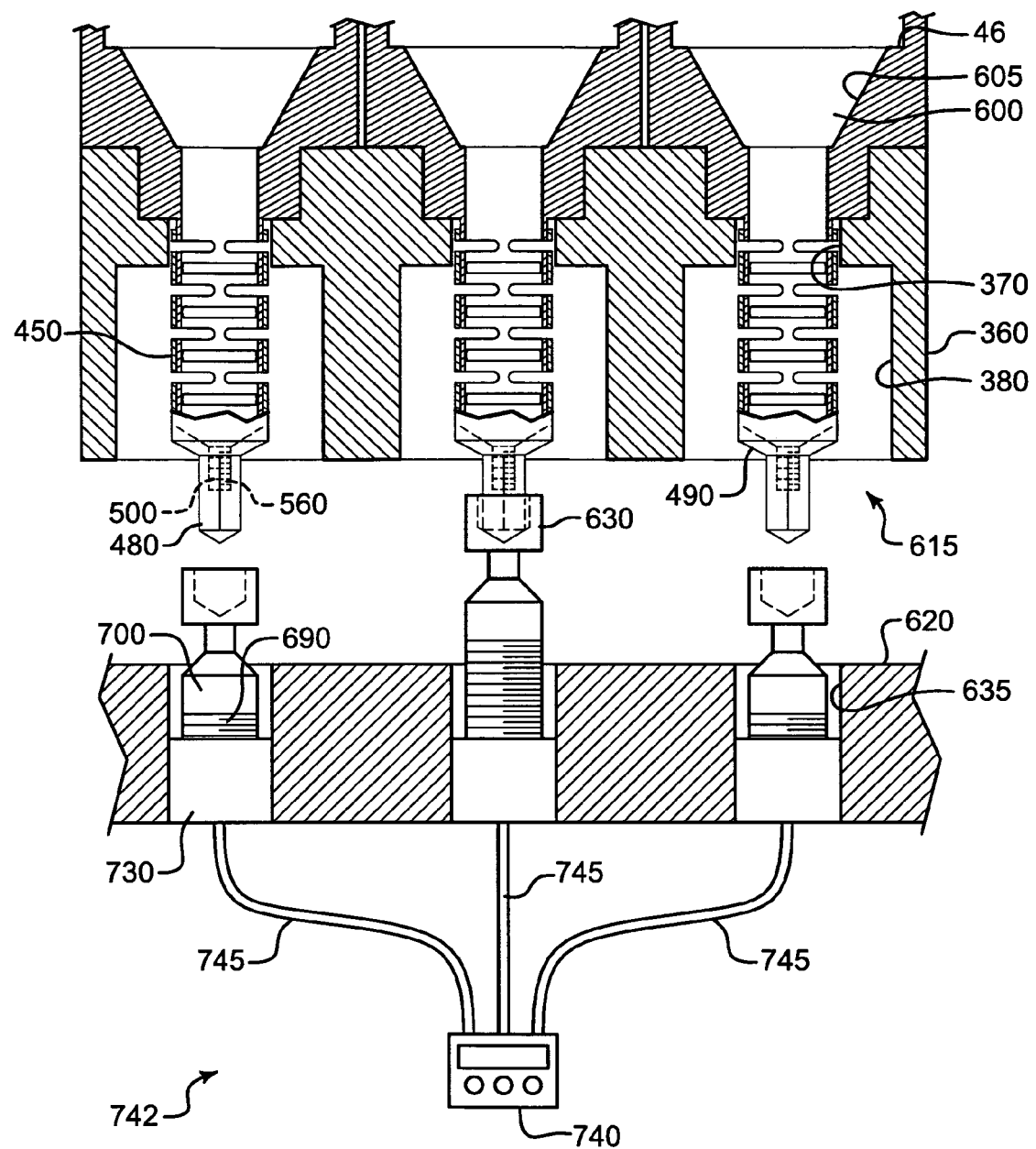
FIG. 19 is a view in partial elevation of the plurality of flow regulator subassemblies being engaged by a selected one of the plurality of socket wrenches, the socket wrench being at least partially controlled by a fiber optic transmitter-receiver arrangement belonging to a control unit capable of transmitting a signal by means of a light beam.

Referring to FIGS. 17, 18 and 19, in another embodiment of carriage assembly 610, socket wrenches 630 are individually rotatable and axially translatable by means of respective ones of a plurality of hermetically sealed, reversible, first electric motors 710 that are coupled to shafts 700. First electric motors 710 are hermetically sealed and may be gas cooled to protect first electric motors 710 from the corrosive effects and heat of the coolant, which may be liquid sodium or liquid sodium mixture. First electric motors 710 are configured to selectively, vertically move shafts 700. Motors 710 are reversible in the sense that rotors of motors 710 may be operated in a first direction or a second direction opposite the first direction for moving shafts 700 either upwardly or downwardly, respectively. Operation of either mechanical drive system 705 or motors 710 is suitably controlled by means of a controller or control unit 720 coupled thereto. Each motor 710 may be a custom designed direct current servomotor, such as may be available from ARC Systems, Incorporated located in Hauppauge, N.Y., USA. Controller 720 may be a custom designed motor controller, such as may be available from Bodine Electric Company located in Chicago, Ill., USA. According to another embodiment, socket wrenches 630 are individually movable by means of a radio transmitter-receiver arrangement that includes a plurality of hermetically sealed, gas cooled, reversible, second electric motors 730 that are individually operable by receipt of a radio frequency signal transmitted by a radio transmitter 740. Second electric motors 730 are hermetically sealed and may be gas cooled to protect second electric motors 730 from the corrosive effects and heat of the sodium coolant. A power supply for second electric motor 730 may be a battery or other power supply device (not shown). Second electric motors 730, that are configured to receive such a radio signal, and radio transmitter 740 may be a custom designed motor and transmitter that may be available from Myostat Motion Control, Incorporated located in Ontario, Canada. According to another embodiment, socket wrenches 630 are individually movable by means of a fiber optic transmitter-receiver arrangement, generally referred to as 742, having a plurality of fiber optic cables 745 in order to operate the reversible motor arrangement by light transmission.

Figure 14:
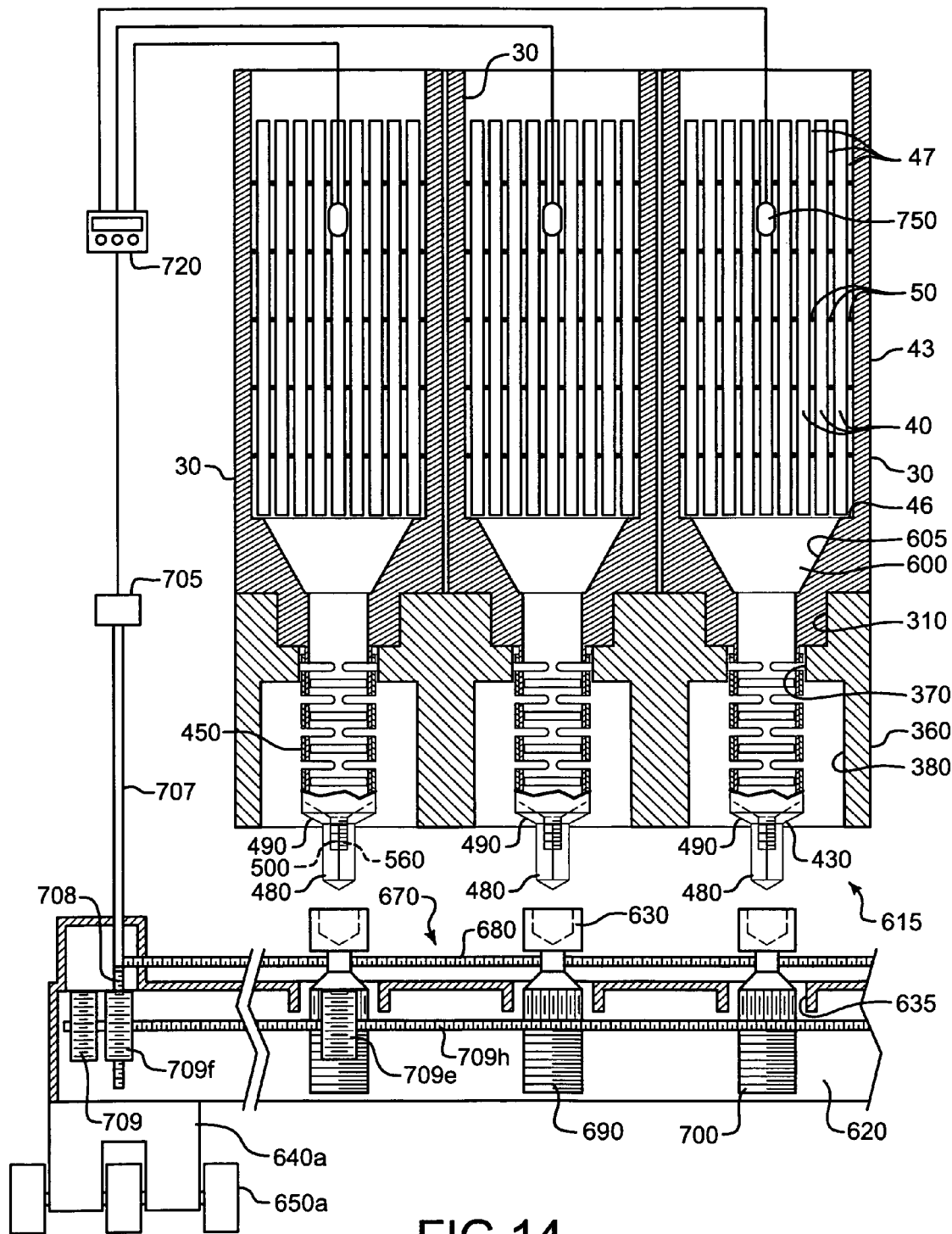
FIG. 14 is a view in vertical section of the plurality of adjacent nuclear fission modules and a plurality of sensors disposed in respective ones of the nuclear fission modules.

As best seen in FIG. 14, flow control assembly 615, and thus flow regulator subassembly 430, are capable of being operated according to or in response to an operating parameter associated with nuclear fission module 30. In this regard, at least one sensor 750 may be disposed in nuclear fission module 30 to sense status of the operating parameter. The operating parameter sensed by sensor 750 may be current temperature in nuclear fission module 30. Alternatively, the operating parameter sensed by sensor 750 may have been a previous temperature in nuclear fission module 30. In order to sense temperature, sensor 750 may be a thermocouple device or temperature sensor that may be available from Thermocoax, Incorporated located in Alpharetta, Ga. U.S.A. As another alternative, the operating parameter sensed by sensor 750 may be neutron flux in nuclear fission module 30. In order to sense neutron flux, sensor 750 may be a "PN9EB20/25" neutron flux proportional counter detector or the like, such as may be available from Centronic House, Surrey, England. As another example, the operating parameter sensed by sensor 750 may be a characteristic isotope in nuclear fission module 30. The characteristic isotope may be a fission product, an activated isotope, a transmuted product produced by breeding or other characteristic isotope. Another example is that the operating parameter sensed by sensor 750 may be neutron fluence in nuclear fission module 30. As well known in the art, neutron fluence is defined as the neutron flux integrated over a certain time period and represents the number of neutrons per unit area that passed during that time. As yet another example, the operating parameter sensed by sensor 750 may be fission module pressure, which may be a dynamic fluid pressure of approximately 10 bars (i.e., approximately 145 psi) for an exemplary sodium cooled reactor or approximately 138 bars (i.e., approximately 2000 psi) for an exemplary pressurized "light" water cooled reactor during normal operation. Alternatively, fission module pressure that is sensed by sensor 750 may be a static fluid pressure or a fission product pressure. In order to sense either dynamic or static fission module pressure, sensor 750 may be a custom designed pressure detector that may be available from Kaman Measuring Systems, Incorporated located in Colorado Springs, Colo. U.S.A. As another alternative, sensor 750 may be a suitable flow meter such as a "BLANCETT 1100 TURBINE FLOW METER", that may be available from Instrumart, Incorporated located in Williston, Vt. U.S.A. In addition, the operating parameter sensed by sensor 750 may be determined by a suitable computer-based algorithm. A variety of algorithms can be implemented, including those such as the ideal gas law, PV=nRT, or known algorithms that produce signals indicative of pressure or temperature from direct or indirect measurement of other properties, such as flows, temperatures, electrical properties, or other. According to yet another example, the operating parameter may be operator initiated action. That is, flow regulator subassembly 430 is capable of being modified in response to any suitable operating parameter determined by a human operator. Further, flow regulator subassembly 430 is capable of being modified in response to an operating parameter determined by a suitable feedback control. Also, flow regulator subassembly 430 is capable of being modified in response to an operating parameter determined by an automated control system. Moreover, flow regulator subassembly 430 is capable of being modified in response to a change in decay heat. In this regard, decay heat decreases in the "tail" of burn wave 290 (see FIG. 4). Detection of the presence of the tail of burn wave 290 is used to decrease coolant flow rate over time to account for this decrease in decay heat found in the tail of burn wave 290. This is particularly the case when nuclear fission module 30 resides behind burn wave 290. In this case, flow regulator subassembly 430 accounts for changes in decay heat output of nuclear fission module 30 as the distance of nuclear fission module 30 from burn wave 290 changes. Sensing status of such operating parameters can facilitate suitable control and modification of flow control assembly 615 operation and thus suitable control and modification of temperature in reactor core 20.

Referring to FIGS. 14, 15, 17, 18 and 19, it should be understood from the description hereinabove that flow regulator subassembly 430 is reconfigurable according to a predetermined input to controllers 720 and 740, so that controllers 720 and 740 in combination with flow regulator subassembly 430 suitably control fluid flow. That is, the predetermined input to controllers 720 and 740 is a signal produced by the previously mentioned sensor 750. For example, the predetermined input to controllers 720 and 740 may be a signal produced by the previously mentioned thermocouple or temperature sensor. Alternatively, the predetermined input to controllers 720 and 740 may be a signal produced by the previously mentioned fluid flow meter. As another alternative, the predetermined input to controllers 720 and 740 may be a signal produced by the previously mentioned neutron flux detector. As another example, signals received by controllers 720 and 740 may have been processed by reactor control systems (not shown). For example, the signals produced by such a reactor control system may come from a meter or detector and get processed either by a computer or operator in a reactor control room and then go out to carriage subassembly 610, so as to move bridge 620 and socket wrenches 630 to operate flow regulator subassembly 430.

Figure 10:
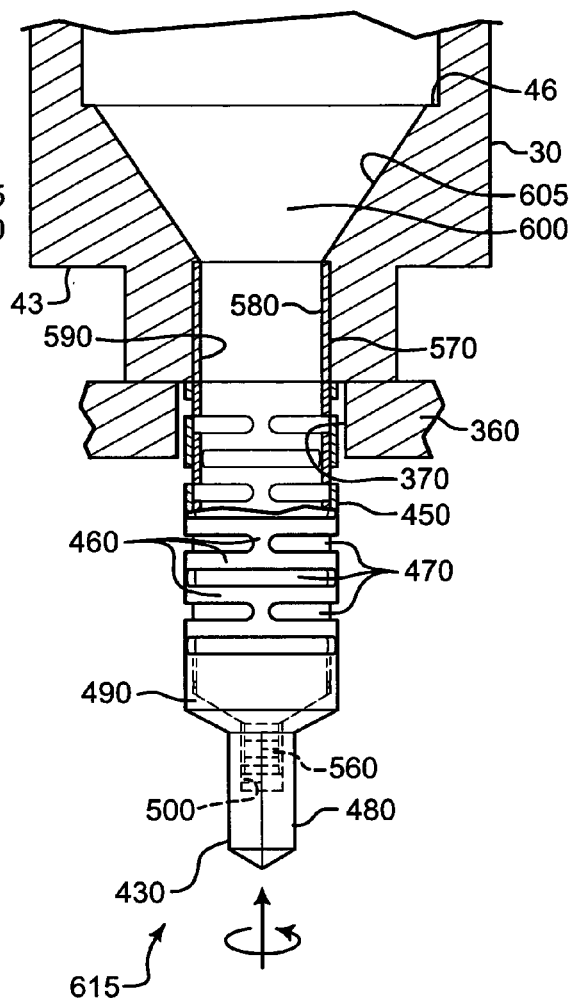
FIG. 10 is a view in partial elevation of the flow regulator subassembly coupled to the nuclear fission module and in a fully closed position for preventing fluid flow into the nuclear fission module.

Referring to FIGS. 4, 10, and 14, it may be understood by a person of skill in the art that, based on the teachings herein, flow control assembly 615 can be capable of controlling or modulating flow of the coolant according to when traveling burn wave 290 arrives at and/or departs from nuclear fission module 30. Also, flow control assembly 615 is capable of controlling or modulating flow of the coolant according to when traveling burn wave 290 is proximate to or in the vicinity of nuclear fission module 30. Flow control assembly 615 is also capable of controlling or modulating flow of the coolant according to the previously mentioned width "x" of burn wave 290. Arrival and departure of burn wave 290, as burn wave 290 travels through nuclear fission module 30, is detected by sensing any of the previously mentioned operating parameters. For example, flow control assembly 615 is capable of controlling or modulating flow of the coolant according to heat generation rate sensed in nuclear fission module 30. It should be apparent to those skilled in the art that, in some cases, an input signal alone may control modification of flow control assembly 615 and the associated fluid flow in nuclear fission module 30.

Referring to FIGS. 14 and 15, and as previously mentioned, flow control assembly 615 is operated to provide variable fluid flow to a selected one of nuclear fission modules 30. Nuclear fission module 30 is selected on the basis of the desired value for the operating parameter (e.g., temperature) in nuclear fission module 30 compared to the actual value of the operating parameter that is sensed in nuclear fission module 30. As described in more detail presently, fluid flow to nuclear fission module 30 is adjusted to bring the actual value for the operating parameter into substantial agreement with the desired value for the operating parameter. To achieve this result, bridge 620 that belongs to carriage subassembly 630 is caused to travel along tracks 660a and 660b by simultaneously actuating bridge movers 640a and 640b. As bridge 620 travels along tracks 660a and 660b, the bridge 620 will travel underneath core lower support plate 360. Bridge 620 eventually stops its travel at a predetermined location underneath core lower support plate 360 based on the actual value of the operating parameter sensed by sensors 750 in nuclear fission module 30 compared to the desired value of the operating parameter for nuclear fission module 30, as described in more fully presently. Activation and extent of travel of bridge movers 640a and 640b may be controlled by a suitable controller, such as by controllers 720 or 740. In this regard, controllers 720 or 740 will stop the travel of bridge 620 based on location of the selected one of the plurality of nuclear fission modules 30. As mentioned hereinabove, the nuclear fission module 30 to be adjusted can be selected on the basis of whether or not there is substantial agreement between the actual value of the operating parameter sensed by sensor 750 and the value of the operating parameter desired for nuclear fission module 30. Next, a selected one of the plurality of hexagonal socket wrenches 630 is caused to move vertically upwardly to matingly engage hexagonal first nipple 480. After engagement of socket wrench 630 with first nipple 480, shaft 700 is caused to rotate in order to rotate socket wrench 630. Shaft 700 is caused to rotate either by means of the previously mentioned lead screw arrangement 670, first electric motors 710, or second electric motors 730 that are coupled to controllers 720 or 740.

Referring to FIGS. 7, 8, 8A, 8B, 8C, 8D, 8E, 9, 10, 11, 12, 13, 14, 15, 16, 17, 18 and 19, after engagement with first nipple 480, rotation of socket wrench 630 in a first direction causes first or outer sleeve 450 to rotate in the same first direction. As outer sleeve 450 rotates, outer sleeve 450 will axially slidably ascend along the exterior of inner sleeve 530 due to the threaded engagement of first nipple 480 belonging to outer sleeve 450 and second nipple 560 belonging to inner sleeve 530. As outer sleeve 450 slides upwardly along inner sleeve 530, first ligaments 460 of outer sleeve 450 will progressively close, cover, shut-off and otherwise block second holes 550 of inner sleeve 530 and second ligaments 540 of inner sleeve 530 will simultaneously progressively close, cover, shut-off and otherwise block first holes 470 of outer sleeve 530. Progressively closing, covering, shutting-off and otherwise blocking first holes 470 and second holes 550 variably reduces flow of the coolant through first holes 470 and second holes 550. In this case, second holes 550 and first holes 470 may have been previously aligned for allowing full flow of coolant therethrough. Alternatively, second holes 550 and first holes 470 may have been previously partially aligned for allowing partial flow of coolant therethrough.

Referring again to FIGS. 7, 8, 8A, 8B, 8C, 8D, 8E, 9, 10, 11, 12, 13, 14, 15, 16, 17, 18 and 19, after engagement with first nipple 480, rotation of socket wrench 630 in a second direction opposite the first direction causes first or outer sleeve 450 to rotate in the second direction. As outer sleeve 450 rotates, outer sleeve 450 will axially slidably descend along the exterior of inner sleeve 530 due to the threaded engagement of first nipple 480 belonging to outer sleeve 450 and second nipple 560 belonging to inner sleeve 530. As outer sleeve 450 slides downwardly along inner sleeve 530, first ligaments 460 of outer sleeve 450 will progressively open, uncover, reveal and otherwise unblock second holes 550 of inner sleeve 530 and second ligaments 540 of inner sleeve 530 will simultaneously progressively open, uncover, reveal and otherwise unblock first holes 470 of outer sleeve 530. Progressively opening, uncovering, revealing and otherwise unblocking first holes 470 and second holes 550 variably increases flow of the coolant through first holes 470 and second holes 550. In this case, second holes 550 and first holes 470 may have been previously misaligned for restricting or disallowing flow of coolant therethrough. Alternatively, second holes 550 and first holes 470 may have been previously partially misaligned for partially restricting or partially disallowing flow of coolant therethrough.

Thus, use of flow control assembly 615, which includes flow regulator subassembly 430 and carriage subassembly 610, achieves variable coolant flow on a module-by-module (i.e., fuel assembly-by-fuel assembly) basis. This allows coolant flow to be varied across reactor core 20 according to the location of burn wave 290 or the non-uniform temperature distribution in reactor core 20.

Illustrative Methods

Illustrative methods associated with exemplary embodiments of a nuclear fission reactor and flow control assembly will now be described.

Figure 20Q:
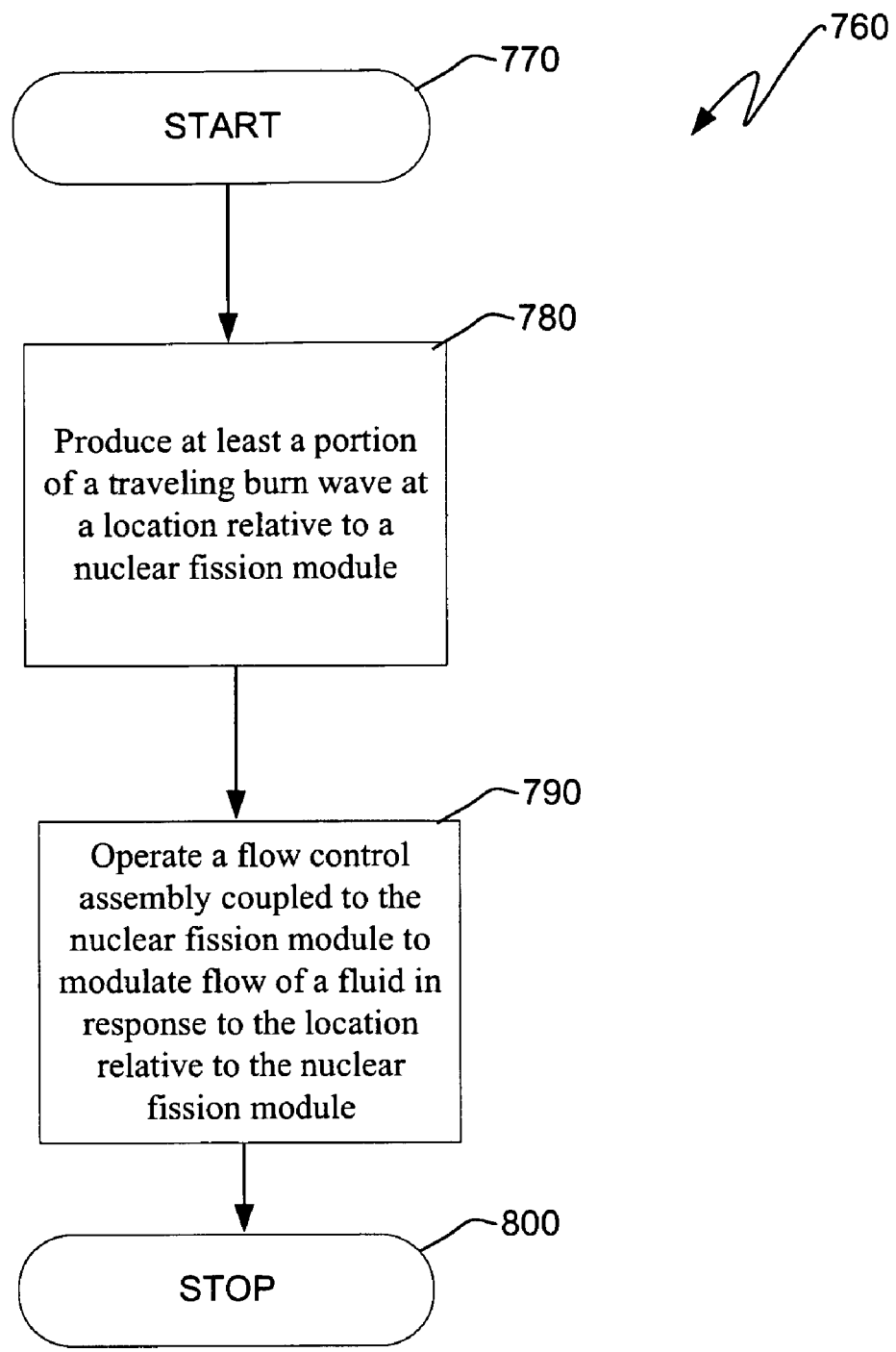
FIGS. 20A-20S are flowcharts of illustrative methods of operating the nuclear fission reactor.
Figure 20B:
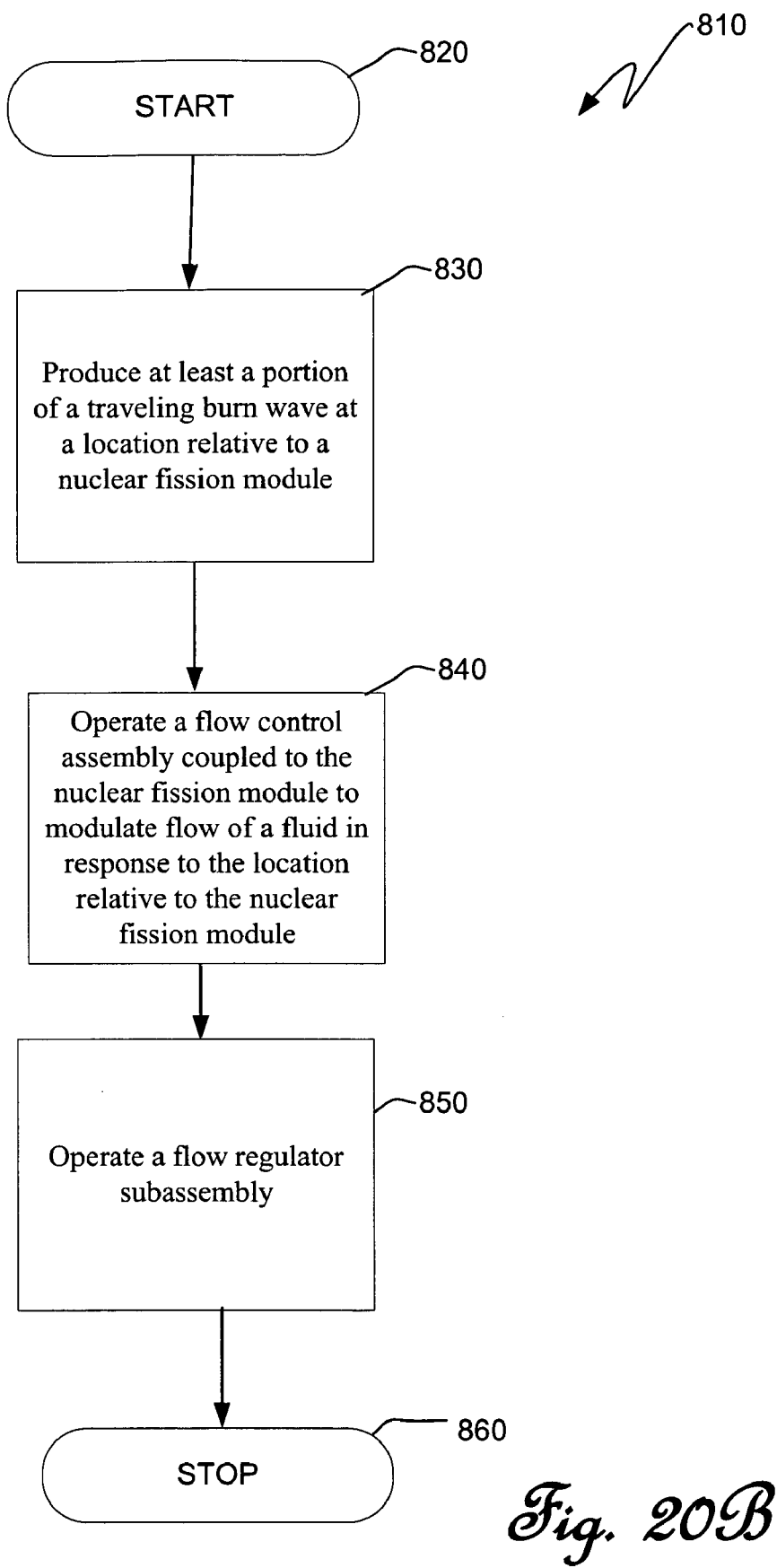
Figure 20C:
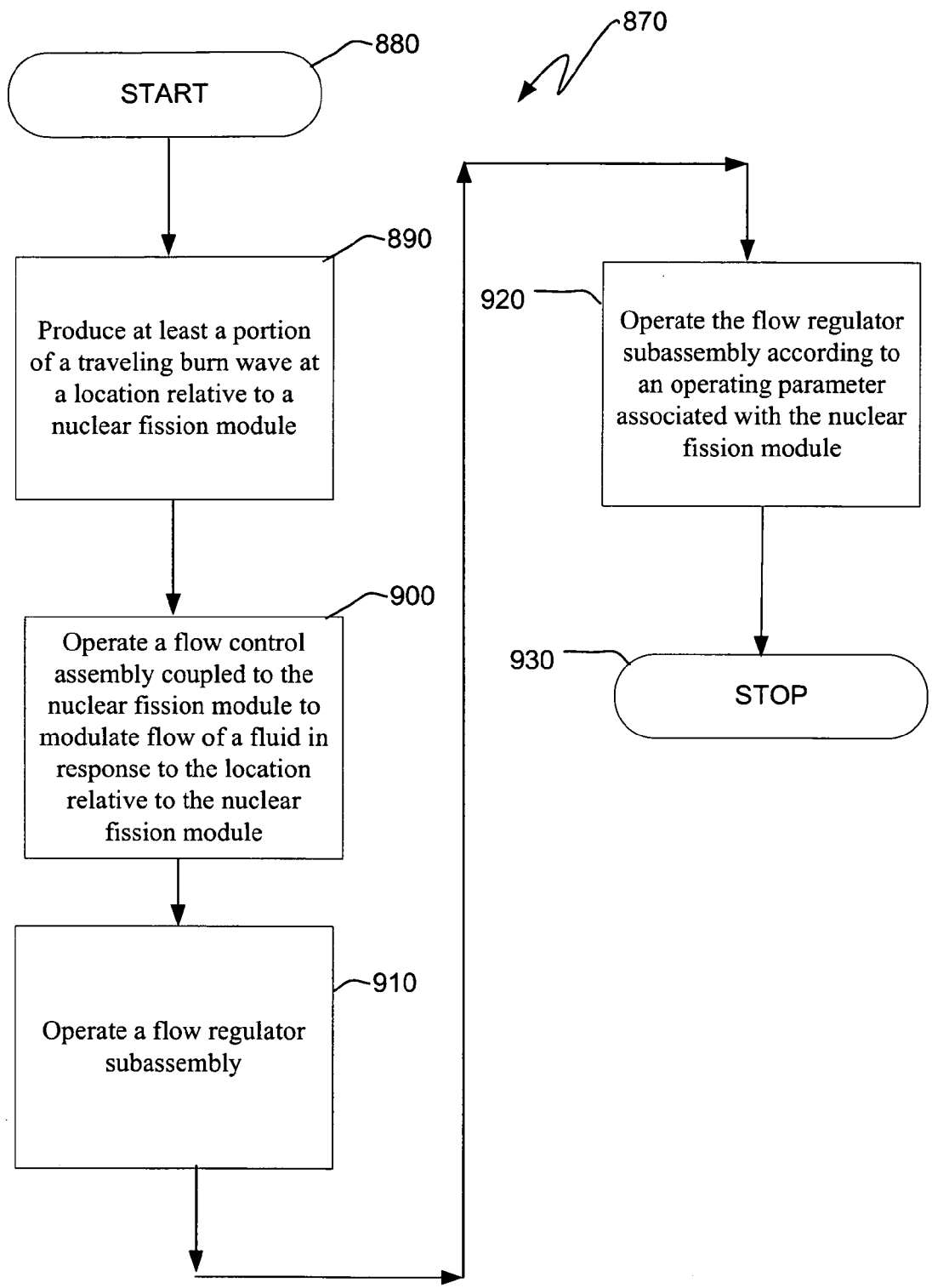
Figure 20D:
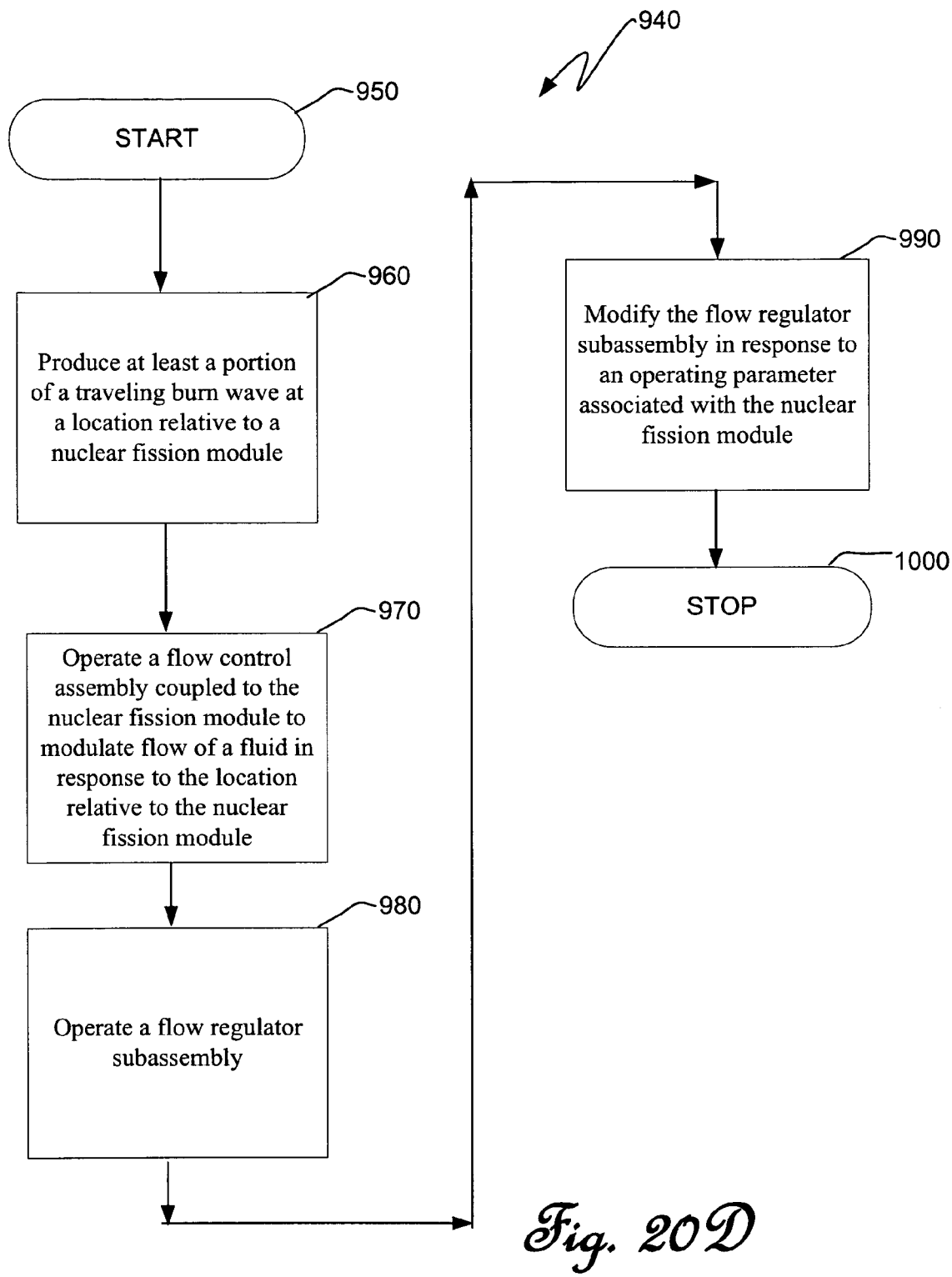
Figure 20E:
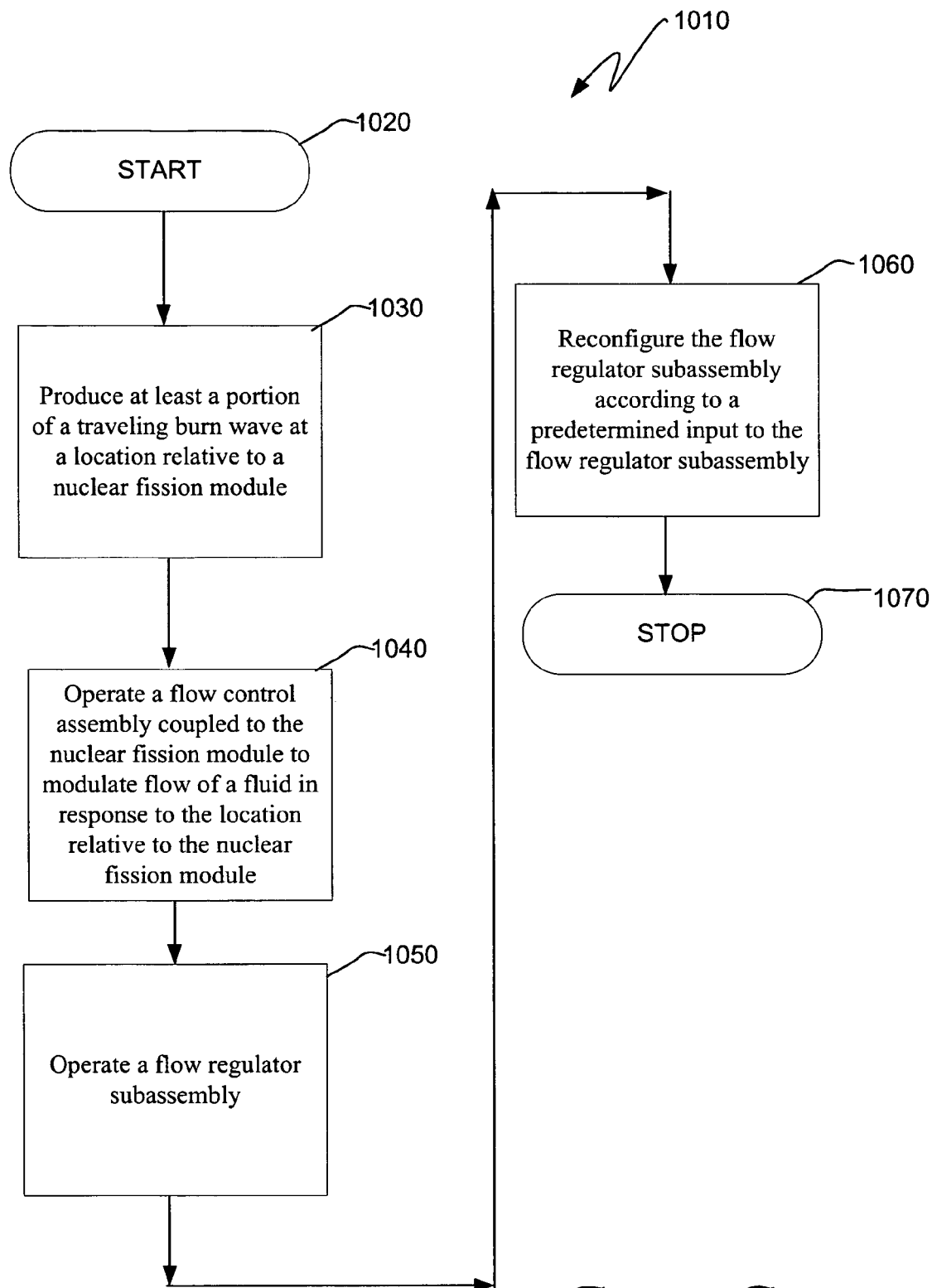
Figure 20F:
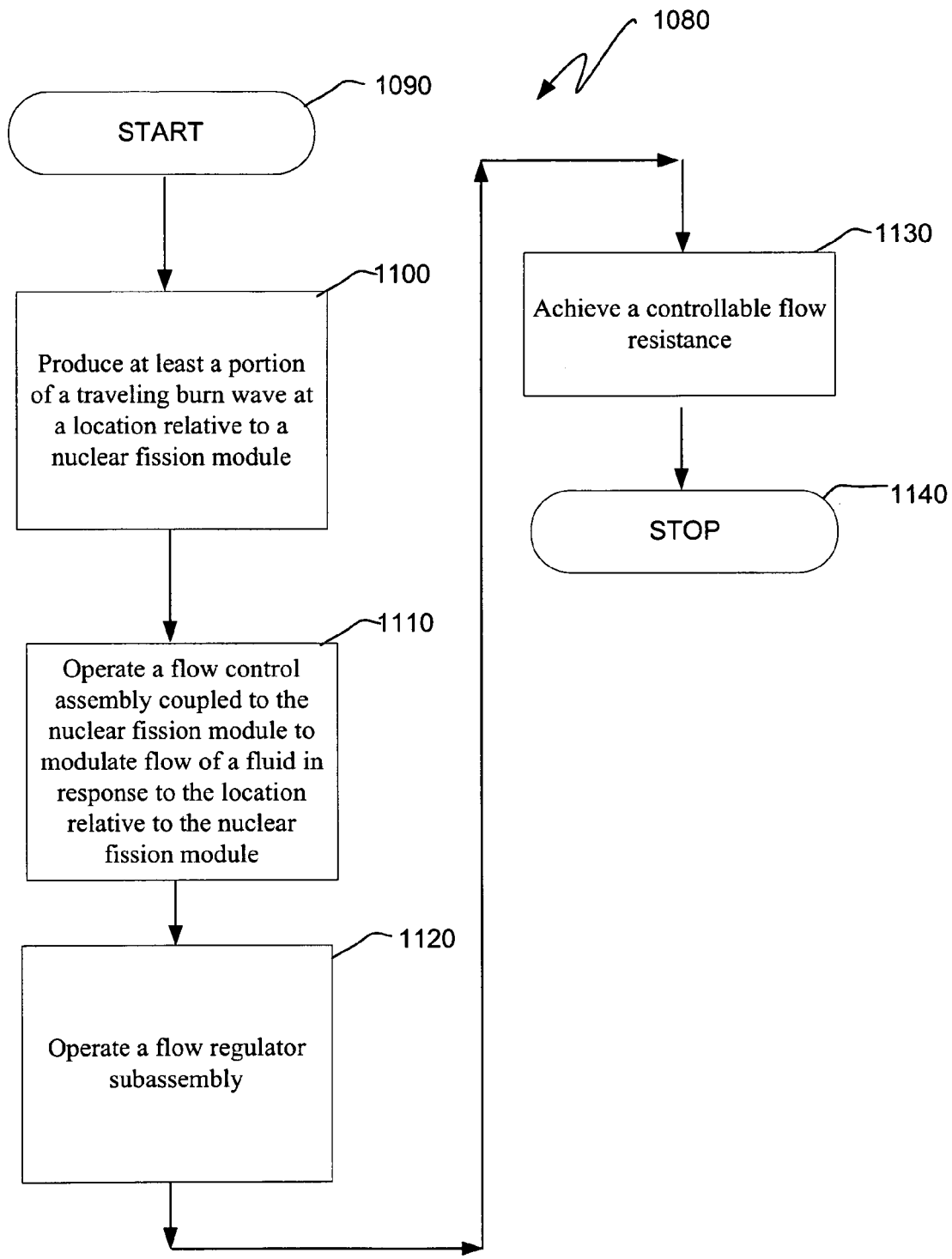
Figure 20G:
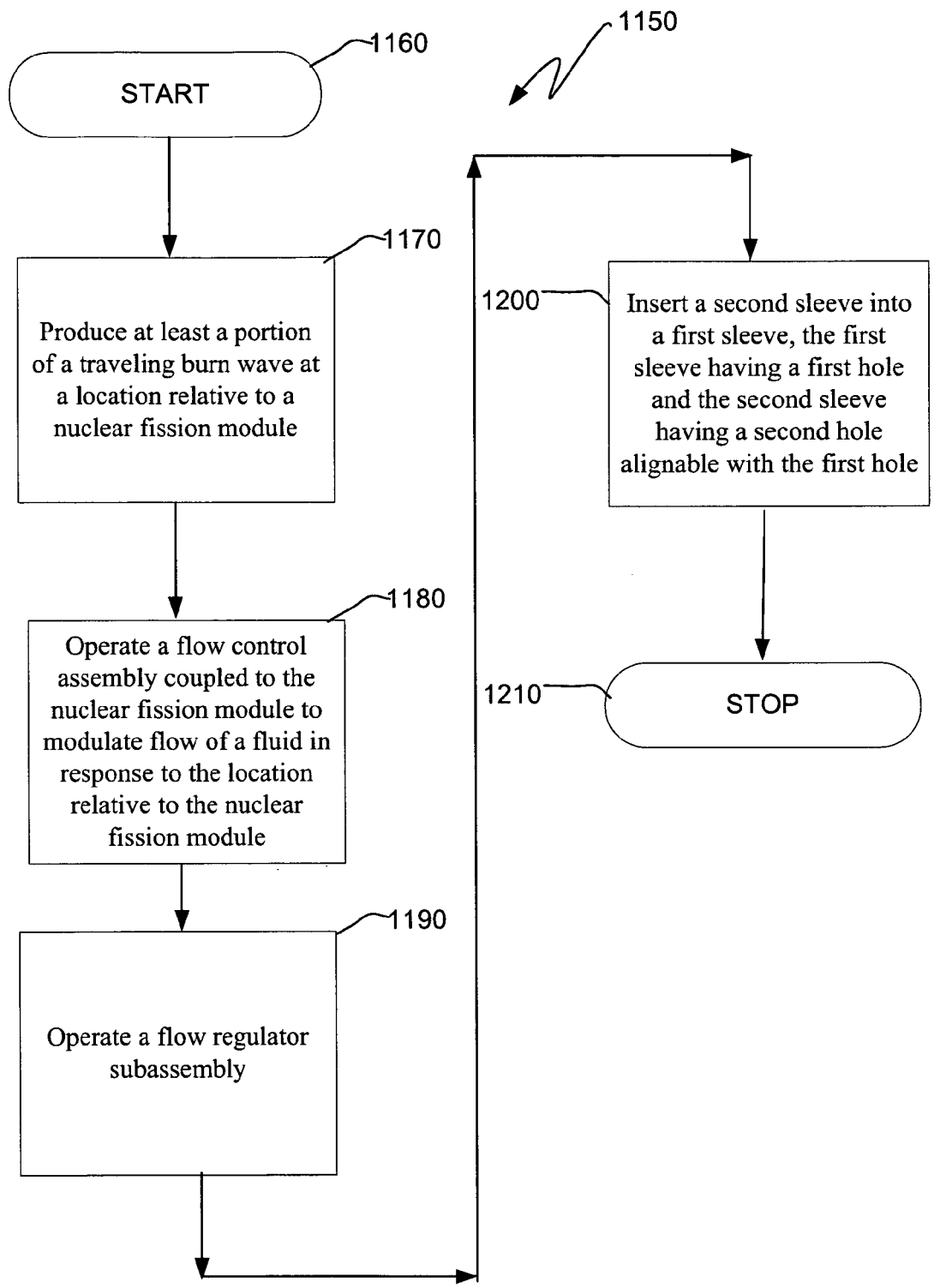
Figure 20H:
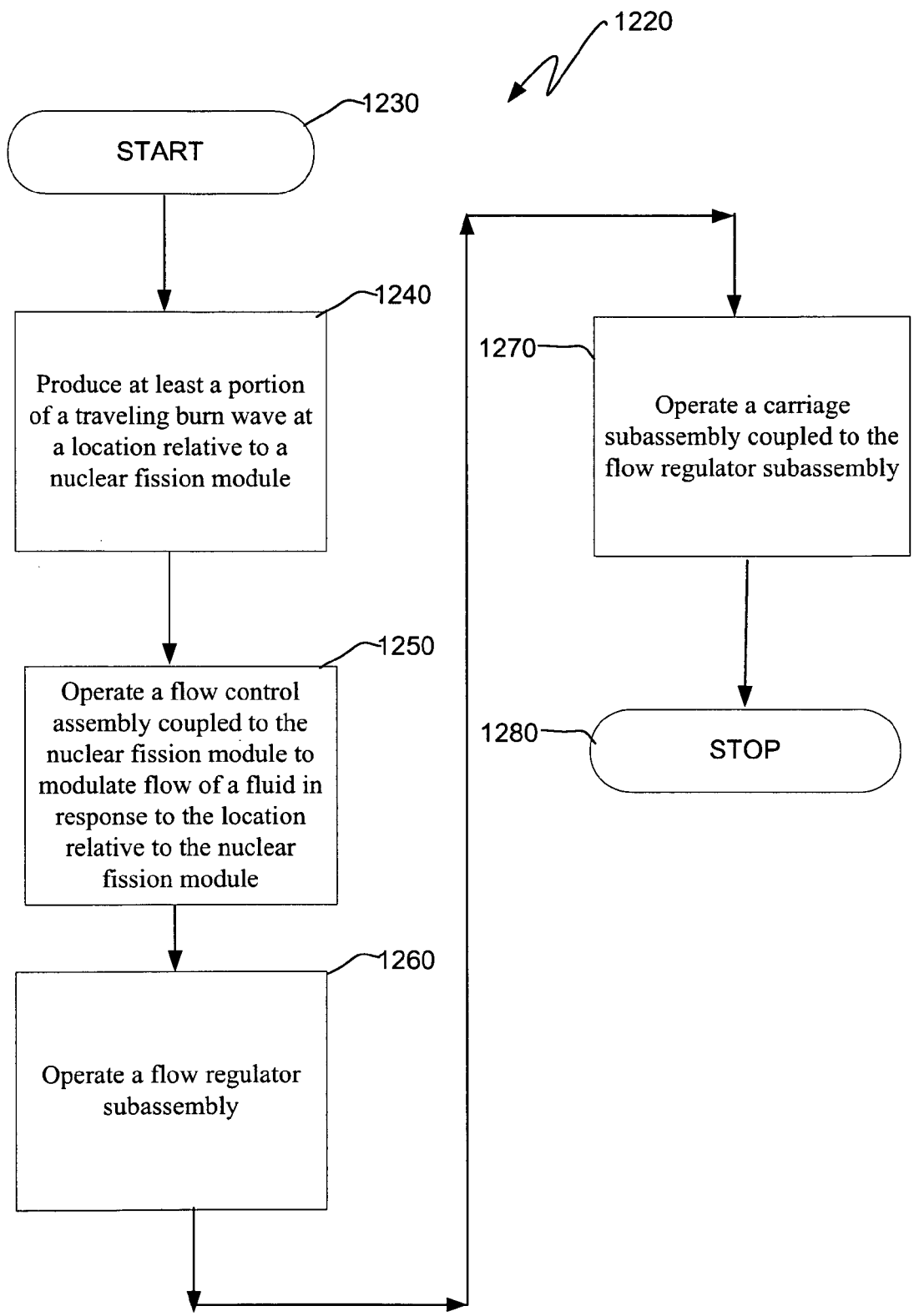
Figure 20J:
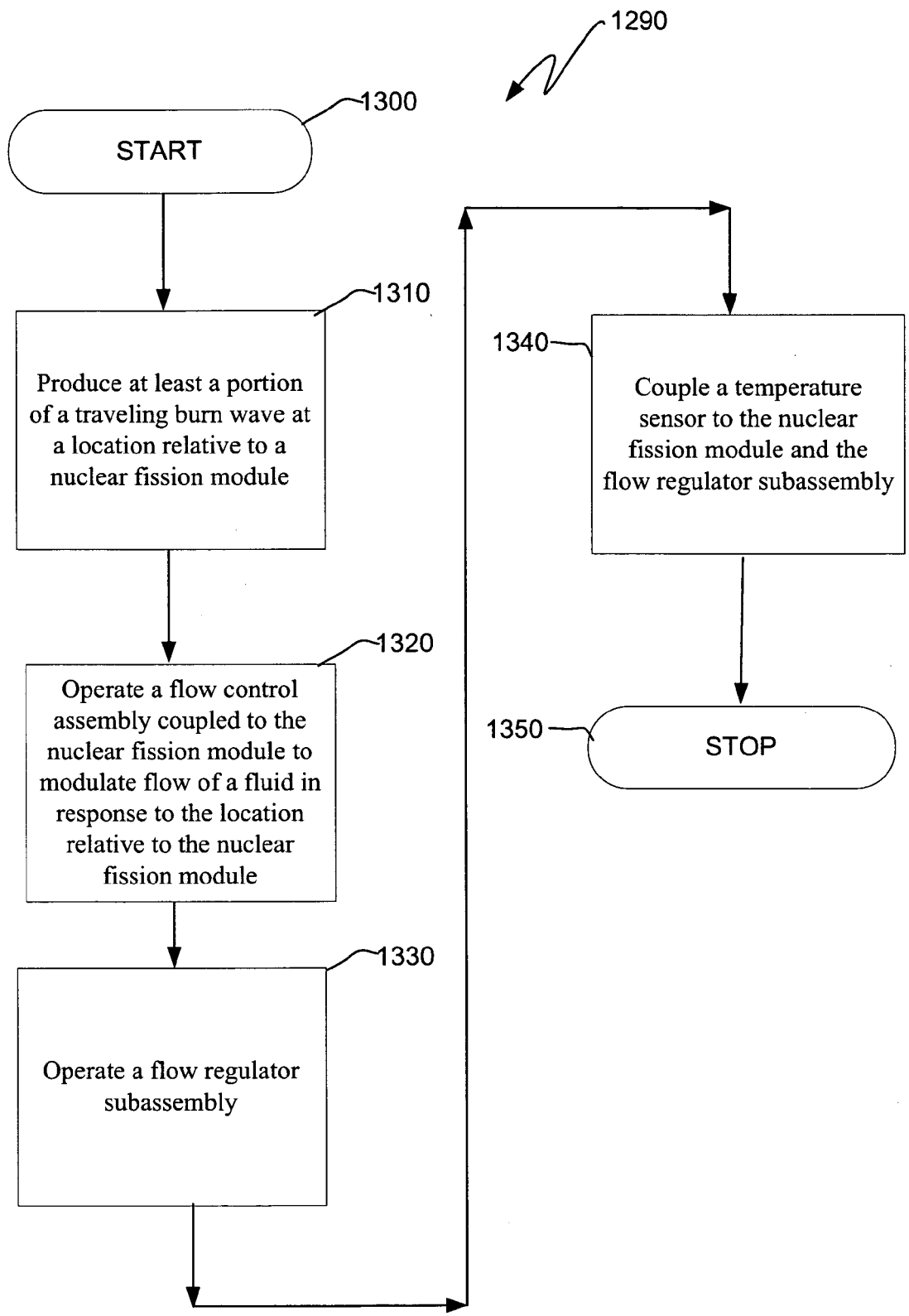
Figure 20F:
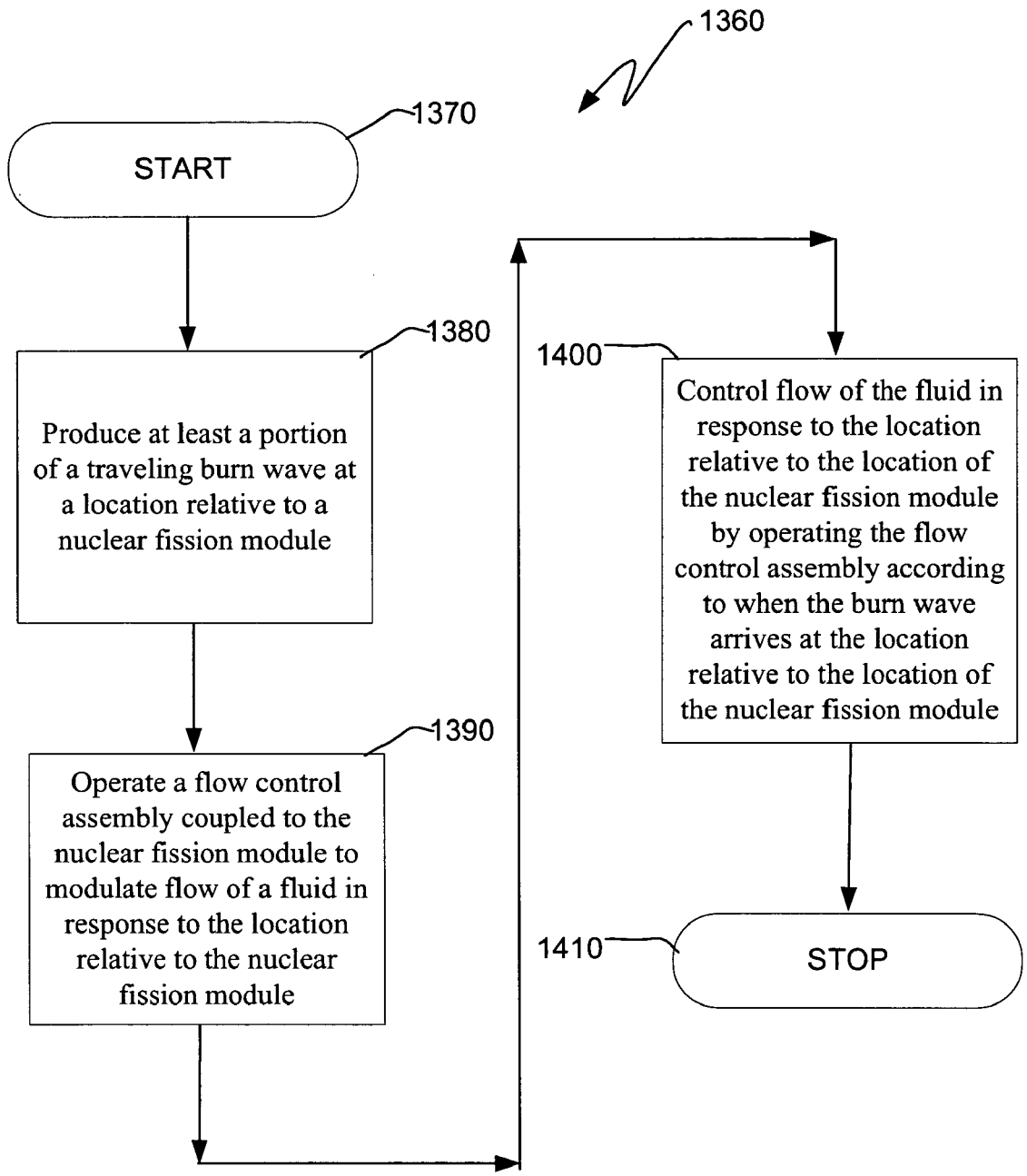
Figure 20K:
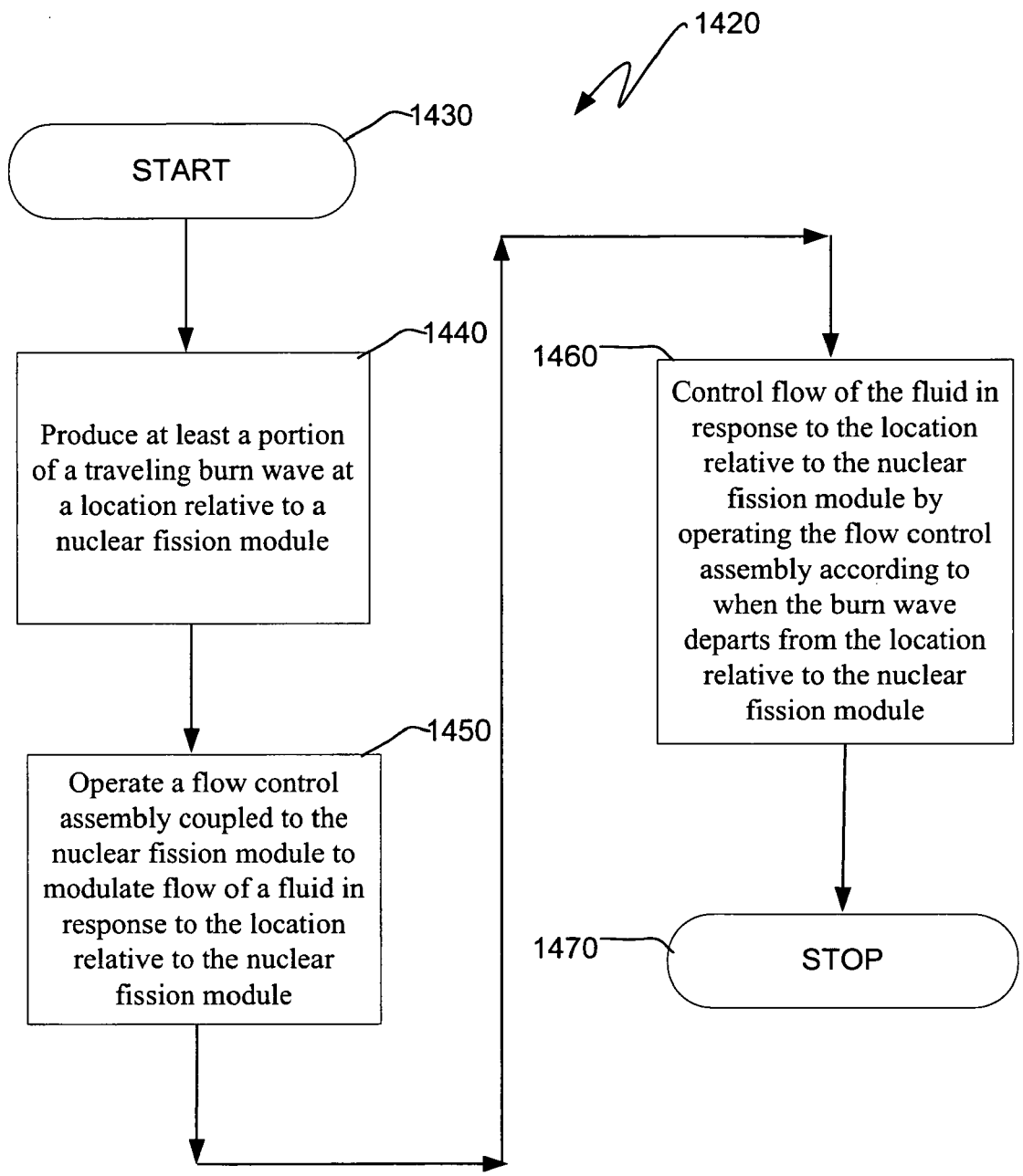
Figure 20L:
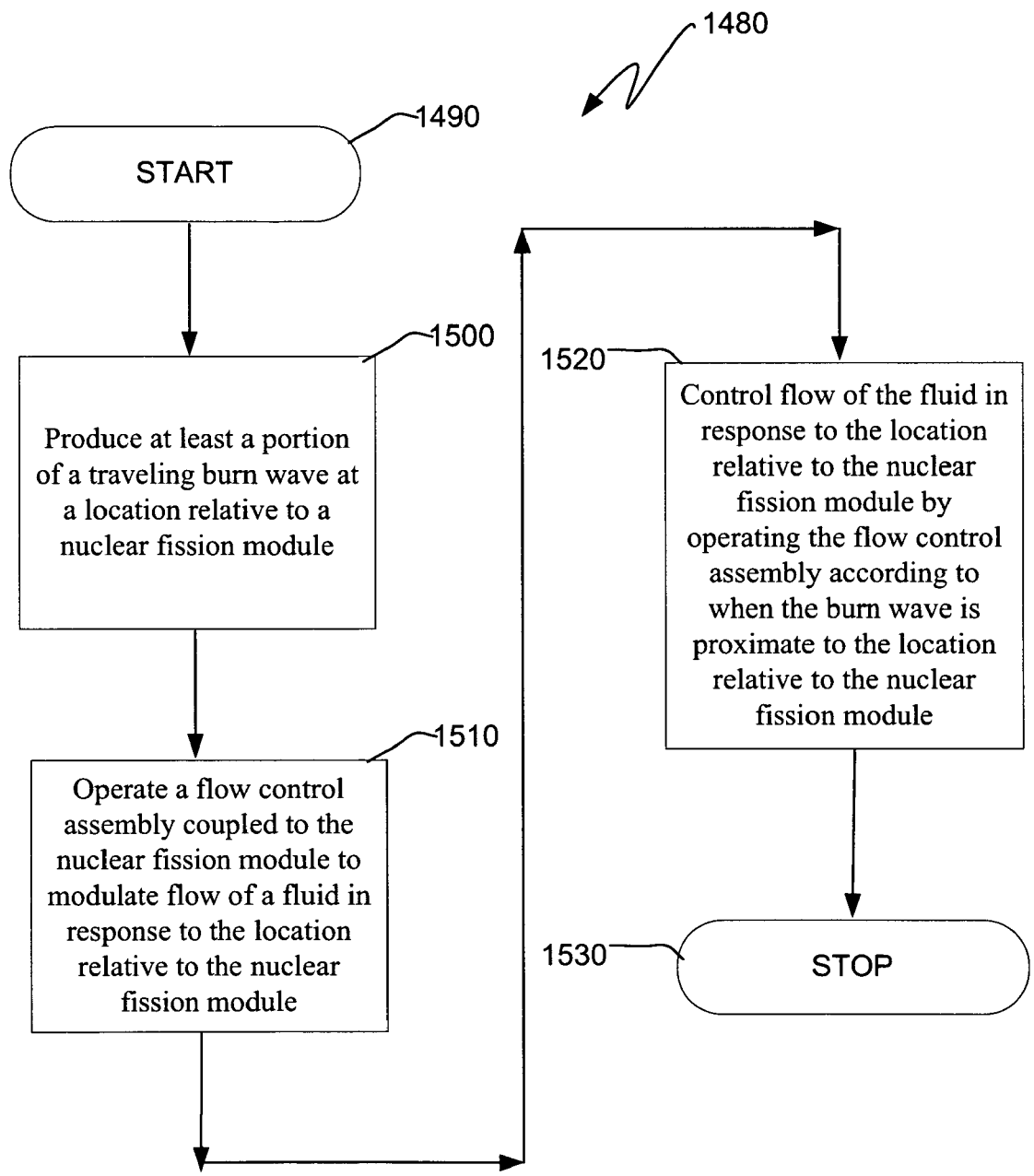
Figure 20M:
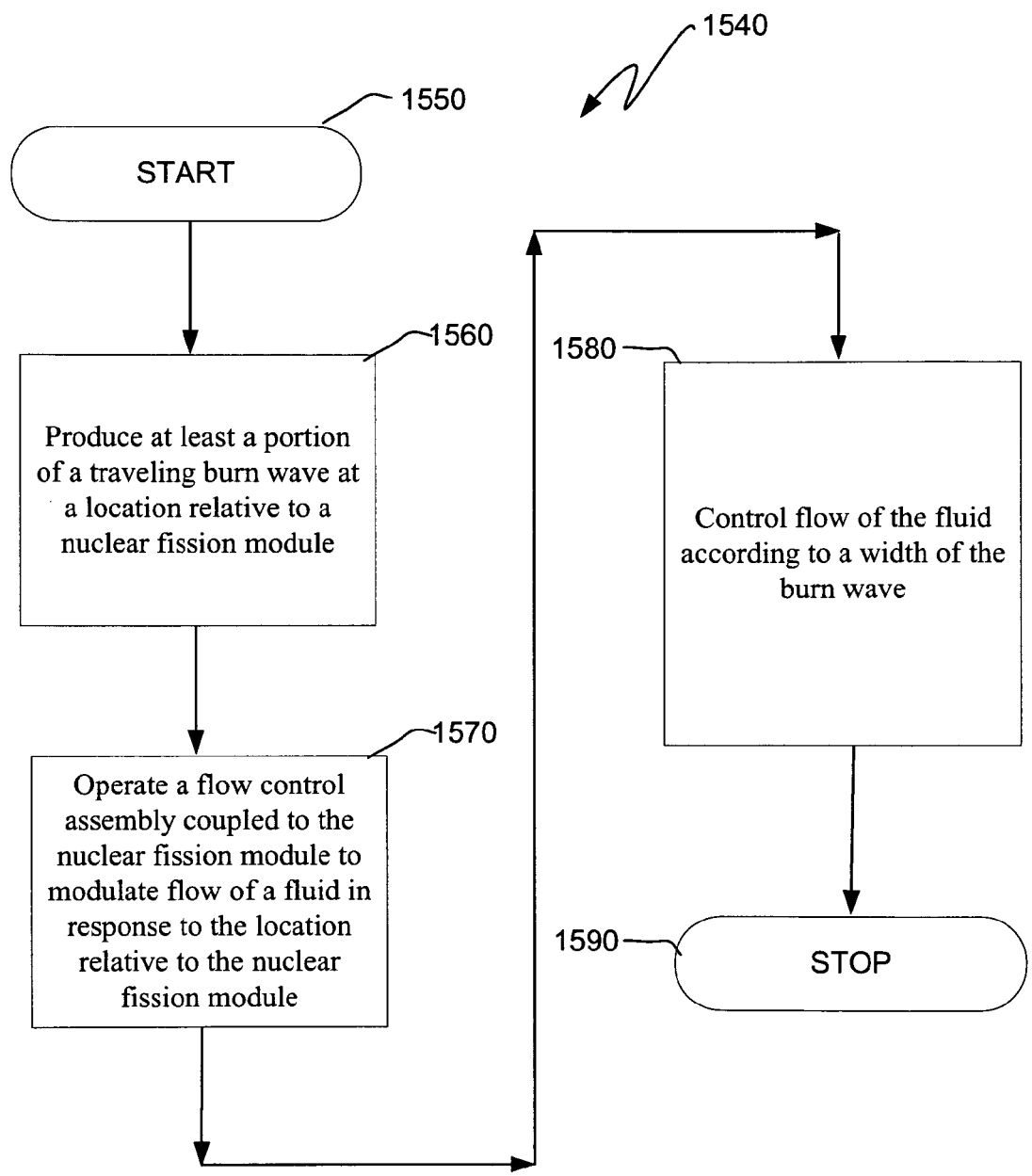
Figure 20H:
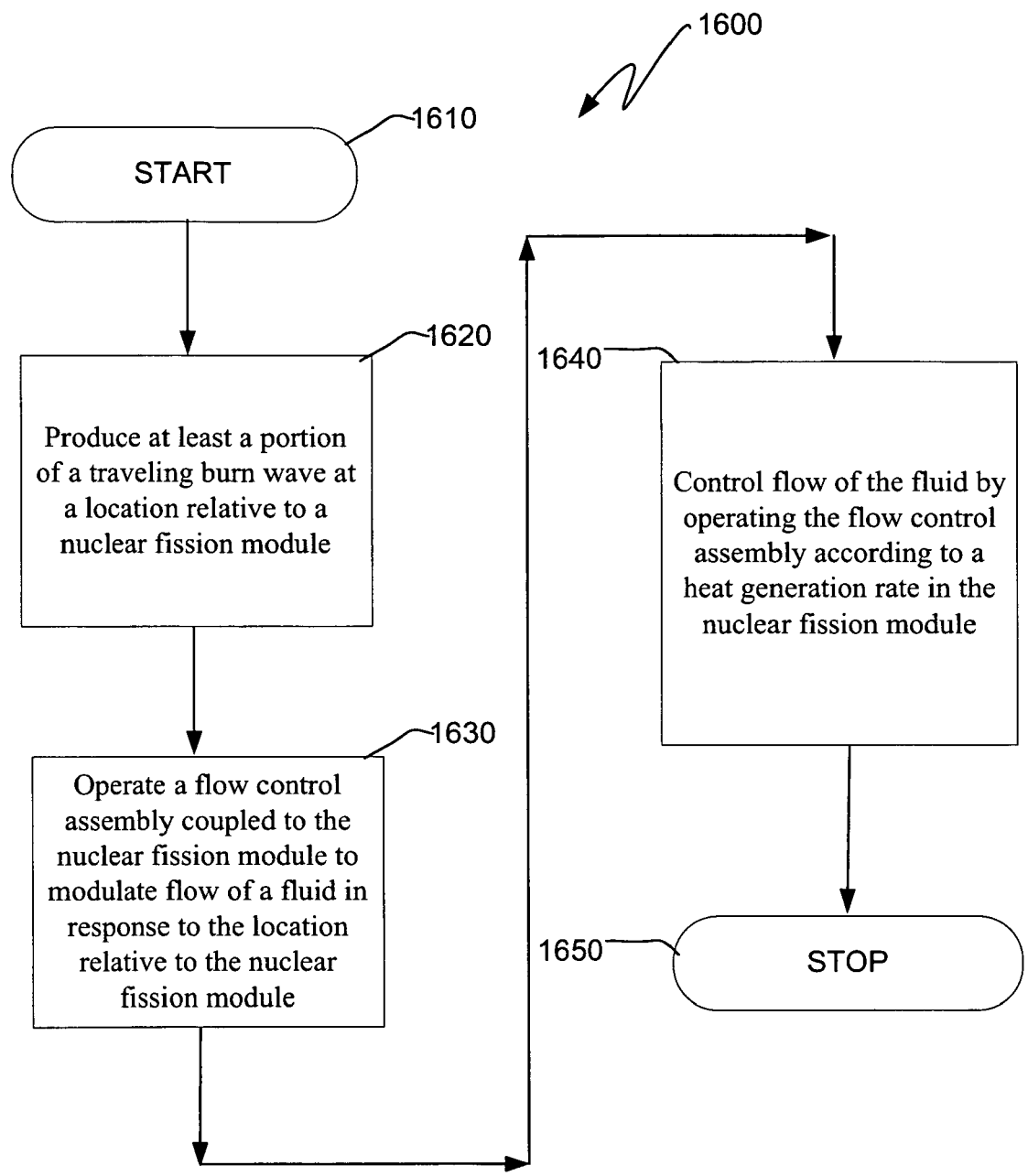
Figure 20O:
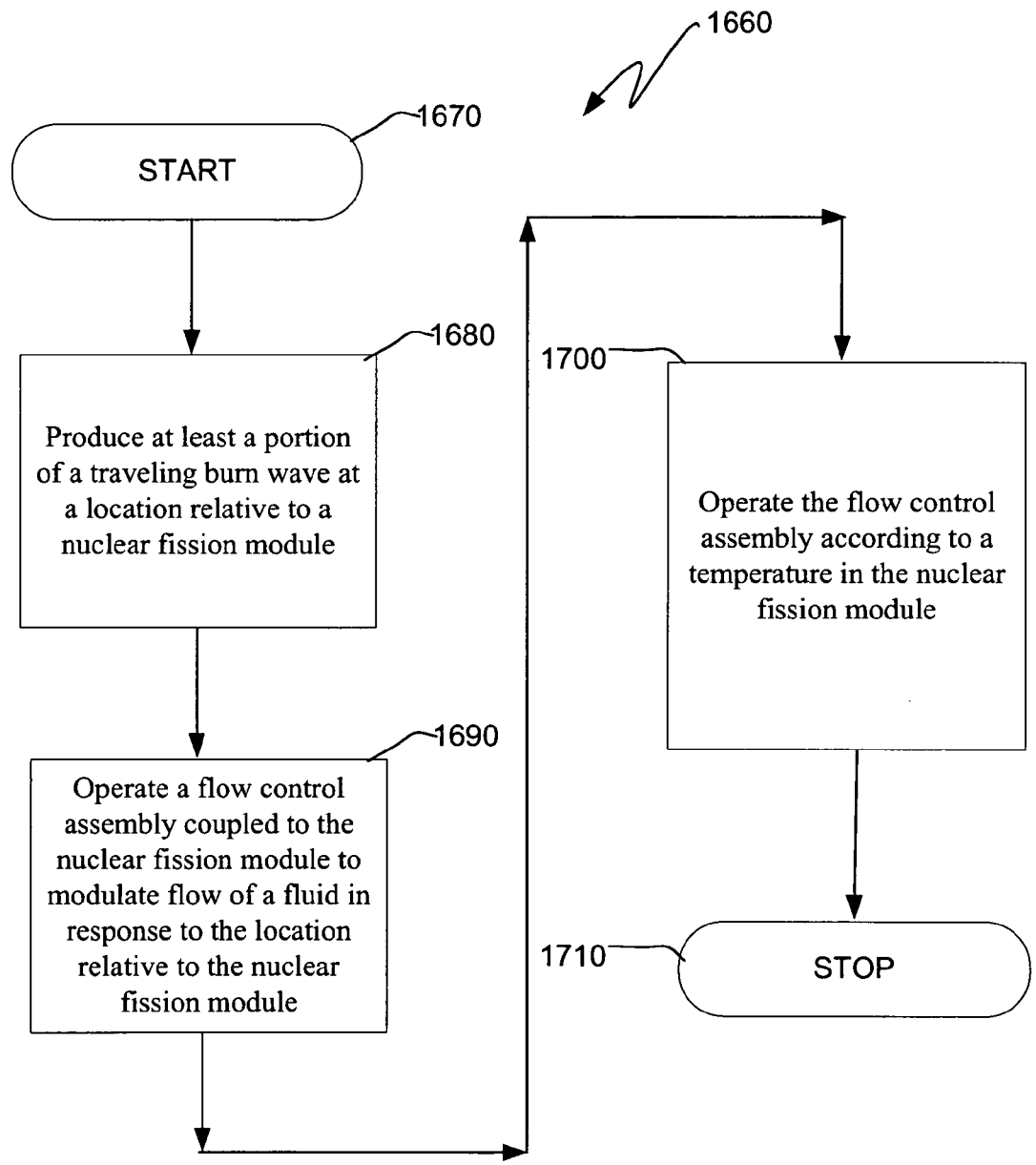
Figure 20P:
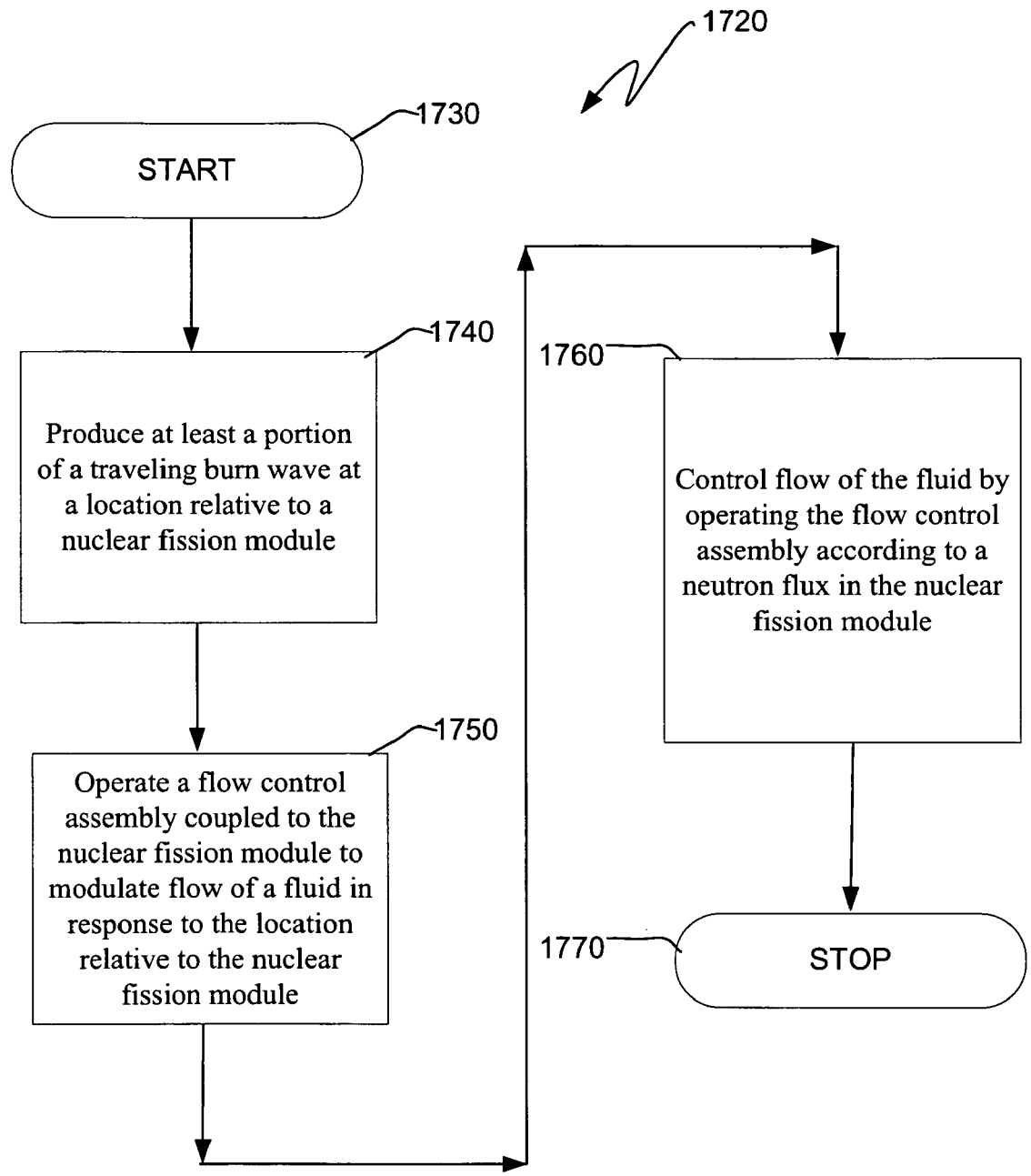
Figure 20Q:
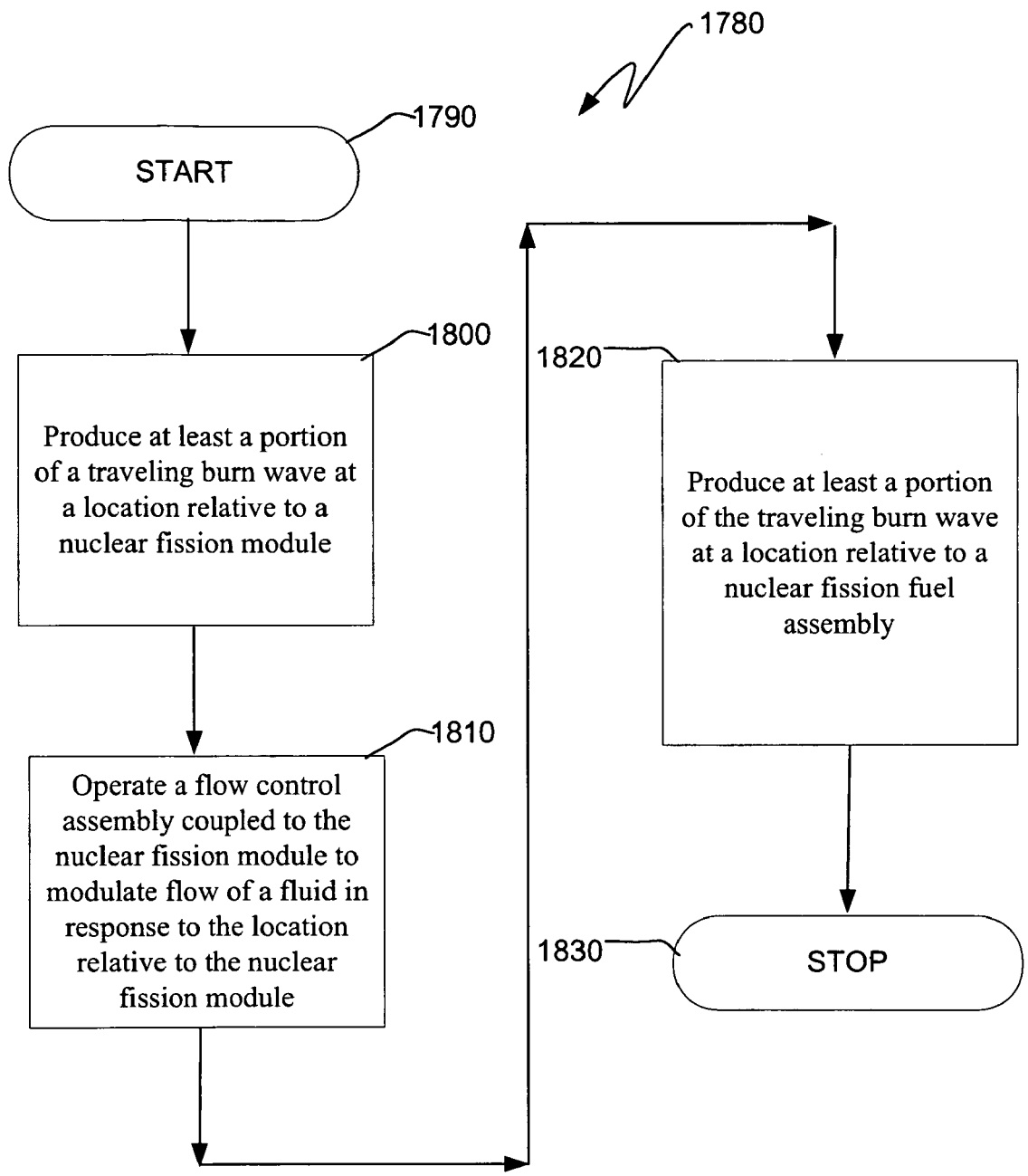
Figure 20R:
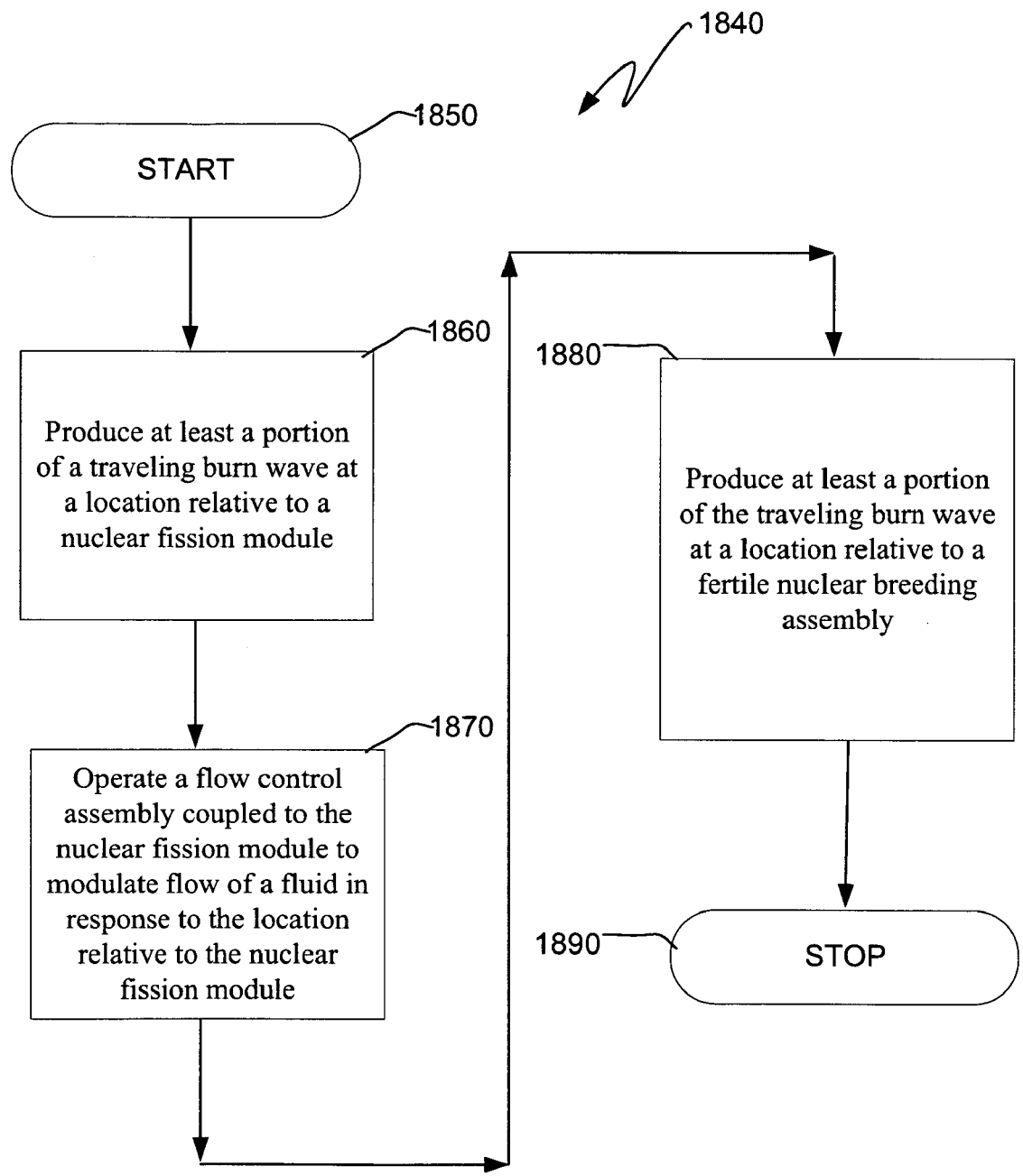
Figure 20S:
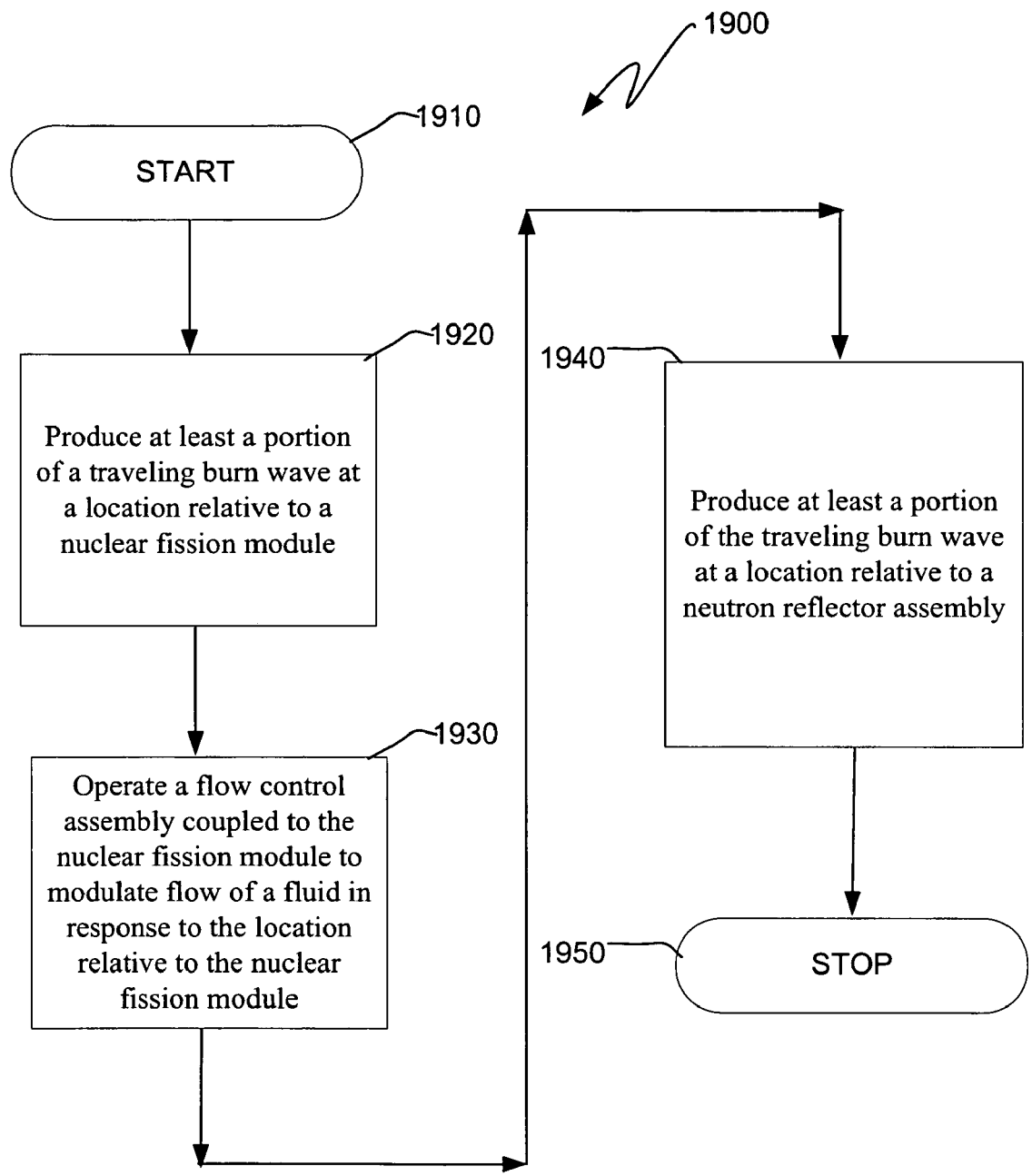

Referring to FIGS. 20A-20S, illustrative methods are provided for operating a nuclear fission reactor.

Turning now to FIG. 20A, an illustrative method 760 of operating a nuclear fission reactor starts at a block 770. At a block 780, the method comprises producing at least a portion of a traveling burn wave at a location relative to a nuclear fission module. At a block 790, a flow control assembly is operated to modulate flow of a fluid in response to the location relative to the nuclear fission module. The method stops at a block 800.

In FIG. 20B, an illustrative method 810 of operating a nuclear fission reactor starts at a block 820. At a block 830, at least a portion of a traveling burn wave is produced at a location relative to a nuclear fission module. At a block 840, a flow control assembly that is coupled to the nuclear fission module is operated to modulate flow of a fluid in response to the location relative to the nuclear fission module. At a block 850, a flow regulator subassembly is operated. The method stops at a block 860.

In FIG. 20C, another illustrative method 870 of operating a nuclear fission reactor starts at a block 880. At a block 890, at least a portion of a traveling burn wave is produced at a location relative to a nuclear fission module. At a block 900, a flow control assembly that is coupled to the nuclear fission module is operated to modulate flow of a fluid in response to the location relative to the nuclear fission module. A flow regulator subassembly is operated at a block 910. At a block 920, the flow regulator subassembly is operated according to an operating parameter associated with the nuclear fission module. The method stops at a block 930.

In FIG. 20D, a further illustrative method 940 of operating a nuclear fission reactor starts at a block 950. At a block 960, at least a portion of a traveling burn wave is produced at a location relative to a nuclear fission module. At a block 970, a flow control assembly that is coupled to the nuclear fission module is operated to modulate flow of a fluid in response to the location relative to the nuclear fission module. A flow regulator subassembly is operated at a block 980. At a block 990, the flow regulator subassembly is modified in response to an operating parameter associated with the nuclear fission module. The method stops at a block 1000.

In FIG. 20E, another illustrative method 1010 of operating a nuclear fission reactor starts at a block 1020. At least a portion of a traveling burn wave is produced at a location relative to a nuclear fission module at a block 1030. At a block 1040, a flow control assembly that is coupled to the nuclear fission module is operated to modulate flow of a fluid in response to the location relative to the nuclear fission module. A flow regulator subassembly is operated at a block 1050. At a block 1060, the flow regulator subassembly is reconfigured according to a predetermined input to the flow regulator subassembly. The method stops at a block 1070.

In FIG. 20F, still another illustrative method 1080 of operating a nuclear fission reactor starts at a block 1090. At least a portion of a traveling burn wave is produced at a location relative to a nuclear fission module at a block 1100. At a block 1110, a flow control assembly that is coupled to the nuclear fission module is operated to modulate flow of a fluid in response to the location relative to the nuclear fission module. At a block 1120, a flow regulator subassembly is operated. At a block 1130, a controllable flow resistance is achieved. The method stops at a block 1140.

In FIG. 20G, an illustrative method 1150 of operating a nuclear fission reactor starts at a block 1160. At least a portion of a traveling burn wave is produced at a location relative to a nuclear fission module at a block 1170. At a block 1180, a flow control assembly that is coupled to the nuclear fission module is operated to modulate flow of a fluid in response to the location relative to the nuclear fission module. At a block 1190, a flow regulator subassembly is operated. At a block 1200, a second sleeve is inserted into a first sleeve, the first sleeve having a first hole and the second sleeve having a second hole alignable with the first hole. The method stops at a block 1210.

In FIG. 20H, another illustrative method 1220 of operating a nuclear fission reactor starts at a block 1230. At least a portion of a traveling burn wave is produced at a location relative to a nuclear fission module at a block 1240. At a block 1250 a flow control assembly that is coupled to the nuclear fission module is operated to modulate flow of a fluid in response to the location relative to the nuclear fission module. At a block 1260, a flow regulator subassembly is operated. At a block 1270 a carriage subassembly that is coupled to the flow regulator subassembly is operated. The method stops at a block 1280.

In FIG. 20I, an additional illustrative method 1290 of operating a nuclear fission reactor starts at a block 1300. At least a portion of a traveling burn wave is produced at a location relative to a nuclear fission module at a block 1310. At a block 1320, a flow control assembly that is coupled to the nuclear fission module is operated to modulate flow of a fluid in response to the location relative to the nuclear fission module. At a block 1330, a flow regulator subassembly is operated. At a block 1340, a temperature sensor is coupled to the nuclear fission module and the flow regulator subassembly. The method stops at a block 1350.

In FIG. 20J, a further illustrative method 1360 of operating a nuclear fission reactor starts at a block 1370. At least a portion of a traveling burn wave is produced at a location relative to a nuclear fission module at a block 1380. At a block 1390, a flow control assembly that is coupled to the nuclear fission module is operated to modulate flow of a fluid in response to the location relative to the nuclear fission module. At a block 1400, flow of the fluid is controlled in response to the location relative to the location of the nuclear fission module by operating the flow control assembly according to when the burn wave arrives at the location relative to the location of the nuclear fission module. The method stops at a block 1410.

In FIG. 20K, still another illustrative method 1420 of operating a nuclear fission reactor starts at a block 1430. At least a portion of a traveling burn wave is produced at a location relative to a nuclear fission module at a block 1440. At a block 1450, a flow control assembly that is coupled to the nuclear fission module is operated to modulate flow of a fluid in response to the location relative to the nuclear fission module. At a block 1460, flow of the fluid is controlled in response to the location relative to the nuclear fission module by operating the flow control assembly according to when the burn wave departs from the location relative to the nuclear fission module. The method stops at a block 1470.

In FIG. 20L, another illustrative method 1480 of operating a nuclear fission reactor starts at a block 1490. At least a portion of a traveling burn wave is produced at a location relative to a nuclear fission module at a block 1500. At a block 1510, a flow control assembly that is coupled to the nuclear fission module is modulated to modulate flow of a fluid in response to the location relative to the nuclear fission module. At a block 1520, flow of the fluid is controlled in response to the location relative to the nuclear fission module by operating the flow control assembly according to when the burn wave is proximate to the location relative to the nuclear fission module. The method stops at a block 1530.

In FIG. 20M, an illustrative method 1540 of operating a nuclear fission reactor starts at a block 1550. At least a portion of a traveling burn wave is produced at a location relative to a nuclear fission module at a block 1560. At a block 1570, a flow control assembly that is coupled to the nuclear fission module is operated to modulate flow of a fluid in response to the location relative to the nuclear fission module. At a block 1580, flow of the fluid is controlled according to a width of the burn wave. The method stops at a block 1590.

In FIG. 20N, an illustrative method 1600 of operating a nuclear fission reactor starts at a block 1610. At least a portion of a traveling burn wave is produced at a location relative to a nuclear fission module at a block 1620. At a block 1630, a flow control assembly that is coupled to the nuclear fission module is operated to modulate flow of a fluid in response to the location relative to the nuclear fission module. At a block 1640, flow of the fluid is controlled by operating the flow control assembly according to a heat generation rate in the nuclear fission module. The method stops at a block 1650.

In FIG. 20O, an illustrative method 1660 of operating a nuclear fission reactor starts at a block 1670. At least a portion of a traveling burn wave is produced at a location relative to a nuclear fission module at a block 1680. At a block 1690, a flow control assembly that is coupled to the nuclear fission module is operated to modulate flow of a fluid in response to the location relative to the nuclear fission module. At a block 1700, flow of a fluid is controlled by operating the flow control assembly according to a temperature in the nuclear fission module. The method stops at a block 1710.

In FIG. 20P, an illustrative method 1720 of operating a nuclear fission reactor starts at a block 1730. At least a portion of a traveling burn wave is produced at a location relative to a nuclear fission module at a block 1740. At a block 1750, a flow control assembly that is coupled to the nuclear fission module is operated to modulate flow of a fluid in response to the location relative to the nuclear fission module. At a block 1760, flow of the fluid in controlled by operating the flow control assembly according to a neutron flux in the nuclear fission module. The method stops at a block 1770.

In FIG. 20Q, an illustrative method 1780 of operating a nuclear fission reactor starts at a block 1790. At least a portion of a traveling burn wave is produced at a location relative to a nuclear fission module at a block 1800. At a block 1810, a flow control assembly that is coupled to the nuclear fission module is operated to modulate flow of a fluid in response to the location relative to the nuclear fission module. At a block 1820, at least a portion of the traveling burn wave is produced at a location relative to a nuclear fission fuel assembly. The method stops at a block 1830.

In FIG. 20R, an illustrative method 1840 of operating a nuclear fission reactor starts at a block 1850. At least a portion of a traveling burn wave is produced at a location relative to a nuclear fission module at a block 1860. At a block 1870, a flow control assembly that is coupled to the nuclear fission module is operated to modulate flow of a fluid in response to the location relative to the nuclear fission module. At a block 1880, at least a portion of the traveling burn wave is produced at a location relative to a fertile nuclear breeding assembly. The method stops at a block 1890.

In FIG. 20S, an illustrative method 1900 of operating a nuclear fission reactor starts at a block 1910. At least a portion of a traveling burn wave is produced at a location relative to a nuclear fission module at a block 1920. At a block 1930, a flow control assembly that is coupled to the nuclear fission module is operated to modulate flow of a fluid in response to the location relative to the nuclear fission module. At a block 1940, at least a portion of the traveling burn wave is produced at a location relative to a neutron reflector assembly. The method stops at a block 1950.

Referring to FIGS. 21A-21H, illustrative methods are provided for assembling a flow control assembly for use in a nuclear fission reactor.

Figure 21Q:
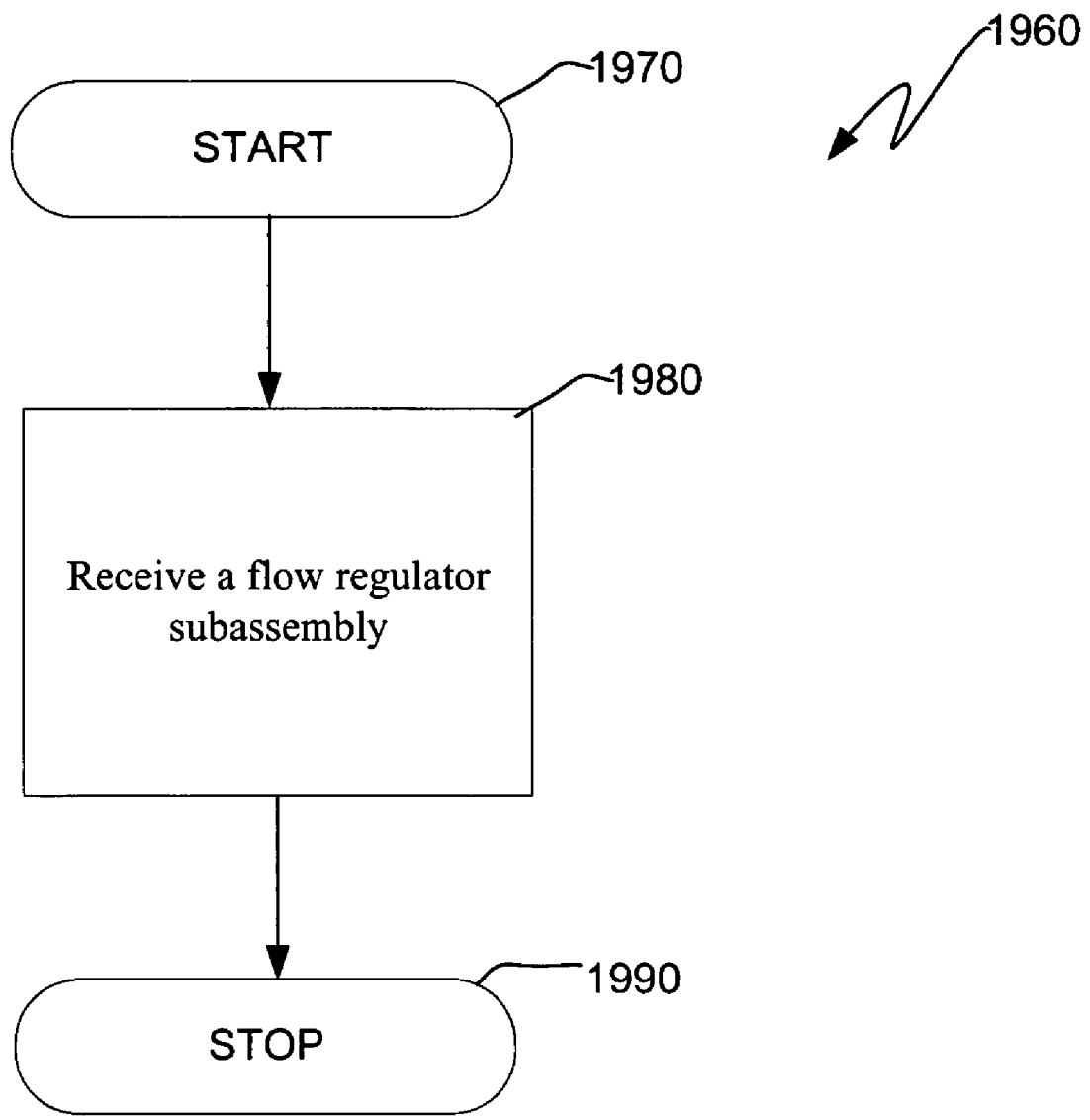
FIGS. 21A-21H are flow charts of illustrative methods of assembling the flow control assembly.

Turning now to FIG. 21A, an illustrative method 1960 of assembling a flow control assembly for use in a nuclear fission reactor starts at a block 1970. At a block 1980, a flow regulator subassembly is received. The method stops at a block 1990.

Figure 21B:
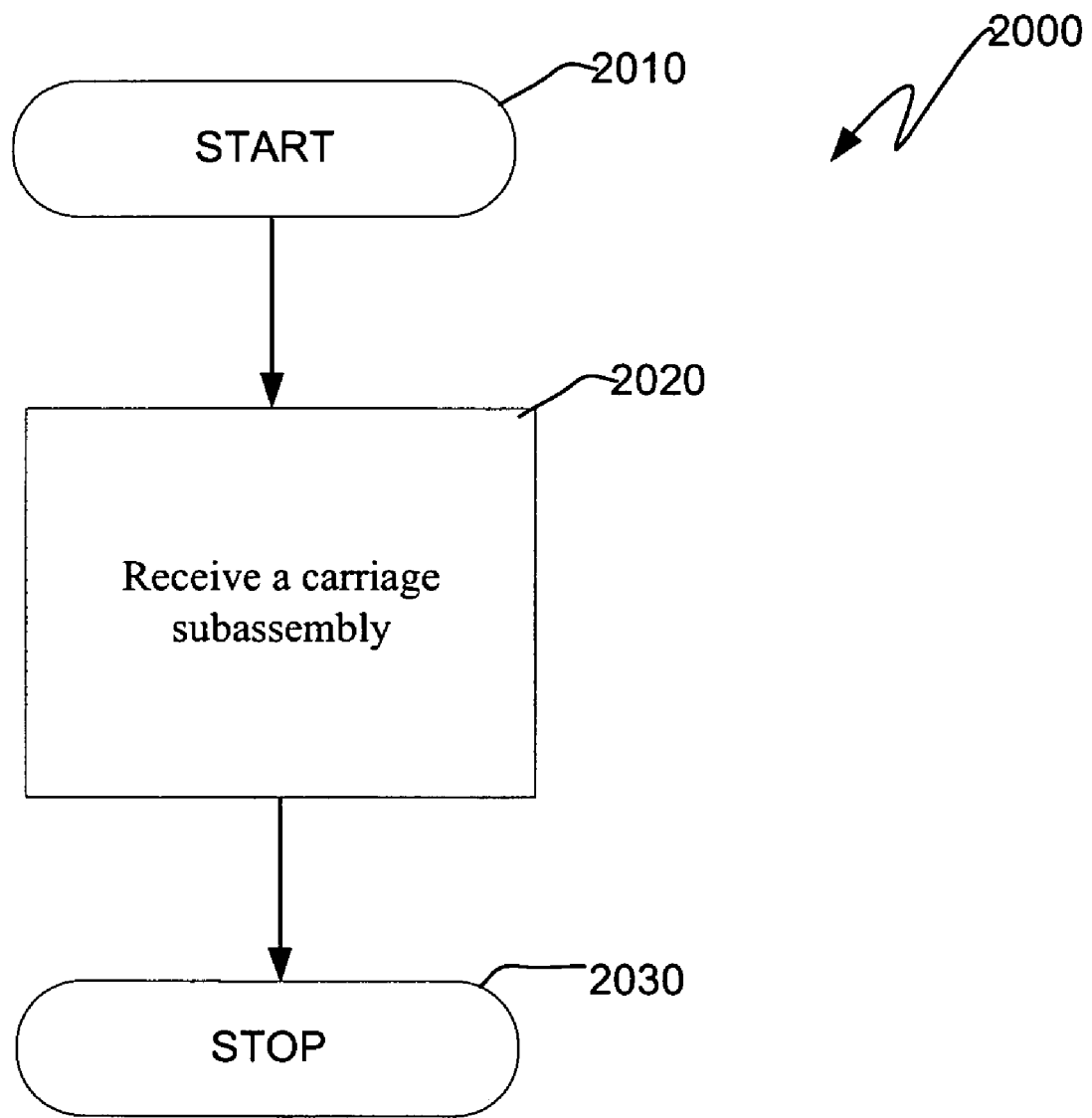

In FIG. 21B, another illustrative method 2000 of assembling a flow control assembly for use in a nuclear fission reactor starts at a block 2010. At a block 2020, a carriage subassembly is received. The method stops at a block 2030.

Figure 21C:
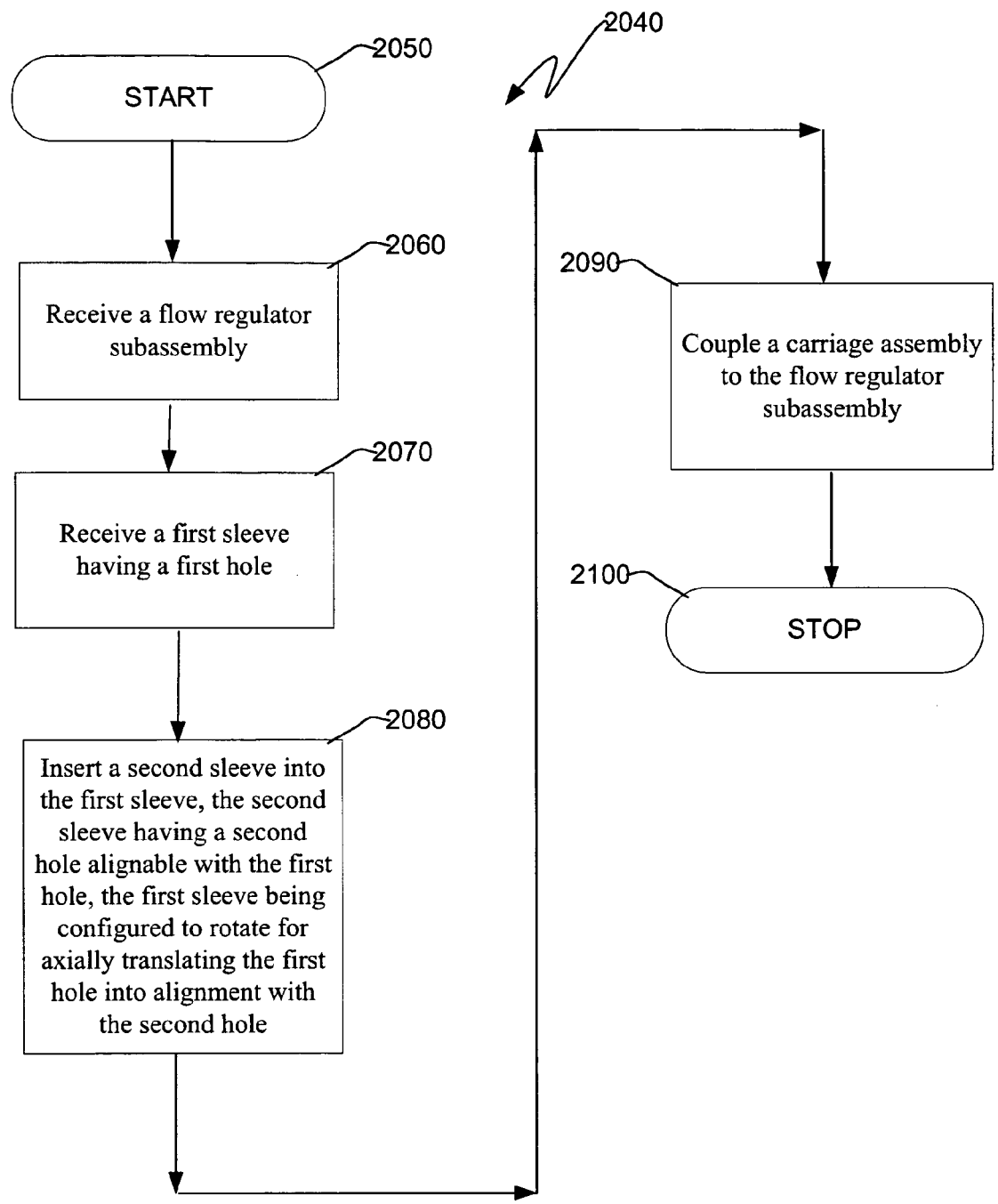

In FIG. 21C, another illustrative method 2040 of assembling a flow control assembly for use in a nuclear fission reactor starts at a block 2050. A flow regulator subassembly is received at a block 2060. A first sleeve having a first hole is received at a block 2070. At a block 2080, a second sleeve is inserted into the first sleeve, the second sleeve having a second hole alignable with the first hole, and the first sleeve being configured to rotate for rotating the first hole into alignment with the second hole. At a block 2090, a carriage subassembly is coupled to the flow regulator subassembly. The method stops at a block 2100.

Figure 21D:
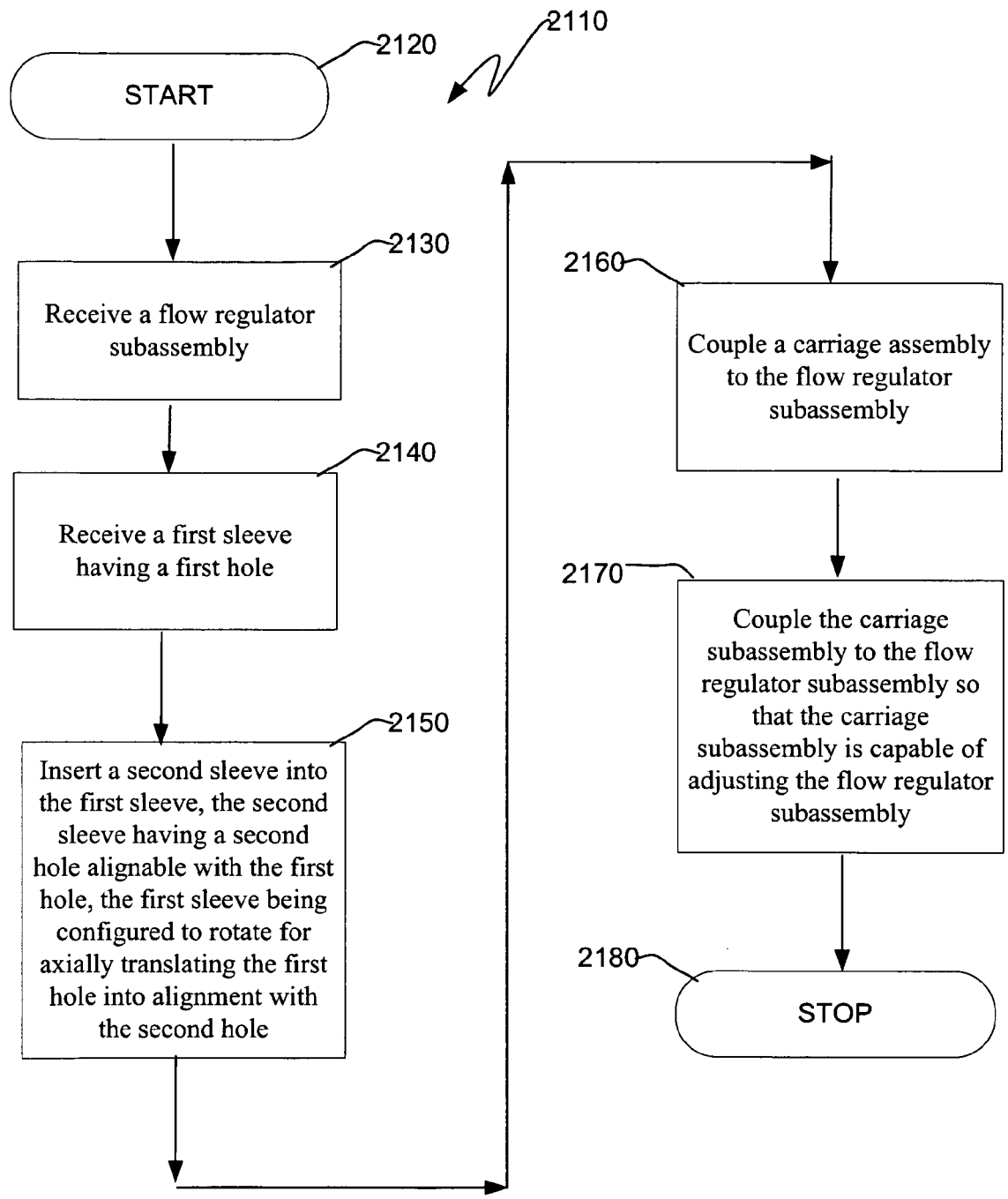

In FIG. 21D, yet another illustrative method 2110 of assembling a flow control assembly for use in a nuclear fission reactor starts at a block 2120. A flow regulator subassembly is received at a block 2130. At a block 2140, a first sleeve is received having a first hole. At a block 2150, a second sleeve is inserted into the first sleeve, the second sleeve having a second hole alignable with the first hole. At a block 2160, a carriage subassembly is coupled to the flow regulator subassembly. At a block 2170, the carriage subassembly is coupled to the flow regulator subassembly so that the carriage subassembly carries the flow regulator subassembly to the fuel assembly. The method stops at a block 2180.

Figure 21E:
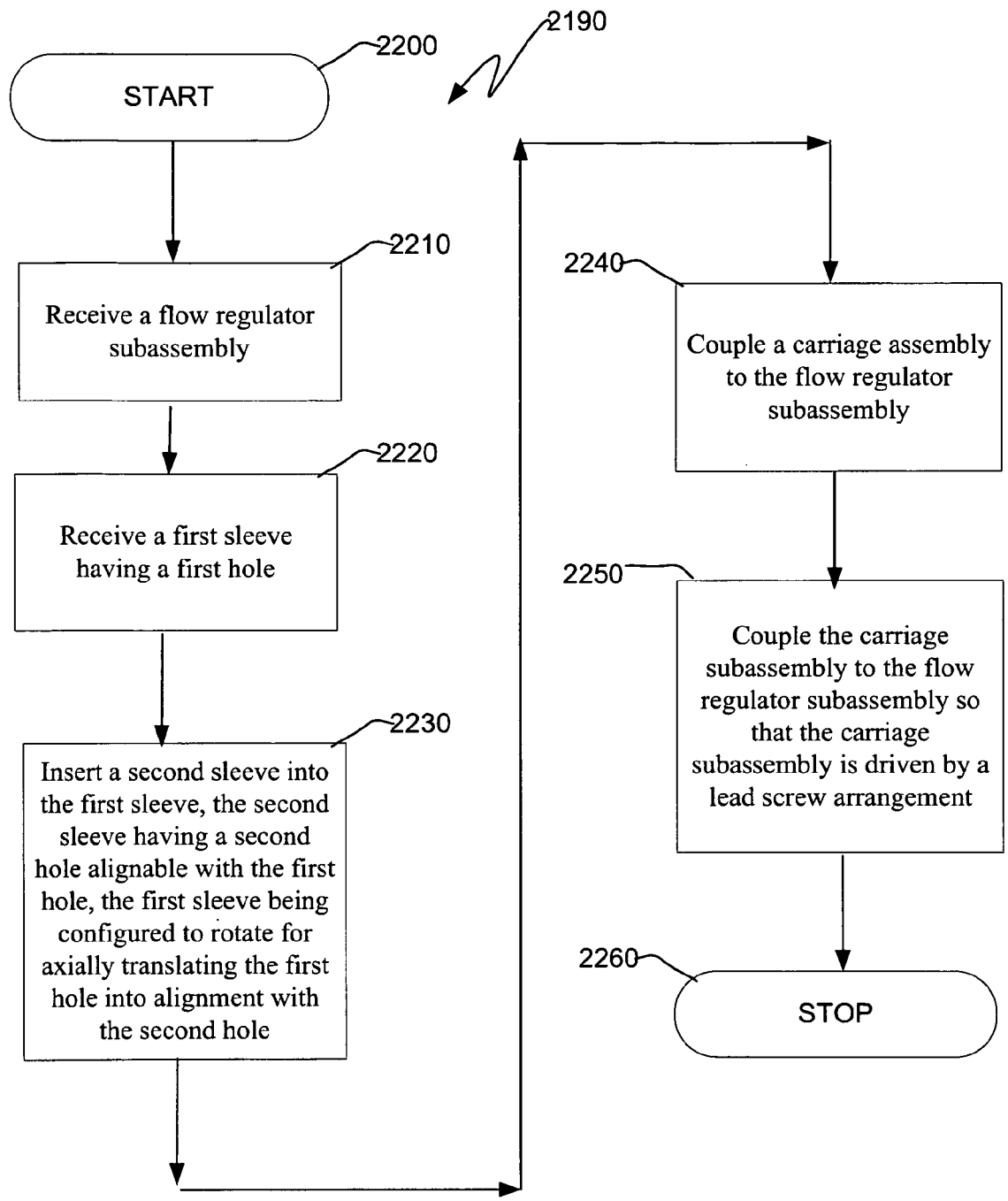

In FIG. 21E, a further illustrative method 2190 of assembling a flow control assembly for use in a nuclear fission reactor starts at a block 2200. A flow regulator subassembly is received at a block 2210. At a block 2220, a first sleeve is received having a first hole. At a block 2230, a second sleeve is inserted into the first sleeve, the second sleeve having a second hole alignable with the first hole. At a block 2240, a carriage subassembly is coupled to the flow regulator subassembly. At a block 2250 the carriage subassembly is coupled to the flow regulator subassembly so that the carriage subassembly is driven by a lead screw arrangement. The method stops at a block 2260.

Figure 21F:
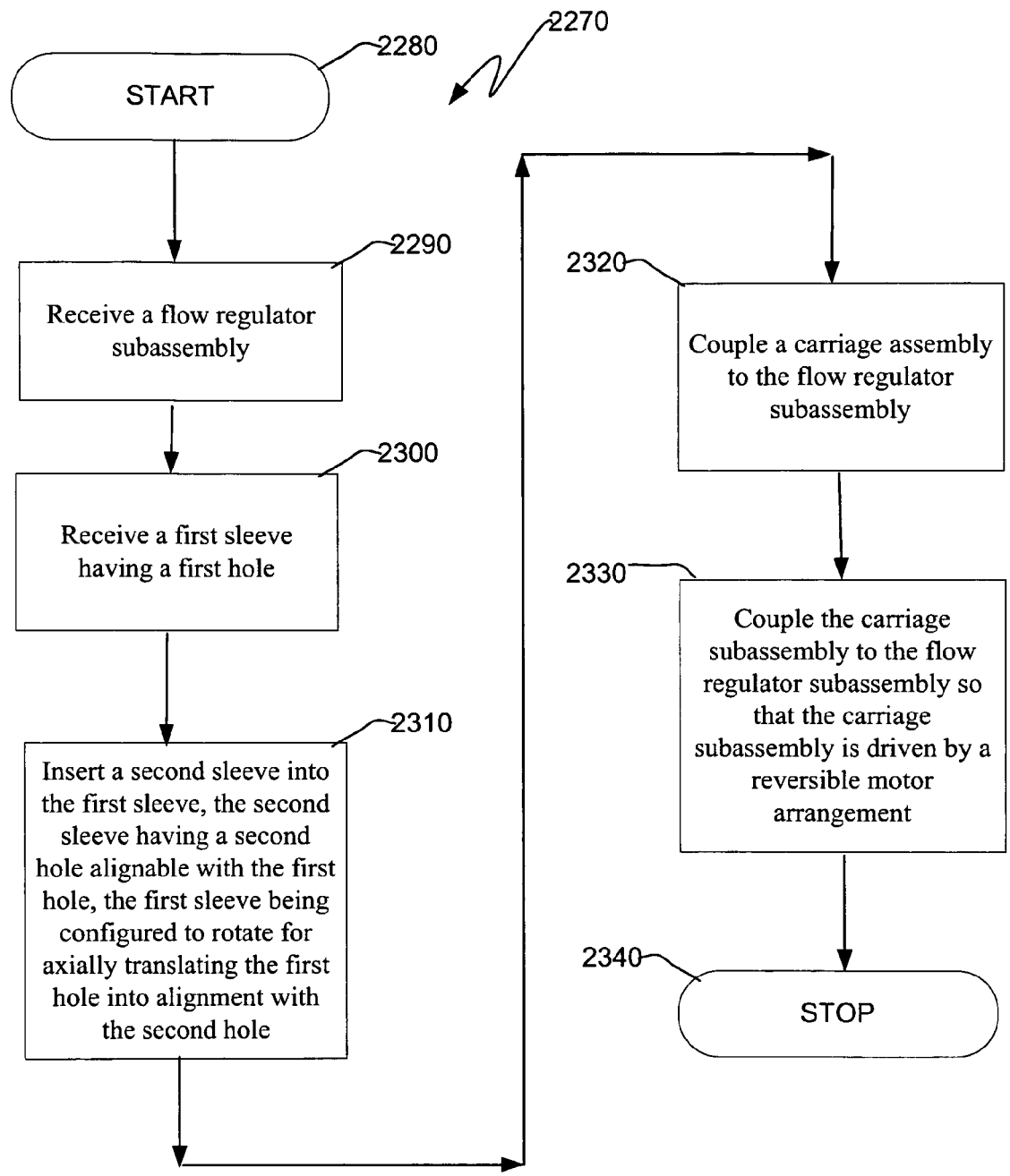

In FIG. 21F, an illustrative method 2270 of assembling a flow control assembly for use in a nuclear fission reactor starts at a block 2280. A flow regulator subassembly is received at a block 2290. A first sleeve having a first hole is received at a block 2300. At a block 2310, a second sleeve is inserted into the first sleeve, the second sleeve having a second hole alignable with the first hole, and the first sleeve being configured to rotate for rotating the first hole into alignment with the second hole. At a block 2320, a carriage subassembly is coupled to the flow regulator subassembly. At a block 2330, the carriage subassembly is coupled so that the carriage subassembly is driven by a reversible motor arrangement. The method stops at a block 2340.

Figure 21G:
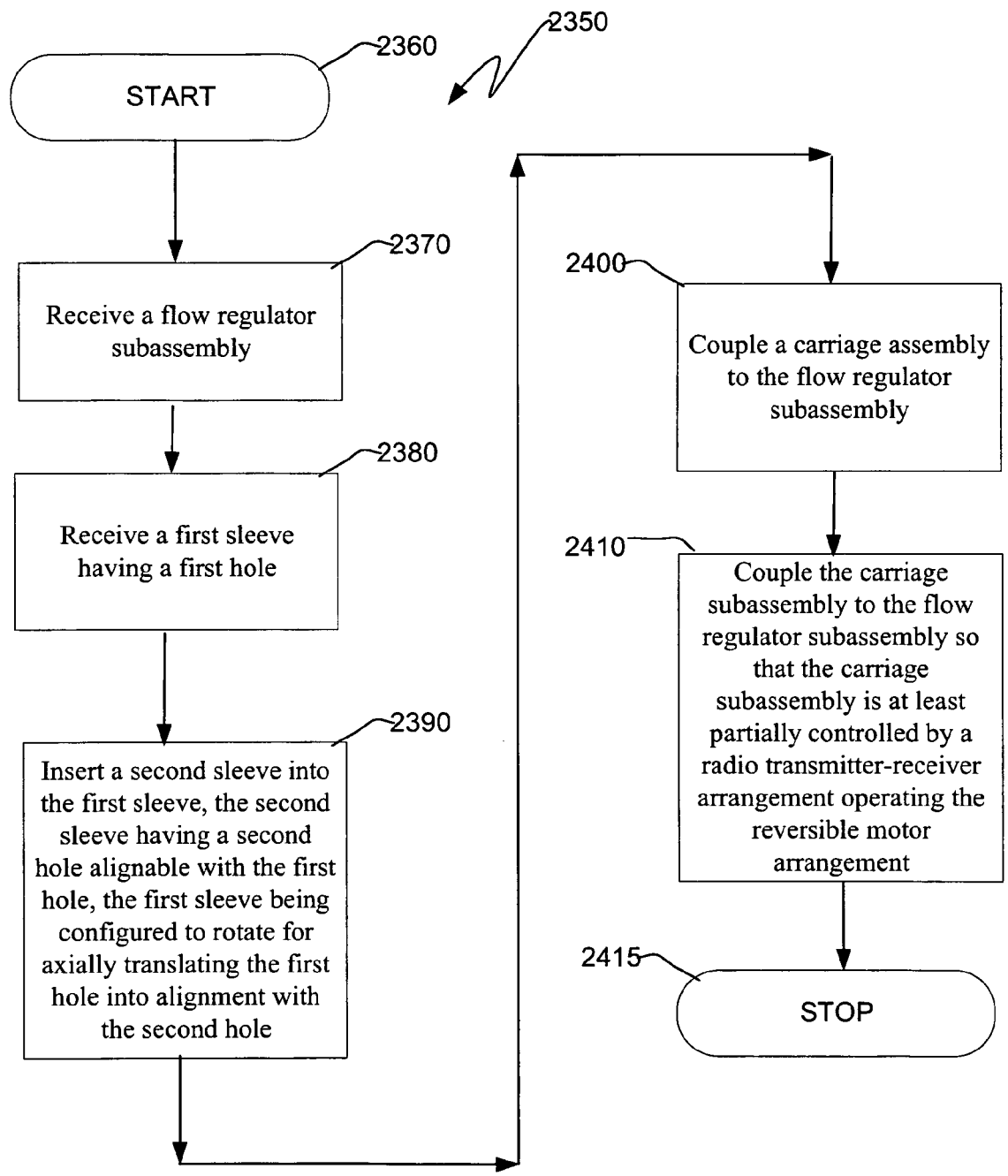

In FIG. 21G, an illustrative method 2350 of assembling a flow control assembly for use in a nuclear fission reactor starts at a block 2360. A flow regulator subassembly is received at a block 2370. A first sleeve having a first hole is received at a block 2380. At a block 2390, a second sleeve is inserted into the first sleeve, the second sleeve having a second hole alignable with the first hole, and the first sleeve being configured to rotate for rotating the first hole into alignment with the second hole. At a block 2400, a carriage subassembly is coupled to the flow regulator subassembly. At a block 2410, the carriage subassembly is coupled so that the carriage subassembly is at least partially controlled by a radio transmitter-receiver arrangement operating the reversible motor arrangement. The method stops at a block 2415.

Figure 21H:
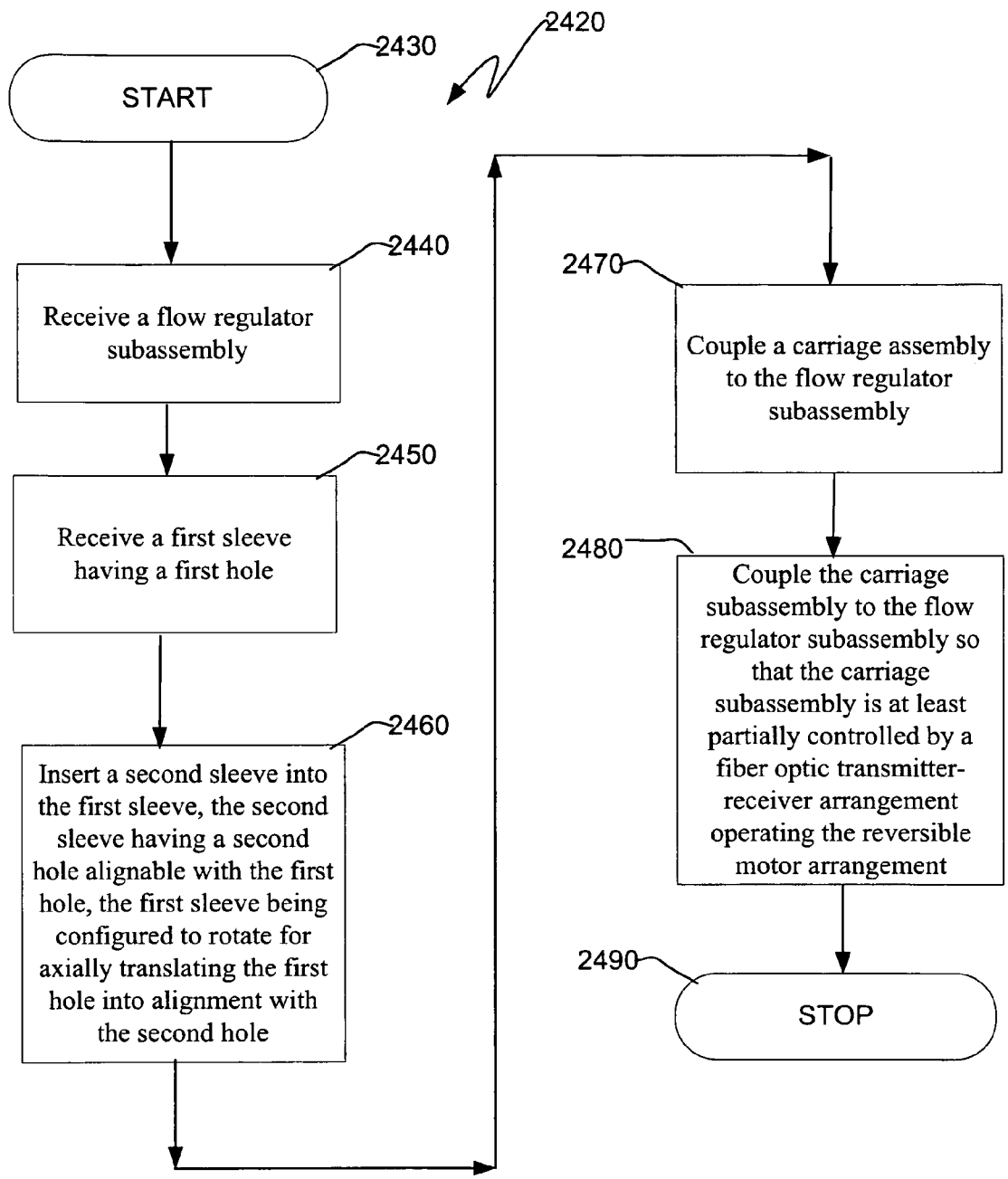

In FIG. 21H, an illustrative method 2420 of assembling a flow control assembly for use in a nuclear fission reactor starts at a block 2430. A flow regulator subassembly is received at a block 2440. A first sleeve having a first hole is received at a block 2450. At a block 2460, a second sleeve is inserted into the first sleeve, the second sleeve having a second hole alignable with the first hole, and the first sleeve being configured to rotate for rotating the first hole into alignment with the second hole. At a block 2470, a carriage subassembly is coupled to the flow regulator subassembly. At a block 2480, the carriage subassembly is coupled so that the carriage subassembly is at least partially controlled by a fiber optic transmitter-receiver arrangement operating the reversible motor arrangement. The method stops at a block 2490.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those persons skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those persons skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Therefore, what are provided are a nuclear fission reactor, flow control assembly, methods therefor and a flow control assembly system.

While various aspects and embodiments have been disclosed herein, other aspects and embodiments will be apparent to those skilled in the art. For example, a horizontally disposed orifice plate may be substituted for the flow regulator subassembly, the orifice plate having a plurality of orifices therethrough. A plurality of individually actuatable shutters would be associated with respective ones of the orifices, the shutters being capable of progressively closing and opening the orifices for regulating or modulating flow of coolant to the nuclear fission module.

In addition, it may be appreciated from the teachings herein that, unlike the devices disclosed in the prior art patents cited hereinabove, the flow control assembly and system of the present disclosure dynamically change the amount of the fluid flow, avoids reliance on different and precisely constituted neutron-induced growth properties of structural materials for controlling fluid flow, and can be dynamically varied during reactor operation, as needed.

Moreover, the various aspects and embodiments disclosed herein are for purposes of illustration and are not intended to be limiting, with the true scope and spirit being indicated by the following claims.

What is claimed is:

1. For use in a nuclear fission reactor, a flow control assembly, comprising:
   a flow regulator subassembly, said flow regulator subassembly including:
      a first sleeve having a first hole, said first sleeve having a structure arranged to axially translate responsive to rotational engagement thereof;
      a second sleeve slidably inserted into said first sleeve such that relative rotation of said first sleeve with respect to said second sleeve is restricted, said second sleeve having a second hole, the first hole being progressively axially alignable with the second hole responsive to axial translation of said first sleeve; and
   a carriage subassembly having a structure arranged to rotatably engage said first sleeve.

2. For use in a nuclear fission reactor, a flow control assembly couplable to a selected one of a plurality of nuclear fission fuel assemblies arranged for disposal in the nuclear fission reactor, comprising:
   an adjustable flow regulator subassembly for modifying flow of a fluid stream flowing through the selected one of the plurality of nuclear fission fuel assemblies, said adjustable flow regulator subassembly including:
an outer sleeve having a plurality of first holes, said outer sleeve having a structure arranged to axially translate responsive to rotational engagement thereof;
an inner sleeve slidably inserted into said outer sleeve, said inner sleeve having a plurality of second holes, the first holes being progressively axially alignable with the second holes responsive to axial translation of said first sleeve; and
an anti-rotation mechanism that engages said outer sleeve and said inner sleeve, the anti-rotation mechanism restricting relative rotation of said first sleeve with respect to said second sleeve and permitting axial translation of the first sleeve with respect to the second sleeve; and
a carriage subassembly rotatably coupled to said outer sleeve.

3. The flow control assembly of claim 2,
wherein said outer sleeve is generally cylindrical and rotatable; and
wherein said inner sleeve is generally cylindrical.

4. The flow control assembly of claim 2, wherein said carriage subassembly is driven by a lead screw arrangement for rotatably engaging said outer sleeve.

5. The flow control assembly of claim 2 wherein said carriage subassembly is driven by a reversible motor arrangement for rotatably engaging said outer sleeve.

6. The flow control assembly of claim 5, wherein said carriage subassembly is at least partially controlled by a radio transmitter-receiver arrangement operating said reversible motor arrangement for rotatably engaging said outer sleeve.

7. The flow control assembly of claim 5, wherein said carriage subassembly is at least partially controlled by a fiber optic transmitter-receiver arrangement operating said reversible motor arrangement for rotatably engaging said outer sleeve.

8. A flow control assembly comprising:
an outer sleeve defining therein a plurality of outer sleeve holes and having an outer sleeve engagement surface;
an inner sleeve slidably insertable into the outer sleeve, the inner sleeve defining therein a plurality of inner sleeve holes that are progressively axially alignable with the plurality of outer sleeve holes;
a carriage subassembly having a carriage subassembly engagement surface arranged to rotatably engage the outer sleeve engagement surface; and
an anti-rotation mechanism that engages the outer sleeve and the inner sleeve, the anti-rotation mechanism restricting relative rotation of the outer sleeve with respect to the inner sleeve and permitting axial translation of the outer sleeve with respect to the inner sleeve.

9. The flow control assembly of claim 8, wherein:
the outer sleeve engagement surface is threadedly defined in the outer sleeve; and
the carriage subassembly engagement surface is threadedly defined in the carriage subassembly.

10. The flow control assembly of claim 8, wherein the carriage subassembly includes a reversible motor arrangement.

11. The flow control assembly of claim 8, wherein the anti-rotation mechanism includes:
a plurality of grooves defined in the outer sleeve; and
a plurality of tabs defined in the inner sleeve, the plurality of grooves and the plurality of tabs being shaped to engage each other.

12. A flow control assembly comprising:
an outer sleeve defining therein a plurality of outer sleeve holes and having an outer sleeve engagement surface;
an inner sleeve slidably inserted into the outer sleeve, the inner sleeve defining therein a plurality of inner sleeve holes that are progressively axially alignable with the plurality of outer sleeve holes;
a carriage subassembly rotatably coupled to the outer sleeve, the carriage subassembly having a carriage subassembly engagement surface arranged to rotatably engage the outer sleeve engagement surface; and
an anti-rotation mechanism that engages the outer sleeve and the inner sleeve, the anti-rotation mechanism restricting relative rotation of the outer sleeve with respect to the inner sleeve and permitting axial translation of the outer sleeve with respect to the inner sleeve.

13. The flow control assembly of claim 12, wherein:
the outer sleeve engagement surface is threadedly defined in the outer sleeve; and
the carriage subassembly engagement surface is threadedly defined in the carriage subassembly.

14. The flow control assembly of claim 12, wherein the carriage subassembly includes a reversible motor arrangement.

15. The flow control assembly of claim 12, wherein the anti-rotation mechanism includes:
a plurality of grooves defined in the outer sleeve; and
a plurality of tabs defined in the inner sleeve, the plurality of grooves and the plurality of tabs being shaped to engage each other.

* * * * *